(12) United States Patent
Yoshizawa et al.

(10) Patent No.: US 10,638,189 B2
(45) Date of Patent: Apr. 28, 2020

(54) BROADCAST RECEIVER

(71) Applicant: MAXELL, LTD., Kyoto (JP)

(72) Inventors: Kazuhiko Yoshizawa, Osaka (JP); Yasunobu Hashimoto, Osaka (JP); Motoyuki Suzuki, Osaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/036,593

(22) PCT Filed: Nov. 12, 2014

(86) PCT No.: PCT/JP2014/079990
§ 371 (c)(1),
(2) Date: Aug. 1, 2016

(87) PCT Pub. No.: WO2015/072492
PCT Pub. Date: May 21, 2015

(65) Prior Publication Data
US 2016/0353155 A1    Dec. 1, 2016

(30) Foreign Application Priority Data

Nov. 13, 2013 (JP) ................................. 2013-234540
Nov. 13, 2013 (JP) ................................. 2013-234541

(51) Int. Cl.
*H04N 21/231* (2011.01)
*H04N 21/234* (2011.01)
(Continued)

(52) U.S. Cl.
CPC ........ *H04N 21/4312* (2013.01); *H04H 20/93* (2013.01); *H04H 60/72* (2013.01);
(Continued)

(58) Field of Classification Search
None
See application file for complete search history.

(56) References Cited

U.S. PATENT DOCUMENTS 6,240,555 B1    5/2001  Shoff et al.
6,469,753 B1   10/2002  Klosterman et al.
(Continued)

FOREIGN PATENT DOCUMENTS

CN    101296371 A    10/2008
CN    102422297 A     4/2012
(Continued)

OTHER PUBLICATIONS

English translation of International Preliminary Report on Patentability PCT/JP2014/079990 dated May 17, 2016.
(Continued)

*Primary Examiner* — Brian T Pendleton
*Assistant Examiner* — Jean D Saint Cyr
(74) *Attorney, Agent, or Firm* — McDermott Will & Emery LLP

(57) ABSTRACT

A broadcast receiver is configured to receive a broadcast wave of a digital broadcast service; separate at least a video image related to a broadcast program, electronic program guide information, and application-related information from the received broadcast wave; reproduce the video image related to the broadcast program; form an electronic program guide screen based on the electronic program guide information; acquire an application based on location information by referring to the application-related information; execute the application and outputs an application execution video image; and display the video image related to the broadcast program, the electronic program guide screen, or the application execution video image. The electronic program guide screen indicates information relating to applications to be executed in cooperation with the broadcast program.

2 Claims, 28 Drawing Sheets

(51) Int. Cl.

| | | |
|---|---|---|
| *H04N 21/236* | (2011.01) | |
| *H04N 21/2543* | (2011.01) | |
| *H04N 21/262* | (2011.01) | |
| *H04N 21/422* | (2011.01) | |
| *H04N 21/431* | (2011.01) | |
| *H04N 21/433* | (2011.01) | |
| *H04N 21/454* | (2011.01) | |
| *H04N 21/4725* | (2011.01) | |
| *H04H 20/93* | (2008.01) | |
| *H04N 5/44* | (2011.01) | |
| *H04N 21/434* | (2011.01) | |
| *H04H 60/72* | (2008.01) | |
| *H04N 5/445* | (2011.01) | |
| *H04N 21/488* | (2011.01) | |
| *H04N 21/478* | (2011.01) | |
| *H04N 21/482* | (2011.01) | |

(52) U.S. Cl.
CPC ....... *H04N 5/4401* (2013.01); *H04N 5/44513* (2013.01); *H04N 21/4348* (2013.01); *H04N 21/478* (2013.01); *H04N 21/488* (2013.01); *H04N 21/4821* (2013.01); *H04N 2005/44526* (2013.01)

(56) References Cited

U.S. PATENT DOCUMENTS

| | | | |
|---|---|---|---|
| 6,631,523 | B1 | 10/2003 | Matthews, III et al. |
| 6,807,677 | B1 | 10/2004 | Lee |
| 8,752,120 | B2 | 6/2014 | Maruyama |
| 8,949,884 | B2 | 2/2015 | Okubo et al. |
| 9,264,772 | B2 | 2/2016 | Kitazato et al. |
| 9,402,097 | B2 | 7/2016 | Kitahara et al. |
| 9,591,351 | B2 | 3/2017 | Dewa et al. |
| 2001/0005236 | A1 | 6/2001 | Nakada et al. |
| 2002/0010932 | A1 | 1/2002 | Nguyen et al. |
| 2005/0105528 | A1 | 5/2005 | Kobayashi |
| 2006/0036703 | A1 | 2/2006 | Fulmer et al. |
| 2006/0126839 | A1 | 6/2006 | Koike et al. |
| 2006/0143652 | A1 | 6/2006 | Chung |
| 2008/0077965 | A1* | 3/2008 | Kamimaki .............. H04N 7/163 725/105 |
| 2008/0244671 | A1* | 10/2008 | Moon ................ H04N 21/4316 725/110 |
| 2008/0250454 | A1 | 10/2008 | Nishina et al. |
| 2012/0058726 | A1 | 3/2012 | Kato |
| 2012/0084802 | A1 | 4/2012 | Kitazato |
| 2013/0271660 | A1 | 10/2013 | Sudo |
| 2014/0150015 | A1 | 5/2014 | Matsumura et al. |
| 2014/0165112 | A1 | 6/2014 | Freeman et al. |
| 2014/0214967 | A1* | 7/2014 | Baba ...................... H04H 20/08 709/205 |
| 2014/0237529 | A1 | 8/2014 | Kitahara et al. |
| 2016/0165303 | A1 | 6/2016 | Kang et al. |
| 2017/0034567 | A1 | 2/2017 | Kitahara et al. |
| 2017/0272803 | A1 | 9/2017 | Dewa et al. |

FOREIGN PATENT DOCUMENTS

| | | |
|---|---|---|
| CN | 103220573 A | 7/2013 |
| JP | 2001-186486 A | 7/2001 |
| JP | 2002-320158 A | 10/2002 |
| JP | 2004-104415 A | 4/2004 |
| JP | 2004-159318 A | 6/2004 |
| JP | 2008-252394 A | 10/2008 |
| JP | 2008-283709 A | 11/2008 |
| JP | 2010-166335 A | 7/2010 |
| JP | 2011-071880 A | 4/2011 |
| JP | 2011-097563 A | 5/2011 |
| JP | 2012-080248 A | 4/2012 |
| JP | 2012-134676 A | 7/2012 |
| JP | 2012-244386 A | 12/2012 |
| JP | 2012-257221 A | 12/2012 |
| JP | 2013-009330 A | 1/2013 |
| JP | 2013-009361 A | 1/2013 |
| JP | 2013-031046 A | 2/2013 |
| JP | 2013-066160 A | 4/2013 |
| JP | 2013-098863 A | 5/2013 |
| WO | 2012/157738 A1 | 11/2012 |
| WO | 2013/065279 A1 | 5/2013 |
| WO | 2013/061526 A1 | 4/2015 |

OTHER PUBLICATIONS

Reviews for Blue-Ray Disc Recorder Models Worth "Buying", AV Review, vol. 29, No. 4, Kosei WADA, Ongen Publishing Co., Ltd., Apr. 25, 2012, pp. 31 and 36.

ARIB STD-B24, First Volume, ver. 53, Association of Radio Industries and Businesses, Jul. 29, 2009, p. 64.

Search Report issued in International Application No. PCT/JP2014/079991, dated Feb. 24, 2015.

English translation of International Preliminary Report on Patentability PCT/JP2014/079991, dated May 17, 2016.

Search Report issued in International Application No. PCT/JP2014/079993, dated Feb. 24, 2015.

English translation of International Preliminary Report on Patentability PCT/JP2014/079993, dated May 17, 2016.

Hisakazu Katoh, "The Deployment of Hybridcast", NHK Science and Technical Research Laboratories R&D Report, Sep. 15, 2012, No. 135, pp. 22 and 23. (Discussed in IPRP which issued in Int'l Appl. No. PCT/JP2014/079993 dated May 17, 2016).

Office Action issued in corresponding Chinese Patent Application No. 201480062255.9, dated Apr. 1, 2017.

Office Action issued in corresponding Chinese Patent Application No. 201480062254.4, dated Nov. 30, 2016.

Office Action issued in corresponding Chinese Patent Application No. 201480062284.5, dated Dec. 2, 2016.

Office Action issued in corresponding Japanese Patent Application No. 2013-234540, dated Nov. 22, 2016.

Office Action issued in corresponding Japanese Patent Application No. 2013-234541, dated Nov. 22, 2016.

Search Report issued in corresponding International Application No. PCT/JP2014/079990, dated Feb. 24, 2015.

Non-Final Office Action issued in copending U.S. Appl. No. 15/036,605, dated Jul. 26, 2017.

Final Office Action issued in U.S. Appl. No. 15/036,605 dated Feb. 2, 2018.

Office Action issued in corresponding Japanese Patent Application No. 2017-066766, dated Feb. 6, 2018.

Notice of Allowance issued in related U.S. Appl. No. 15/036,606, dated Nov. 2, 2017.

Non-Final Office Action issued in related U.S. Appl. No. 15/036,605, dated Jul. 5, 2018.

Notice of Allowance issued in related U.S. Appl. No. 15/036,606, dated Jul. 30, 2018.

Non-Final Office Action issued in related U.S. Appl. No. 15/036,606, dated Jun. 8, 2018.

Non-Final Office Action issued in related U.S. Appl. No. 15/878,954, dated May 17, 2018.

Supplemental Notice of Allowability issued in related U.S. Appl. No. 15/036,606 dated Nov. 22, 2017.

Notification of Reasons for Refusal issued in Japanese Patent Application No. 2017-066766 dated Jul. 17, 2018, with English translation.

Notification of Reasons for Refusal issued in Japanese Patent Application No. 2017-066884 dated Jul. 17, 2018, with English translation.

Japanese Notice of Reasons for Refusal issued in corresponding Japanese Patent Application No. 2019-002453, dated Oct. 15, 2019, with English translation.

Japanese Notice of Reasons for Refusal issued in corresponding Japanese Patent Application No. 2019-043360, dated Jan. 14, 2020, with English translation.

\* cited by examiner

FIG. 6

| APPLICATION CONTROL INFORMATION (AIT) | CONTENTS |
|---|---|
| APPLICATION TYPE | DESCRIPTION METHOD OF APPLICATION. |
| APPLICATION IDENTIFIER | IDENTIFICATION INFORMATION CONSTITUTED BY ORGANIZATION IDENTIFICATION FOR IDENTIFYING PROVIDER AND APPLICATION IDENTIFICATION ASSIGNED TO EACH OF PROVIDERS TO IDENTIFY APPLICATION UNIT. |
| APPLICATION CONTROL CODE | INFORMATION FOR PRESCRIBING OPERATION CONTROL TO TARGET APPLICATION.<br>ONE OF FOLLOWING FOUR ITEMS IS DESCRIBED.<br>(1) AUTOMATIC ACTIVATION (2) OPERABLE<br>(3) END (4) PRE-FETCH |
| APPLICATION PROFILE | VALUE FOR INDICATING FUNCTION OF RECEIVER REQUIRED BY APPLICATION.<br>INDICATED BY COMBINATION OF FUNCTIONS POSSESSED BY RECEIVER AS OPTION.<br>REFERRED TO IN ORDER TO JUDGE WHETHER OR NOT APPLICATION CAN BE UTILIZED. |
| APPLICATION ACQUISITION SOURCE INFORMATION | INFORMATION FOR IDENTIFYING ACQUISITION SOURCE OF APPLICATION.<br>APPLICABLE TO BOTH OF CASES IN WHICH APPLICATION IS PLACED ON COMMUNICATION NETWORK AND IN WHICH APPLICATION IS TRANSMITTED BY BROADCAST. |
| APPLICATION BOUNDARY AND ACCESS PRIVILEGE SETTING | OPERABLE RANGE AS BROADCAST MANAGED APPLICATION IS INDICATED AS SET OF ONE OR MORE REGIONS (URL). MOREOVER, ACCESS LIMITATION TO BROADCAST RESOURCE FOR EACH REGION IS SET FOR EACH FUNCTIONAL UNIT. |
| ACTIVATION PRIORITY | PRIORITY RELATING TO AUTOMATIC ACTIVATION BETWEEN DATA BROADCAST AND ANOTHER BROADCAST MANAGED APPLICATION. |
| CACHE CONTROL INFORMATION | INFORMATION FOR CACHE CONTROL IN THE CASE OF HOLDING APPLICATION RESOURCE IN PREPARATION FOR REUSE OF APPLICATION. |
| SERVER ACCESS DISPERSION PARAMETER | PARAMETER SET FOR DISPERSING ACCESSES TO REDUCE LOAD TO SERVER IN WHICH ACCESSES ARE CONCENTRATED IN ACQUIRING APPLICATIONS AND THE LIKE. |
| OTHER INFORMATION | |

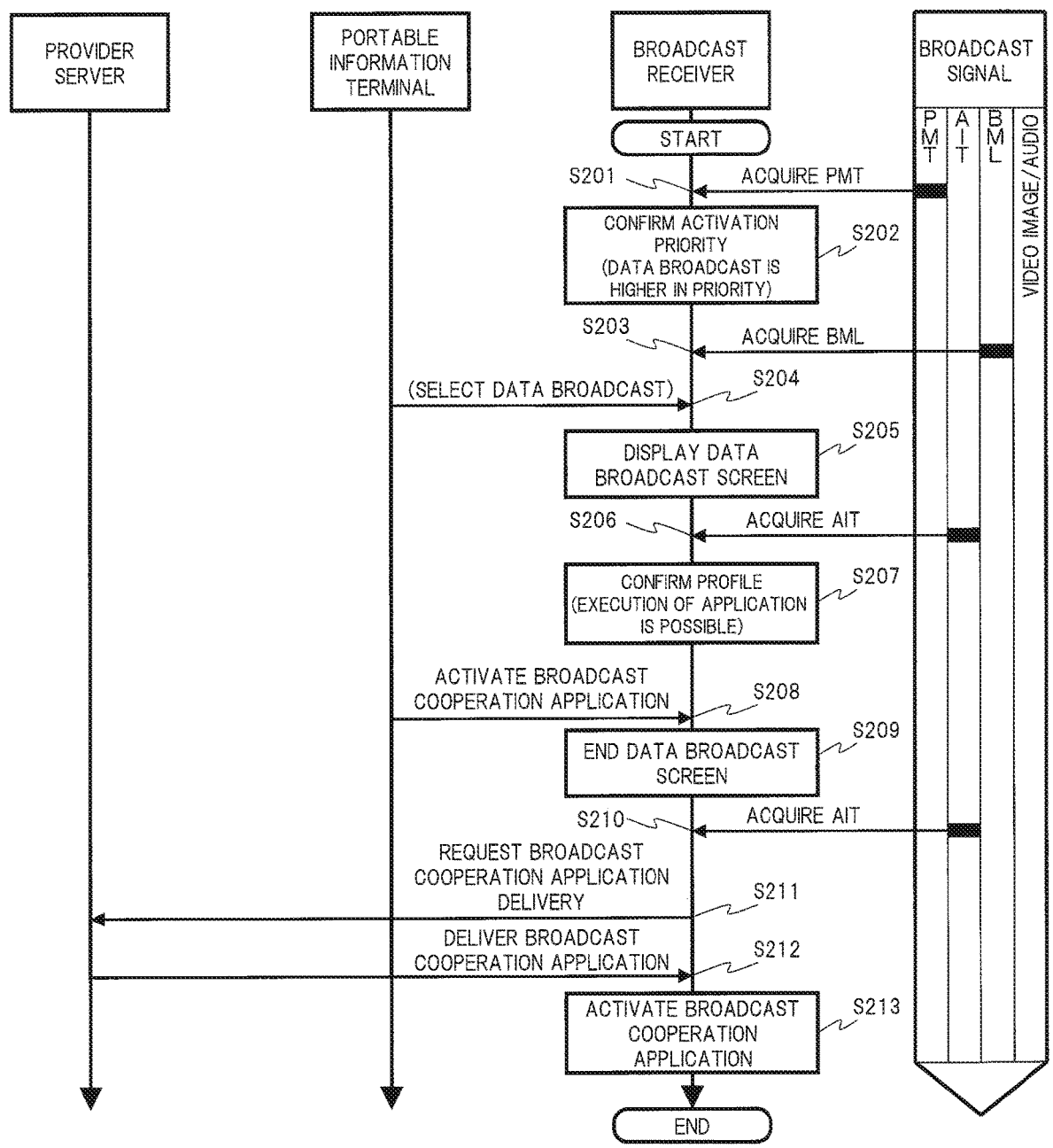

FIG. 19E

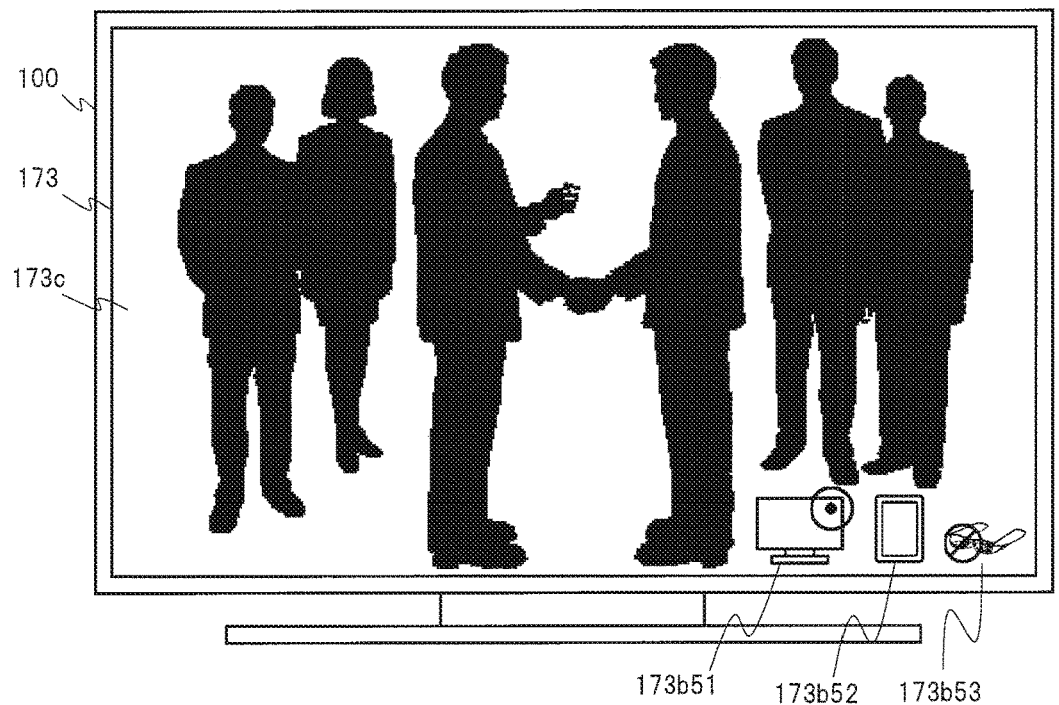

FIG. 19F

| | USAGE STATUS | APPLICATION A | APPLICATION B | APPLICATION C |
|---|---|---|---|---|
| RECEIVER A | RECEIVING | OPERABLE | OPERABLE | OPERABLE |
| RECEIVER B-1 | RECEIVING ANOTHER PROGRAM | NOT OPERABLE | OPERABLE | OPERABLE |
| RECEIVER B-2 | EMPTY | NOT OPERABLE | OPERABLE | OPERABLE |
| RECEIVER C-1 | EMPTY | OPERABLE | NOT OPERABLE | NOT OPERABLE |
| RECEIVER C-2 | RESERVATION FOR ANOTHER PROGRAM PRESENT | OPERABLE | NOT OPERABLE | NOT OPERABLE |

PROGRAM: ○○○○
BROADCAST COOPERATION APPLICATION LIST

BROADCAST RECEIVER

CROSS-REFERENCE TO RELATED APPLICATIONS

This application is the U.S. National Phase of PCT/JP2014/079990 filed Nov. 12, 2016, which claims priority to Japanese Patent Application No. 2013-234540 filed Nov. 13, 2013, and Japanese Patent Application No. 2013-234541 filed Nov. 13, 2013. The subject matter of each is incorporated herein by reference in entirety.

TECHNICAL FIELD

The present invention relates to a broadcast receiver.

BACKGROUND ART

One of extension functions for a digital broadcast service is a data broadcast in which digital data is transmitted by a broadcast wave and various information such as a weather forecast, news, recommended programs, and the like are displayed. A large number of television receiver capable of receiving data broadcast are commercially available, and many techniques relating to receiving data broadcast including the following Patent Document 1 have also been published.

RELATED ART DOCUMENTS

Patent Documents

Patent Document 1: Japanese Patent Application Laid-Open No. 2001-186486

SUMMARY OF THE INVENTION

Problems to be Solved by the Invention

Characteristics of data broadcast include that a television receiver capable of receiving a digital broadcast service can receive a data broadcast as a single unit and acquire/display various pieces of information. Meanwhile, since data broadcast has limited amount of data that can be transmitted because of limitation of an electric wave band, it is difficult to obtain a high-definition screen display and highly functional effects, and for this reason, there is a problem that it is difficult to execute useful functions having high added values in existing digital broadcast receivers.

The object of the present invention is to provide a digital broadcast receiver capable of executing functions having higher added values.

Means for Solving the Problems

As means for solving the above-mentioned problems, techniques disclosed in claims are used.

By way of example, a broadcast receiver capable of receiving a digital broadcast service that is capable of executing an application in cooperation with a broadcast program, includes: a broadcast receiving unit which receives a broadcast wave of the digital broadcast service; a separation unit which separates at least a video image related to the broadcast program, electronic program guide information, and application-related information from the received broadcast wave; a broadcast video image reproduction unit which reproduces the video image related to the broadcast program; an electronic program guide formation unit which forms an electronic program guide screen based on the electronic program guide information; an application acquiring unit which acquires a predetermined application based on location information acquired by referring to the application-related information; an application execution unit which executes the acquired predetermined application and outputs an application execution video image; and a display unit capable of displaying the video image related to the broadcast program, the electronic program guide screen, or the application execution video image, and the electronic program guide formation unit forms the electronic program guide screen that indicates information relating to applications capable of being executed in cooperation with the broadcast program about the broadcast program of the digital broadcast service, and such broadcast receiver is used.

Effects of the Invention

By using the technique of the present invention, it is possible to provide a digital broadcast receiver capable of executing functions having higher added values.

BRIEF DESCRIPTIONS OF THE DRAWINGS

FIG. 6 is a diagram showing a data configuration of application control information in accordance with the first embodiment;

FIG. 7B is a diagram showing an operation sequence at the time of activation of an application in the broadcast receiver in accordance with the first embodiment;

FIG. 19E is a screen display view showing a broadcast receiver in accordance with the fifth embodiment;

FIG. 19F is a screen display view showing a broadcast cooperation application launcher in a portable information terminal in accordance with the fifth embodiment;

DETAILED DESCRIPTION OF PREFERRED EMBODIMENTS

Figure 1:
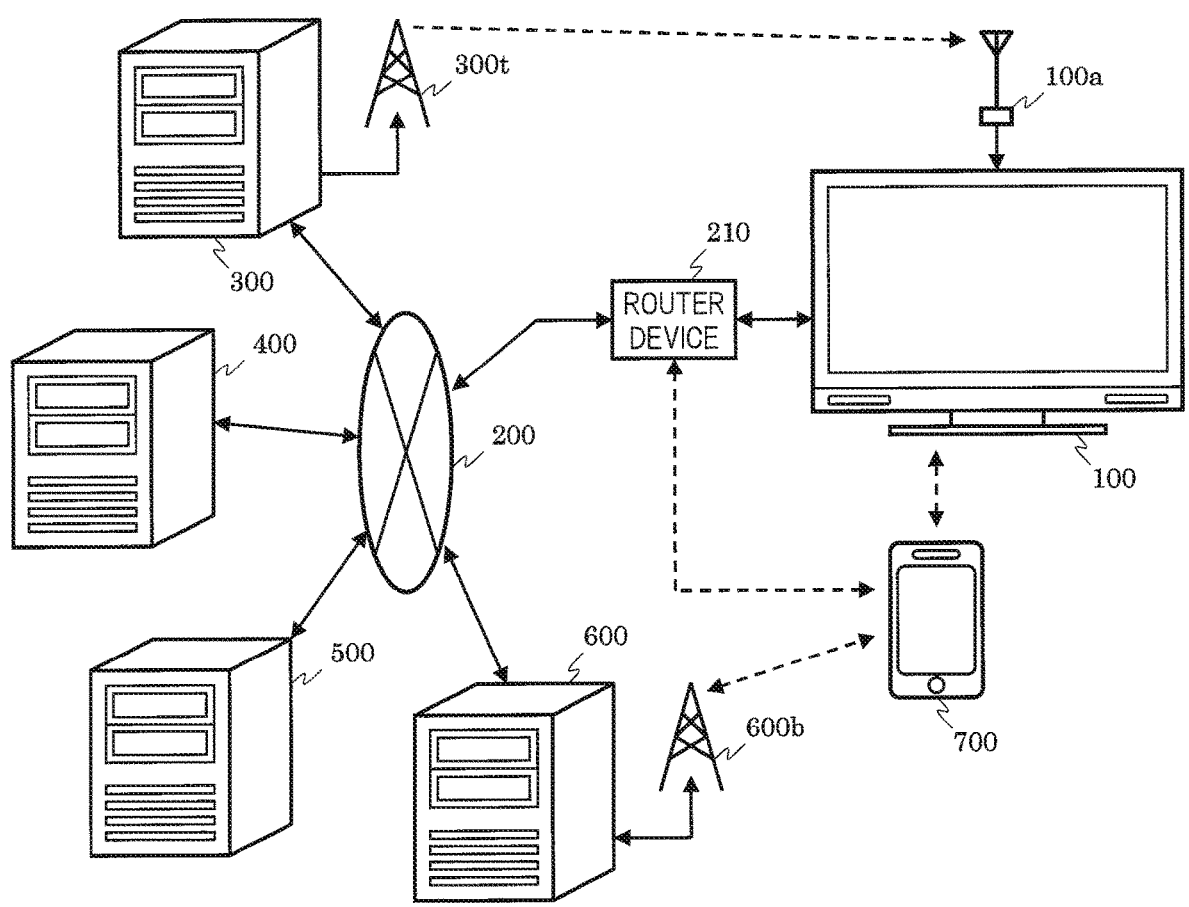
FIG. 1 is a diagram showing a system configuration of a communication system in accordance with a first embodiment.

Hereinafter, example embodiments of the present invention will be described with reference to the accompanying drawings.

First Embodiment

First, one example of a digital broadcast service that can be received by a broadcast receiver of the present embodiment will be described.

In one example of a BS/terrestrial digital broadcast that can be received by the broadcast receiver of the present embodiment, a plurality of transport streams (Transport Stream: TS) can be multiplexed on one transponder (frequency channel) and transmitted. The TS is a continuous TS packet having a predetermined length formed by dividing a data row such as video/audio elementary stream (Elementary Stream: ES), or program specific information (Program Specific Information: PSI)/service information (Service Information: SI), to which a TS header is added.

The PSI is a specific information table for identifying to which program each ES contained in the TS belongs and which is prescribed by MPEG (Moving Picture Experts Group)-2 System standard. The PSI is constituted by a PAT (Program Association Table), a PMT (Program Map Table), a CAT (Conditional Access Table), or the like. The PAT prescribes a list of programs included in the TS by a PID (Packet Identifier) of the PMT. The PMT prescribes a PID of the constituent element of each program, or the like. The CAT includes information relating to a limited receiving process.

Moreover, the SI is data formed by expanding the PSI and to which program information or the like is added, and the SI is provided with information relating to an electronic program guide (Electronic Program Guide: EPG) prescribed by Association of Wireless Industries and Businesses (Association of Wireless Industries and Businesses: ARIB) using the ARIB STD-B10. The SI is constituted by a BIT (Broadcaster Information Table), an SDT (Service Description Table), an EIT (Event Information Table), a TOT (Time Offset Table), or the like. The BIT includes broadcast station identifying information, group information, SI transmission information of a broadcast station, and the like. The SDT includes information such as a network ID for identifying a network, a TS ID for identifying a TS, a service ID (so-called channel number) for identifying individual services (so-called channel) within a network, or the like. The EIT includes a service ID for identifying individual services within the network, and information relating to events such as names, broadcast date and time, broadcast content of each event (so-called program), or the like. The TOT includes information relating to the current date and time.

Moreover, the TS includes PCR (Program Clock Reference) information forming the standard of a reproduction timing in a decoder, a BML document that is sub-set based on a BML (Broadcast Markup Language) specification prescribed by ARIB STD-B24, or the like.

In the broadcast receiver of the present embodiment, the TS constituted by the video/audio ES, various information, and the like, are received and decoded, so that a broadcast program, a data broadcast screen produced by using the EPG and BML, or the like can be provided to the user.

Moreover, the broadcast receiver of the present embodiment can utilize a broadcast communication cooperation system in which acquisition of added content through a broadband network, a computing process in a server device, a presentation process in cooperation with a portable terminal device, and the like are combined with the digital broadcast service, by making a digital broadcast service cooperate with a function of utilizing a broadband network. In order to achieve the above-mentioned broadcast communication cooperation system, it is assumed that the broadcast receiver of the present embodiment can execute an application described in HTML (Hyper Text Markup Language) or the like. Moreover, in the broadcast communication cooperation system to which the present broadcast receiver is applied, extended PSI/SI information required when application control information (Application Information Table: AIT) and an application in the extended BML specification and the broadcast communication cooperation system are transmitted by a broadcast wave is used. Note that the AIT corresponds to information for providing or notifying various information such as an acquisition source of the application, required for activating the application, and control information for controlling the activation/end or the like of an application.

The above description is based on the digital broadcast service in Japan; however, the broadcast receiver of the present embodiment including a broadcast communication cooperation system utilized by the broadcast receiver of the present embodiment is not intended to a limited application only in Japan.

Next, a detailed configuration example of the present embodiment will be described.

[System Configuration]

FIG. 1 is a diagram showing a system configuration as one example of a communication system of the present embodiment for achieving a broadcast communication cooperation system. The communication system of the present embodiment is constituted by a broadcast receiver 100 and an antenna 100*a*, a broadband network such as the Internet 200 and a router device 210, a wireless wave tower 300*t* of a broadcast station, a broadcast station server 300, a service provider server 400, other application servers 500, a mobile telephone communication server 600 and a base station 600*b* of a mobile telephone communication network, and a portable information terminal 700.

The broadcast receiver 100 is a television receiver having a function of utilizing the above-mentioned broadcast communication cooperation system in addition to an existing digital broadcast receiving function. The broadcast receiver 100 receives a broadcast wave transmitted from the wireless wave tower 300*t* via the antenna 100*a*. Moreover, the broadcast receiver 100 can be connected to the Internet 200 via the router device 210 and can transmit and receive data via communication with respective server devices on the Internet 200.

The router device 210 is connected to the Internet 200 via wireless communication or wire communication, also connected to the broadcast receiver 100 by wireless communication or wire communication, and further connected to the portable information terminal 700 by wireless communication. Thus, among the respective server devices on the Internet 200, the broadcast receiver 100, and the portable information terminal 700 can mutually transmit and receive data via the router device 210. Note that the communication between the broadcast receiver 100 and the portable information terminal 700 may be directly carried out through a method such as Bluetooth (registered trademark), NFC (Near Field Communication), or the like, without the router device 210.

The wireless wave tower 300*t* transmits a broadcast wave including a digital broadcast signal, AIT, control information relating to application presentation, and the like from a broadcast facility of a broadcast station. Note that the control information relating to the application presentation is control information relating to overlapping between the broadcast program and application on a television receiver and whether or not the application can be presented. Moreover, it is assumed that the broadcast station is provided with a broadcast station server 300. It is assumed that the broadcast server 300 stores broadcast programs (moving image content or the like) and metadata such as program titles, program ID's, the outlines, performers, and broadcast date and time of the respective broadcast programs and can provide the moving image content and each metadata to the service providers based on the contract. Note that the moving image content and the respective metadata may be provided to the service providers through an API (Application Programming Interface) provided in the broadcast station server 300.

The service provider server 400 is a server device prepared for providing services through use of the broadcast communication cooperation system by the service provider. The service provider server 400 carries out storing, managing, and delivering processes or the like on moving image content and metadata provided by the broadcast station server 300 and content and applications produced for the broadcast communication cooperation system. Moreover, the service provider server 400 also has functions of searching an application that can be provided and providing a list thereof in response to an inquiry from the television receiver. Note that storing, managing, and delivering processes of the moving image content and metadata, and storing, managing, and delivering processes of the applications may be carried out by different server devices. The above-mentioned broadcast station and service provider may be the same, or may be different providers. A plurality of service provider servers 400 may be prepared for each different service. Moreover, the functions of the service provider server 400 may be also possessed by the broadcast station server 300.

Another application server 500 is a known server device that carries out storing, managing, and delivering processes or the like on general applications, operation programs, content, and data other than those relating to the above-mentioned communication cooperation system.

The mobile telephone communication server 600 is connected to the Internet 200 and meanwhile, connected to the portable information terminal 700 via the base station 600*b*. The mobile telephone communication server 600 manages telephone communications (calls) and data transmission and reception of the portable information terminal 700 via the mobile telephone communication network and makes it possible to transmit and receive data via communications between the portable information terminal 700 and the respective server devices on the Internet 200. Note that the communications between the portable information terminal 700 and the broadcast receiver 100 may be carried out via the base station 600b and the mobile telephone communication server 600, as well as the Internet 200 and the router device 210.

[Hardware Configuration of Broadcast Receiver]

Figure 2A:
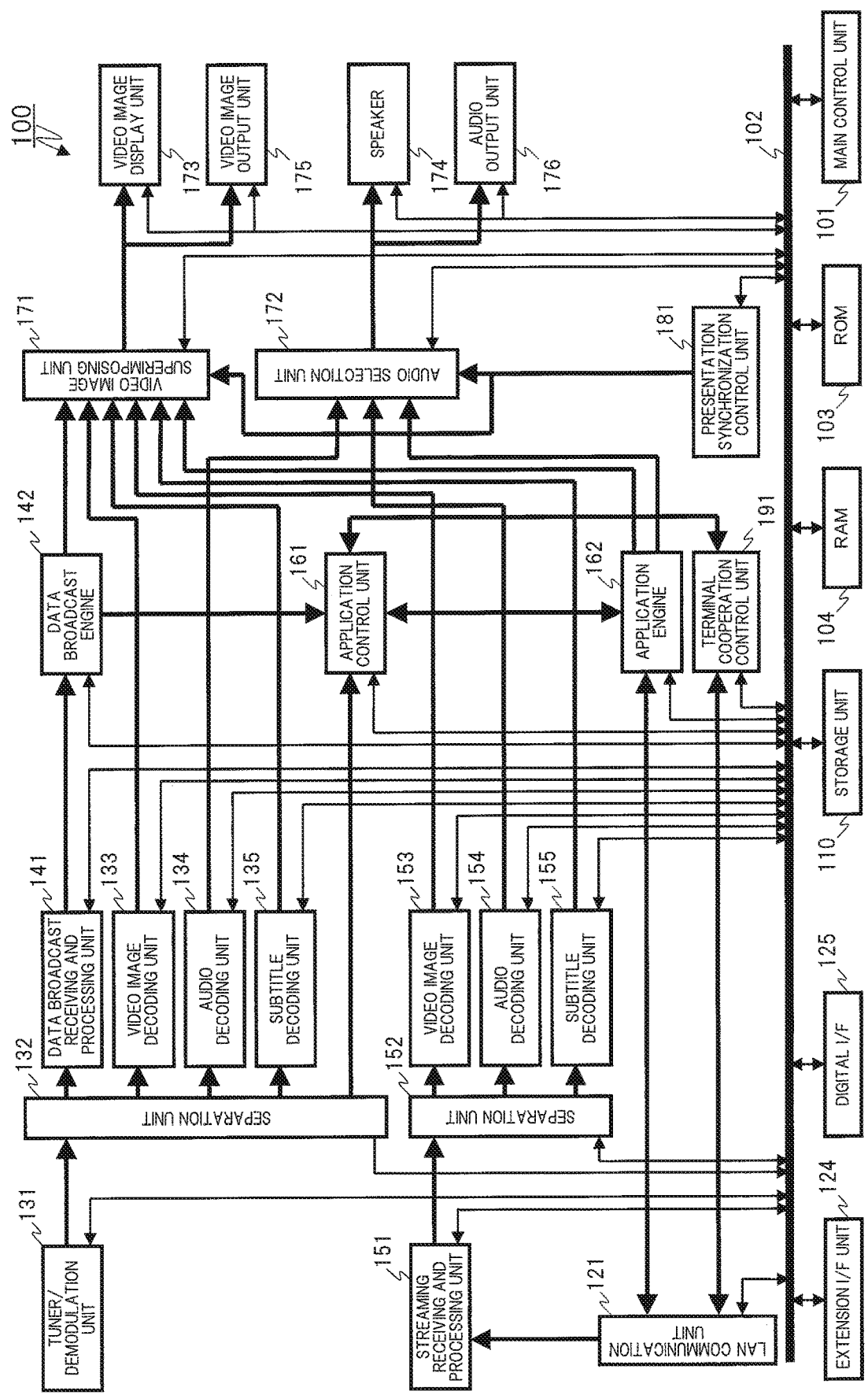
FIG. 2A is a block diagram showing a broadcast receiver in accordance with the first embodiment.

FIG. 2A is a block diagram showing one example of the internal configuration of the broadcast receiver 100. The broadcast receiver 100 is constituted by a main control unit 101, a system bus 102, a ROM 103, a RAM 104, a storage unit 110, a LAN communication unit 121, an extension interface unit 124, a digital interface unit 125, a tuner/demodulation unit 131, a first separation unit 132, a first video image decoding unit 133, a first audio decoding unit 134, a first subtitle decoding unit 135, a data broadcast receiving and processing unit 141, a data broadcast engine 142, a streaming receiving and processing unit 151, a second separation unit 152, a second video image decoding unit 153, a second audio decoding unit 154, a second subtitle decoding unit 155, an application control unit 161, an application engine 162, a video image superimposing unit 171, an audio selection unit 172, a video image display unit 173, a speaker 174, a video image output unit 175, an audio output unit 176, a presentation synchronization control unit 181, and a terminal cooperation control unit 191.

The main control unit 101 is a microprocessor unit for controlling the entire broadcast receiver 100 in accordance with a predetermined operation program. The system bus 102 is a data communication path for transmitting and receiving data between the main control unit 101 and the respective operation blocks in the broadcast receiver 100.

The ROM (Read Only Memory) 103 is a memory in which basic operation programs such as an operating system, and other operation programs are stored, and uses a rewritable ROM such as an EEPROM (Electrically Erasable Programmable ROM) or a flash ROM, for example. The RAM (Random Access Memory) 104 serves as a work area at the time of executing the basic operation programs or other operation programs. The ROM 103 and RAM 104 may be integrally formed with the main control unit 101. Moreover, the ROM 103 may not have an independent configuration shown in FIG. 2A but may use a part of a storage region in the storage unit 110.

The storage unit 110 stores operation programs and operation set values of the broadcast receiver 100 and personal information or the like of users of the broadcast receiver 100. Moreover, the storage unit 110 can store operation programs downloaded from the network and various kinds of data and the like formed by those operation programs. Furthermore, the storage unit 110 can store content such as moving images, still images, audio, or the like, acquired from a broadcast wave, or downloaded from the network. The entire or a part of the functions of the ROM 103 may be replaced by a part of the region of the storage unit 110. Moreover, the storage unit 110 needs to hold stored information even in a state where no power is supplied from the outside to the broadcast receiver 100. Accordingly, a device, for example, a semiconductor memory device such as a flash ROM or an SSD (Solid State Drive), or a magnetic disc drive such as an HDD (Hard Disc Drive), is used.

Note that the respective operation programs stored in the ROM 103 and the storage unit 110 can be updated or extended in their functions by downloading from the respective server devices on the Internet 200.

The LAN (Local Area Network) communication unit 121 is connected to the Internet 200 via the router device 210 to transmit and receive data to and from the respective server devices on the Internet 200. The connection with the router device 210 may be made in a wire connection or a wireless connection such as a Wi-Fi (registered trademark). It is assumed that the LAN communication unit 121 is provided with an encoding circuit, a decoding circuit, or the like. Moreover, the broadcast receiver 100 may be further provided with another communication unit such as a Bluetooth (registered trademark) communication unit, an NFC communication unit, or an infrared ray communication unit.

The tuner/demodulation unit 131 receives a broadcast wave from the wireless wave tower 300t via the antenna 100a and tunes (performs channel selection) to a channel for a service desired by the user based on control of the main control unit 101. Moreover, the tuner/demodulation unit 131 demodulates the received broadcast signal to acquire a TS. Note that, in the example shown in FIG. 2A, although a configuration with the single tuner/demodulation unit is exemplified, the broadcast receiver 100 may have a configuration in which a plurality of tuner/demodulation units are installed for the purpose of achieving simultaneous display of a plurality of screens, a recording of a program on a different channel, or the like. Moreover, based on the control of the main control unit 101, a control for limited accesses to the demodulated TS or the like may be carried out.

The first separation unit 132 to which the TS outputted from the tuner/demodulation unit 131 is inputted separates the data into respective data rows such as a video image data row, an audio data row, a subtitle data row, a program information data row, an AIT data row, or a BML data row to output the resulting data rows. These data rows may be prepared as an ES format, for example. The first video image decoding unit 133 decodes the video image data row inputted from the first separation unit 132 and outputs video image information. The first audio decoding unit 134 decodes the audio data row inputted from the first separation unit 132 and outputs audio information. The first subtitle decoding unit 135 decodes the subtitle data row inputted from the first separation unit 132 to output subtitle information.

The data broadcast receiving and processing unit 141 decodes the BML data row inputted from the first separation unit 132 to reproduce a BML document. The data broadcast engine 142 is a BML browser for executing a BML document and executes the BML document reproduced by the data broadcast receiving and processing unit 141 to output data broadcast screen information.

Based on control of the main control unit 101, the streaming receiving and processing unit 151 accesses moving image content or the like placed on the respective server devices on the Internet 200 via the LAN communication unit 121 to acquire a program stream (Program Stream: PS) such as the above-mentioned moving image content. Moreover, based on the control of the main control unit 101, control or the like of a DRM (Digital Rights Management) processing for the acquired PS may be carried out.

The second separation unit 152 to which the PS outputted from the streaming receiving and processing unit 151 is inputted separates the data into respective data rows such as a video image data row, an audio data row, or a subtitle data row to output the resulting data rows. These data rows may be prepared as an ES format, for example. Since a second video image decoding unit 153, a second audio decoding unit 154, and a second subtitle decoding unit 155 carry out the same processes as those of the first video image decoding unit 133, the first audio decoding unit 134, and the first subtitle decoding unit 135, respectively, the descriptions thereof will be omitted.

Note that the first separation unit 132 and the second separation unit 152, the first video image decoding unit 133 and the second video image decoding unit 153, the first audio decoding unit 134 and the second audio decoding unit 154, and the first subtitle decoding unit 135 and the second subtitle decoding unit 155 may be compatibly used, respectively.

Based on the AIT data row inputted from the first separation unit or an AIT file acquired from the respective server devices on the Internet 200, the application control unit 161 works on the application engine 162 with reference to an application produced for the broadcast communication cooperation system to carry out controlling and managing processes on a life cycle and an event on an application unit basis. Moreover, depending on the state of the application and the instruction of the AIT, the application control unit 161 appropriately carries out a control for the limitation of functions of the application. The application engine 162 is an HTML browser that acquires an application produced for the broadcast communication cooperation system to execute the application based on the control of the application control unit 161.

The video image superimposing unit 171 to which video image information outputted from the first video image decoding unit 133, subtitle information outputted from the first subtitle decoding unit 135, data broadcast screen information outputted from the data broadcast engine 142, video image information outputted from the second video image decoding unit 153, subtitle information outputted from the second subtitle decoding unit 155, and application execution screen information outputted from the application engine 162 are inputted carries out selection and/or superimposing process or the like. The video image superimposing unit 171 is provided with a video RAM omitted in the drawing, and based on video image information inputted to the video RAM, the video image display unit 173 or the like is driven. Moreover, based on control of the main control unit 101, the video image superimposing unit 171 carries out a scaling process, a superimposing process on EPG screen information formed based on the program information data row outputted from the first separation unit 132, or the like, if necessary.

The audio selection unit 172 to which the audio information outputted from the first audio decoding unit 134, the audio information outputted from the second audio decoding unit 154, and the application execution audio information outputted from the application engine 162 are inputted selects the audio information appropriately depending on control of the main control unit 101 to output the resulting data.

The video image display unit 173 is a display device such as a liquid crystal panel, for example, and provides video image information subjected to the selection and/or superimposing process in the video image superimposing unit 171 to the user of the broadcast receiver 100. The speaker 174 provides audio information outputted from the audio selection unit 172 to the user of the broadcast receiver 100. The video image output unit 175 is a video image output interface for outputting video image information subjected to the selection and/or superimposing process in the video image superimposing unit 171. The audio output unit 176 is an audio output interface for outputting audio information outputted from the audio selection unit 172. Note that, in a case in which the broadcast receiver 100 is a television receiver or the like as described above, the video image output unit 175 and the audio output unit 176 are not essential elements to the present invention.

The presentation synchronization control unit 181 carries out a control of presentation synchronization of the video image information, audio information, or the like obtained by decoding the TS acquired from a broadcast wave, video image information, audio information, or the like obtained by decoding the PS acquired from the respective server devices on the Internet 200, the application execution screen information, and application execution audio information outputted from the application engine 162, on the video image display unit 173 and the speaker 174, or on the video image output unit 175 and audio output unit 176, based on, for example, PCR information or the like.

Upon carrying out the cooperation with an external portable terminal device, the terminal cooperation control unit 191 carries out management and control such as the finding of a cooperation device (portable terminal device) and authentication thereof, connection between the broadcast receiver 100 and the cooperation device, the cooperation with the application, or the like.

The extension interface unit 124 is a group of interfaces for extending the functions of the broadcast receiver 100 and in the present embodiment, is constituted by an analog video image/audio interface, a USB (Universal Serial Bus) interface, a memory interface, and the like. The analog video image/audio interface carries out an input of an analog video image signal/audio signal from an external video image/audio output device, an output of the analog video image signal/audio signal to an external video image/audio input device, or the like. The USB interface is connected to a PC or the like to transmit and receive data. The USB may be connected to an HDD to record a broadcast program and content thereof. Moreover, the USB may be connected to a keyboard or another USB device. The memory interface is connected to a memory card or another memory medium to transmit and receive data.

The digital interface unit 125 is an interface through which encoded digital video image data and/or digital audio data is outputted or inputted. It is assumed that the digital interface unit 125 is supposed to be capable of outputting the TS acquired by the tuner/demodulation unit 131 and the PS acquired by the streaming receiving and processing unit 151 as they are. Moreover, the TS and PS inputted from the digital interface unit 125 may be controlled to be inputted to the first separation unit 132 and the second separation unit 152. Outputting digital content stored in the storage unit 110 or storing digital content to the storage unit 110 may be carried out via the digital interface unit 125. The digital interface unit 125 may be a DVI terminal, an HDMI (registered trademark) terminal, or the like, and the output or input of data thereto or therefrom may be carried out by a format compatible with the DVI specification, HDMI specification, or the like. The input or output may be carried out by using a serial data format in compliance with the IEEE1394 specification or the like.

In addition to the television receiver, the broadcast receiver 100 may be an optical disc drive recorder such as a DVD (Digital Versatile Disc) recorder, a magnetic disc drive recorder such as an HDD recorder, or an STB (Set Top Box). A PC (Personal Computer), a tablet terminal, a game machine, or the like, provided with a digital broadcast receiving function and a broadcast communication cooperation function, may also be used. In a case in which the broadcast receiver 100 is the DVD recorder, the HDD recorder, the STB, or the like, the video image display unit 173 and the speaker 174 need not be installed. By connecting an external monitor and an external speaker to the video image output unit 175 and the audio output unit 176, the same operations as those of the broadcast receiver 100 of the present embodiment can be carried out.

[Software Configuration of Broadcast Receiver]

Figure 2B:
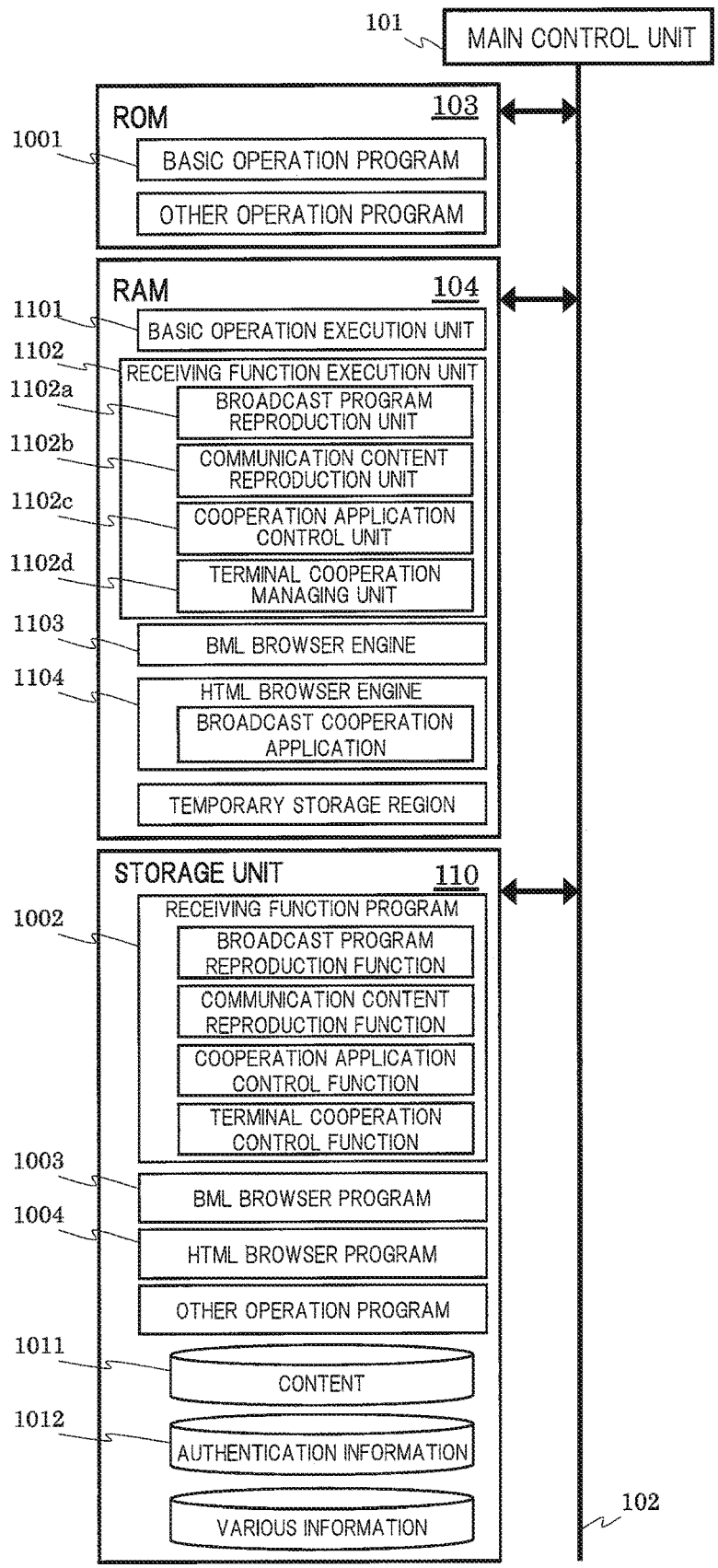
FIG. 2B is a diagram showing software configurations in the broadcast receiver in accordance with the first embodiment.

FIG. 2B is a block diagram showing software configurations in the broadcast receiver 100 of the present embodiment, showing software configurations in the ROM 103, the RAM 104, and the storage unit 110. In the present embodiment, a basic operation program 1001 and other operation programs are stored in the ROM 103, and a receiving function program 1002, a BML browser program 1003, an HTML browser program 1004, and other operation programs are stored in the storage unit 110. Moreover, the storage unit 110 is provided with a content storage region 1011 for storing content such as moving images, still images, or audio, an authentication information storage region 1012 for storing authentication information or the like to be used upon cooperation or the like with an external portable terminal device, and various information storage regions for storing other various information.

The basic operation program 1001 stored in the ROM 103 is developed on the RAM 104, and further, the main control unit 101 executes the developed basic operation program, thereby constituting a basic operation execution unit 1101. Moreover, the receiving function program 1002, the BML browser program 1003, and the HTML browser program 1004 which are stored in the storage unit 110, are each developed on the RAM 104, and further, the main control unit 101 executes the respective developed operation programs, thereby constituting a receiving function execution unit 1102, a BML browser engine 1103, and an HTML browser engine 1104, respectively. Furthermore, the RAM 104 is provided with a temporary storage region for temporarily storing data formed at the time of executing the respective operation programs, if necessary.

Note that, in the following, for simplicity of description, a process in which the main control unit 101 controls each of operation blocks by developing the basic operation program 1001 stored in the ROM 103 on the RAM 104 and executing the developed program is described on the assumption that the basic operation execution unit 1101 controls each of operation blocks. With respect to other operation programs, the same description will be given.

The receiving function execution unit 1102 controls each of the operation blocks in the broadcast receiver 100 to achieve a broadcast receiving function and a broadcast communication cooperation function. In particular, a broadcast program reproduction unit 1102a mainly controls the tuner/demodulation unit 131, the first separation unit 132, the first video image decoding unit 133, the first audio decoding unit 134, the first subtitle decoding unit 135, the data broadcast receiving and processing unit 141, and the data broadcast engine 142. Note that the data broadcast engine 142 may be replaced by the BML browser engine 1103 developed on the RAM 104. Moreover, a communication content reproduction unit 1102b mainly controls the streaming receiving and processing unit 151, the second separation unit 152, the second video image decoding unit 153, the second audio decoding unit 154, and the second subtitle decoding unit 155. A cooperation application control unit 1102c mainly controls the application control unit 161 and the application engine 162. Note that the application engine 162 may be replaced by the HTML browser engine 1104 developed on the RAM 104. A terminal cooperation managing unit 1102d mainly controls the terminal cooperation control unit 191.

The above-mentioned respective operation programs may be preliminarily stored in the ROM 103 and/or the storage unit 110 at the time of shipment of the product. These respective operation programs may be acquired from another application server 500 or the like on the Internet 200 via the LAN communication unit 121 after the shipment. Moreover, the above-mentioned operation programs stored in a memory card, an optical disc or the like may be acquired via the extension interface unit 124 or the like.

[Configuration of Broadcast Station Server]

Figure 3:
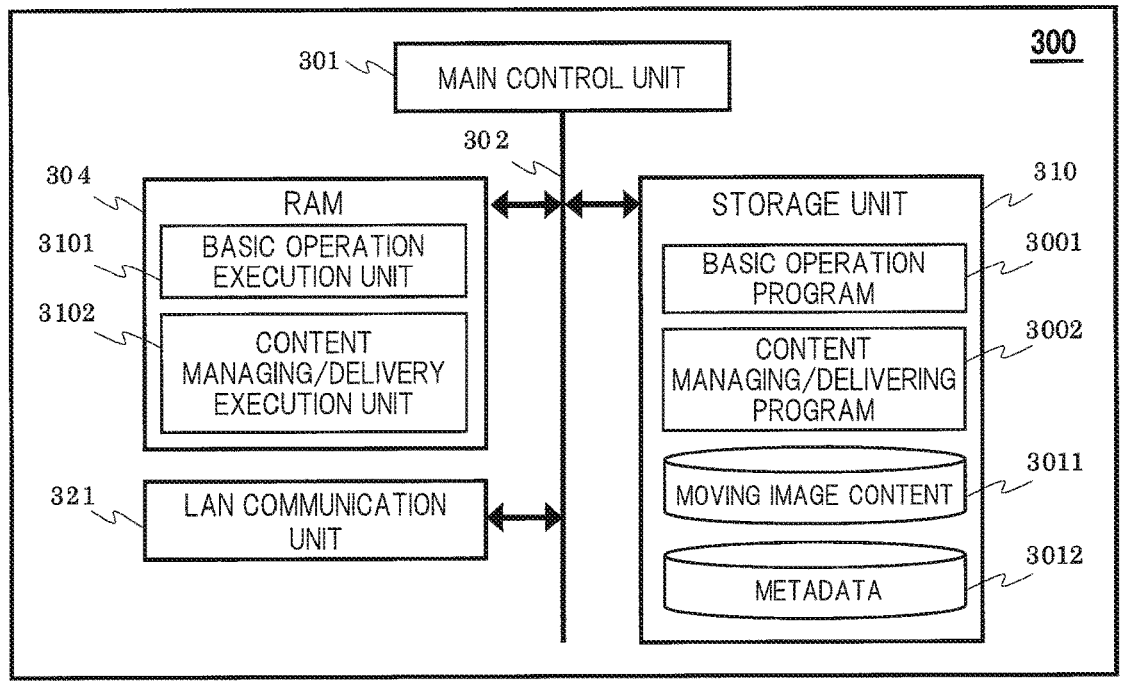
FIG. 3 is a block diagram showing a broadcast station server in accordance with the first embodiment.

FIG. 3 is a block diagram showing one example of an internal configuration of the broadcast station server 300. The broadcast station server 300 is constituted by a main control unit 301, a system bus 302, a RAM 304, a storage unit 310, and a LAN communication unit 321.

The main control unit 301 is a microprocessor unit for controlling the entire broadcast station server 300 in accordance with a predetermined operation program. The system bus 302 is a data communication path for transmitting and receiving data between the main control unit 301 and the respective operation blocks inside the broadcast station server 300. The RAM 304 forms a work area at the time of execution of the respective operation programs.

The storage unit 310 stores a basic operation program 3001 and a content managing/delivering program 3002 and is further provided with a moving image content storage region 3011 and a metadata storage region 3012. The moving image content storage region 3011 stores moving image content or the like of respective broadcast programs to be broadcast by the broadcast station. The metadata storage region 3012 stores metadata such as program titles, program ID's, outlines of the programs, performers, broadcasting date and time, or the like of the respective broadcast programs.

Moreover, the basic operation program 3001 and the content managing/delivering program 3002 which are stored in the storage unit 310 are respectively developed on the RAM 304, and further, the main control unit 301 executes the developed basic operation program and content managing/delivering program, thereby constituting a basic operation execution unit 3101 and a content managing/delivering execution unit 3102.

Note that, in the following, for simplicity of description, a process in which in which the main control unit 301 controls each of operation blocks by developing the basic operation program 3001 stored in the storage unit 310 on the RAM 304 and executing the developed program is described on the assumption that the basic operation execution unit 3101 controls each of operation blocks. With respect to other operation programs, the same description will be given.

The content managing/delivering execution unit 3102 manages moving image content and the like and respective metadata stored in the moving image content storage region 3011 and the metadata storage region 3012, and controls at the time of providing the moving image content and the like and the respective metadata to the service provider based on the contract. Furthermore, upon providing the moving image content and the like and the respective metadata to the service provider, the content managing/delivering execution unit 3102 also carries out an authentication process or the like of the service provider server 400 based on the contract, if necessary.

The LAN communication unit 321 is connected to the Internet 200 and communicates with the service provider server 400 or the like on the Internet 200. It is assumed that the LAN communication unit 321 is provided with an encoding circuit, a decoding circuit, and the like.

[Configuration of Service Provider Server]

Figure 4:
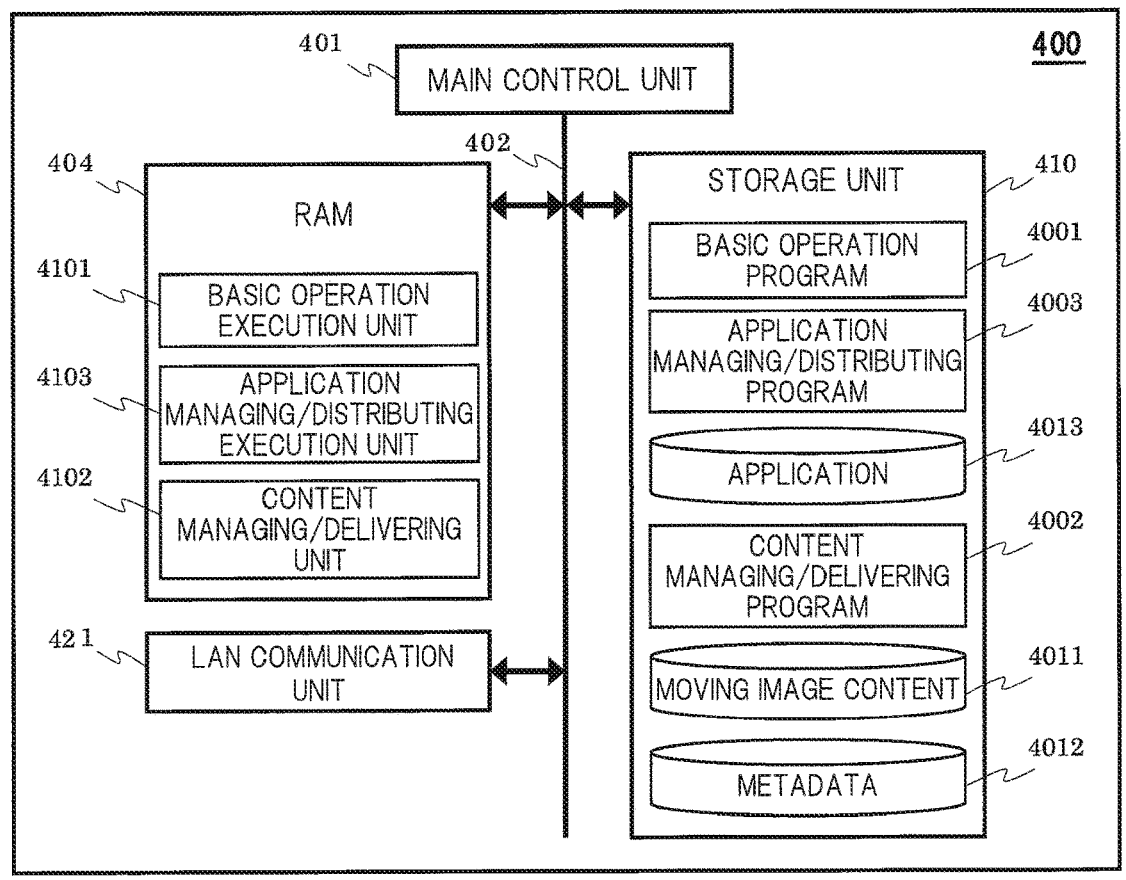
FIG. 4 is a block diagram showing a service provider server in accordance with the first embodiment.

FIG. 4 is a block diagram showing one example of an internal configuration of the service provider server 400. The service provider server 400 is constituted by a main control unit 401, a system bus 402, a RAM 404, a storage unit 410, and a LAN communication unit 421.

The main control unit 401 is a microprocessor unit for controlling the entire service provider server 400 in accordance with a predetermined operation program. The system bus 402 is a data communication path for transmitting and receiving data between the main control unit 401 and the respective operation blocks in the service provider server 400. The RAM 404 forms a work area at the time of execution of the respective operation programs.

The storage unit 410 stores a basic operation program 4001, a content managing/delivering program 4002, and an application managing/distributing program 4003 and is further provided with a moving image content storage region 4011, a metadata storage region 4012, and an application storage region 4013. The moving image content storage region 4011 and the metadata storage region 4012 store moving image content and the like and respective meta data provided by the broadcast station server 300, as well as content produced by the service provider and metadata or the like relating to the content. The application storage region 4013 stores applications required for achieving respective services of the broadcast communication cooperation system to be distributed in response to a request from each of the television receivers.

Moreover, the basic operation program 4001, the content managing/delivering program 4002 and the application managing/distributing program 4003, stored in the storage unit 410, are respectively developed on the RAM 404, and further, the main control unit 401 executes the developed basic operation program, content managing/delivering program, and application managing/distributing program, thereby constituting a basic operation execution unit 4101, a content managing/delivering execution unit 4102, and an application managing/distributing execution unit 4103.

Note that, in the following, for simplicity of description, a process in which in which the main control unit 401 controls each of operation blocks by developing the basic operation program 4001 stored in the storage unit 410 on the RAM 404 and executing the developed program is described on the assumption that the basic operation execution unit 4101 controls each of operation blocks. With respect to other operation programs, the same description will be given.

The content managing/delivering execution unit 4102 acquires moving image content and the like and respective metadata from the broadcast station server 300, manages moving image content and the like and respective metadata stored in the moving image content storage region 4011 and the metadata storage region 4012, and controls the delivery of the moving image content and the like and respective metadata to the respective television receivers. Moreover, the application managing/distributing execution unit 4103 manages the respective applications stored in the application storage region 4013 and controls at the time of distributing the respective applications in response to a request from each of the television receivers. Further, upon distributing the respective applications to each of the television receivers, the application managing/distributing execution unit 4103 also carries out an authentication process or the like on the respective television receivers, if necessary.

The LAN communication unit 421 is connected to the Internet 200 and communicates with the broadcast station server 300 on the Internet 200 as well as with the broadcast receiver 100 and the portable information terminal 700 via the router 210. It is assumed that the LAN communication unit 421 is provided with an encoding circuit, a decoding circuit, and the like.

[Hardware Configuration of Portable Information Terminal]

Figure 5A:
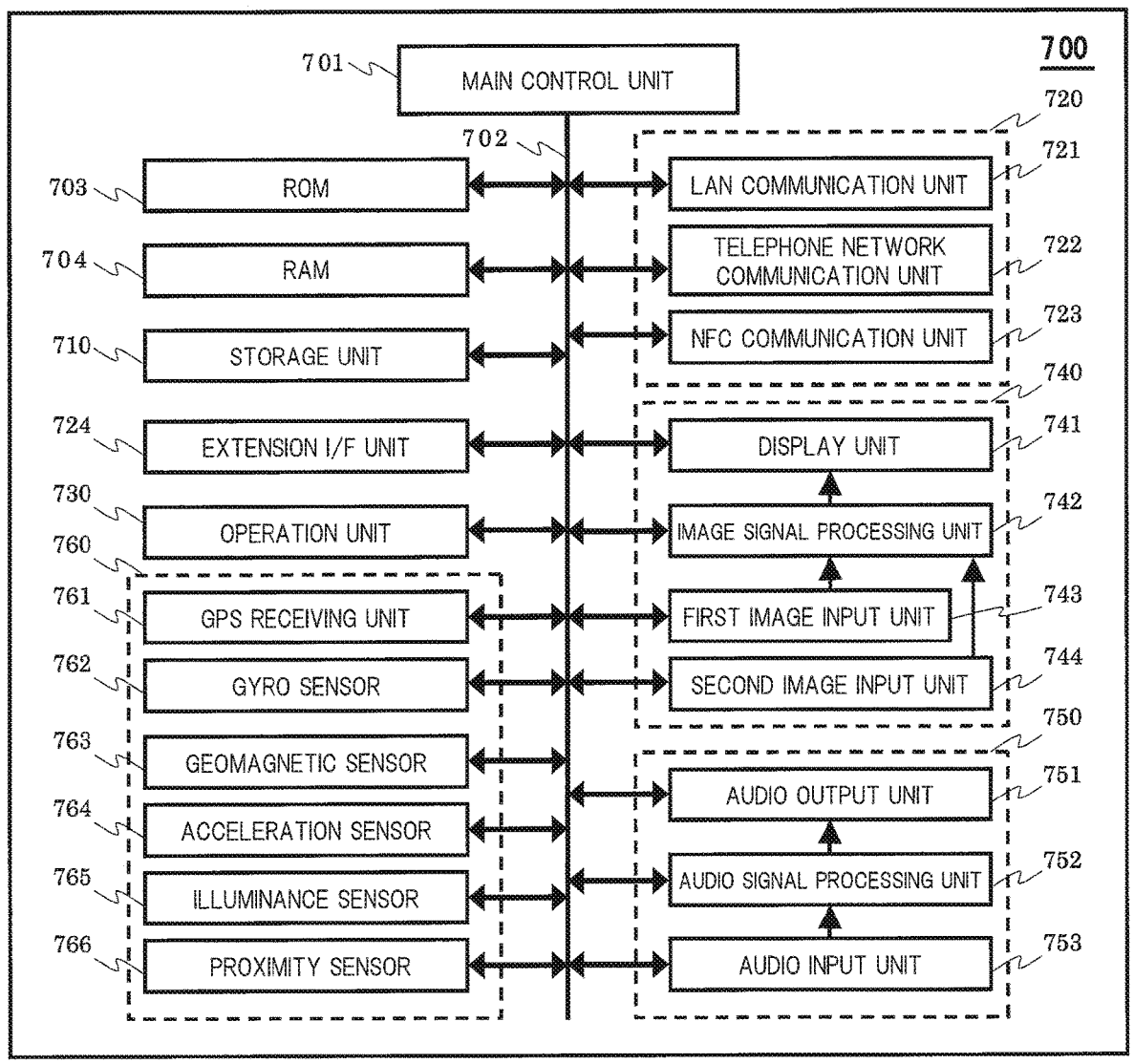
FIG. 5A is a block diagram showing a portable information terminal in accordance with the first embodiment.

FIG. 5A is a block diagram showing one example of the internal configuration of the portable information terminal 700. The portable information terminal 700 is constituted by a main control unit 701, a system bus 702, a ROM 703, a RAM 704, a storage unit 710, a communication processing unit 720, an extension interface unit 724, an operation unit 730, an image processing unit 740, an audio processing unit 750, and a sensor unit 760.

The main control unit 701 is a microprocessor unit for controlling the entire portable information terminal 700. The system bus 702 is a data communication path for transmitting and receiving data between the main control unit 701 and the respective operation blocks in the portable information terminal 700.

The ROM 703 is a memory in which basic operation programs such as an operating system and other operation programs are stored and employs a rewritable ROM such as an EEPROM or a flash ROM, for example. The RAM (Random Access Memory) 704 serves as a work area at the time of executing the basic operation programs or other operation programs. The ROM 703 and RAM 704 may be integrally formed with the main control unit 701. Moreover, the ROM 703 may not have an independent configuration shown in FIG. 5A but may use a part of a storage region in the storage unit 710.

The storage unit 710 stores operation programs and operation set values of the portable information terminal 700 and personal information or the like of users of the portable information terminal 700. Moreover, the storage unit 710 can store operation programs downloaded from the network and various kinds of data and the like formed by those operation programs. Furthermore, the storage unit 710 can store content such as moving images, still images, audio, or the like, downloaded from the network. The entire or a part of the functions of the ROM 703 may be replaced by a part of the region of the storage unit 710. Moreover, the storage unit 710 needs to hold stored information even in a state where no power is supplied from the outside to the portable information terminal 700. Accordingly, a device such as a flash ROM, an SSD, or an HDD, is used.

Note that the respective operation programs stored in the ROM 703 and the storage unit 710 can be updated or extended in their functions by downloading from the respective server devices on the Internet 200.

The communication processing unit 720 is constituted by a LAN communication unit 721, a mobile telephone network communication unit 722, and an NFC communication unit 723. The LAN communication unit 721 is connected to the Internet 200 via the router device 210 to transmit and receive data to and from the respective server devices on the Internet 200. The connection with the router device 210 is made in a wireless connection such as a Wi-Fi (registered trademark) or the like. The mobile telephone network communication unit 722 carries out telephone communications (calls) and data transmission and reception via wireless communication with the base station 600b of the mobile telephone network. The NFC communication unit 723 carries out a wireless communication at the time of being close to a corresponding reader/writer. It is assumed that the LAN communication unit 721, the mobile telephone network communication unit 722, and the NFC communication unit 723 are each provided with an encoding circuit, a decoding circuit, an antenna, or the like. Moreover, the communication processing unit 720 may be further provided with another communication unit such as a Bluetooth (registered trademark) communication unit, or an infrared ray communication unit.

The extension interface unit 724 is a group of interfaces for extending the functions of the portable information terminal 700 and in the present embodiment, is constituted by a video image/audio interface, a USB interface, a memory interface, and the like. The video image/audio interface carries out an input of a video image signal/audio signal from an external video image/audio output device, an output of the video image signal/audio signal into an external video image/audio input device, or the like. The USB interface is connected to a PC or the like to transmit and receive data. Moreover, the USB interface may be used for connection with a keyboard or another USB device. The memory interface is connected to a memory card or another memory medium to transmit and receive data.

The operation unit 730 is an instruction input unit for inputting an operation instruction to the portable information terminal 700 and in the present embodiment, constituted by a touch panel 730t disposed to be overlapped with a display unit 741 and operation keys 730k on which button switches are arranged. Only either one of these may be used. The portable information terminal 700 may be operated by using a keyboard or the like connected to an extended interface unit 724. The portable information terminal 700 may be operated by using a portable terminal device as a separated unit connected by a wire communication or a wireless communication. Moreover, the above-mentioned touch panel function may be also provided in the display unit 741.

The image processing unit 740 is constituted by the display unit 741, an image signal processing unit 742, a first image input unit 743, and a second image input unit 744. The display unit 741 is, for example, a display device such as a liquid crystal panel and provides image data processed in the image signal processing unit 742 to a user of the portable information terminal 700. The image signal processing unit 742 is provided with a video RAM omitted in the drawing, and the display unit 741 is driven based on image data inputted to the video RAM. Moreover, it is assumed that the image processing unit 742 is provided with functions for carrying out a format conversion, a superimposing process of a menu and other OSD (On Screen Display) signals, or the like, if necessary. The first image input unit 743 and the second image input unit 744 are camera units in which image data of an object and the periphery thereof is inputted by converting light inputted from a lens into an electric signal through use of an electronic device such as a CCD (Charge Coupled Device), a CMOS (Complementary Metal Oxide Semiconductor) sensor, or the like.

The audio processing unit 750 is constituted by an audio output unit 751, an audio signal processing unit 752, and an audio input unit 753. The audio output unit 751 is a speaker and provides an audio signal processed in the audio signal processing unit 752 to the user of the portable information terminal 700. The audio input unit 753 is a microphone and converts voice or the like of the user into audio data to be inputted.

The sensor unit 760 is a group of sensors for detecting the state of the portable information terminal 700 and in the present embodiment, is constituted by a GPS receiving unit 761, a gyro sensor 762, a geomagnetic sensor 763, an acceleration sensor 764, an illuminance sensor 765, and a proximity sensor 766. The group of sensors can detect the position, inclination, orientation, and movement of the portable information terminal 700, ambient brightness, proximity states of peripheral objects, and the like. Moreover, the portable information terminal 700 may be further provided with another sensor such as an atmospheric pressure sensor.

The portable information terminal 700 may be a mobile phone, a smart phone, a tablet terminal, or the like. The portable information terminal 700 may also be a PDA (Personal Digital Assistants) or a notebook-type PC. Moreover, the portable information terminal 700 may also be a digital still camera, a video camera capable of capturing moving images, a portable game machine, or the like, or another portable digital device.

Note that, although the configuration example of the portable information terminal 700 shown in FIG. 5A includes many elements such as the sensor unit 760 that are not essential to the present embodiment, even in the configuration in which these elements are not provided, the effects of the present embodiment are not impaired. Moreover, configurations not shown in the drawings such as a digital broadcast receiving function, an electronic money settlement function, or the like, may be further added thereto.

[Software Configuration of Portable Information Terminal]

Figure 5B:
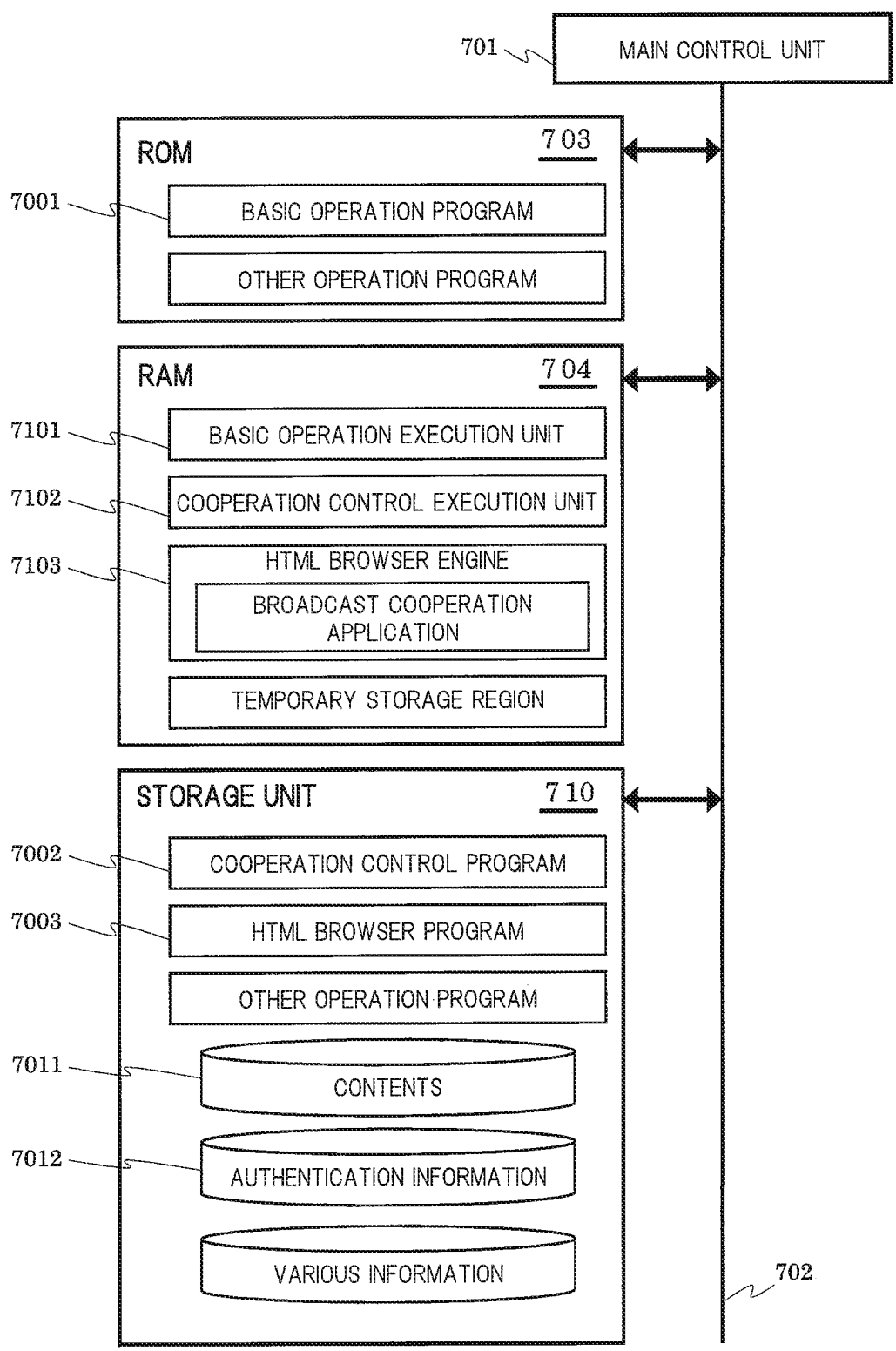
FIG. 5B is a diagram showing a software configuration of the portable information terminal in accordance with the first embodiment.

FIG. 5B is a diagram showing a software configuration of the portable information terminal 700 of the present embodiment and shows software configurations in the ROM 703, the RAM 704, and the storage unit 710. In the present embodiment, a basic operation program 7001 and other operation programs are stored in the ROM 703, and a cooperation control program 7002, an HTML browser program 7003, and other operation programs are stored in the storage unit 710. Moreover, the storage unit 710 is provided with a content storage region 7011 for storing content such as moving images, still images, audio, or the like, an authentication information storage region 7012 for storing authentication information to be used upon carrying out a cooperative operation or the like with a television receiver, and various information storage regions for storing other various information.

The basic operation program 7001 stored in the ROM 703 is developed on the RAM 704, and further, the main control unit 701 executes the developed basic operation program, thereby constituting a basic operation execution unit 7101. Moreover, the cooperation control program 7002 and the HTML browser program 7003 which are stored in the storage unit 710 are each developed on the RAM 704, and further, the main control unit 701 executes the respective developed operation programs, thereby constituting a cooperation control execution unit 7102 and an HTML browser engine 7103. Furthermore, the RAM 704 is provided with a temporary storage region for temporarily storing data formed at the time of executing the respective operation programs, if necessary.

Note that, in the following, for simplicity of description, a process in which the main control unit 701 controls each of operation blocks by developing the basic operation program 7001 stored in the ROM 703 on the RAM 704 and executing the developed program is described on the assumption that the basic operation execution unit 7101 controls each of operation blocks. With respect to other operation programs, the same description will be given.

The cooperation control execution unit 7102 carries out managements such as a device authentication and connection thereof, transmission and reception of respective data, or the like, required when the portable information terminal 700 carries out a linkage operation with a television receiver. The HTML browser engine 7103 is an HTML browser for executing an application produced for a broadcast communication cooperation system on the portable information terminal 700.

The above-mentioned respective operation programs may be preliminarily stored in the ROM 703 and/or the storage unit 710 at the time of shipment of the product. These programs may be acquired from another application server 500 or the like on the Internet 200 via the LAN communication unit 721 or the mobile telephone network communication unit 722 after the shipment of the product. Moreover, the above-mentioned operation programs stored in a memory card, an optical disc, or the like may be acquired via the extension interface unit 724 or the like.

[Outline of Application Control Information (AIT)]

The application control information (AIT) of the present embodiment is an information intended to notify the presence of an application (hereinafter, referred to as "broadcast cooperation application," in some cases) that is in cooperation with a broadcast service relative to a television receiver or the like (in the present embodiment, broadcast receiver 100) in a broadcast communication cooperation function applicable to the broadcast receiver 100, and to instruct its control. Note that the broadcast cooperation application is divided into (1) a broadcast managed application that is operated only in a broadcast receiving status based on a control signal for activation/end or the like included in a broadcast signal and permits access to a broadcast resource based on the control signal, (2) an out-of-broadcast managed application that is used in an operation mode in which activation/end or the like is not controlled by a broadcast signal and permits access to the broadcast resource based on means such as an application authentication or the like, and (3) another general application that does not permit access to the broadcast resource.

With respect to the transmission method of AIT, either one of methods in which AIT of a section format or an XML (eXtensible Markup Language) format is transmitted by a broadcast wave through a data carousel (Data Carousel: DC) system or the like and in which an AIT file of the section format or the XML format is delivered from a server device on the Internet 200 by http (Hypertext Transfer Protocol), https (Hypertext Transfer Protocol Secure), or the like may be used. Other systems may be adopted.

FIG. 6 is a data configuration diagram showing one example of a data configuration of AIT. The AIT is mainly constituted by various pieces of information such as an application type 901, an application identifier 902, an application control code 903, an application profile 904, application acquisition source information 905, application boundary and access privilege setting 906, activation priority 907, cache information 908, server access dispersion parameter 909, or the like. Moreover, other information may be included.

The application type 901 prescribes the description method of the application. In the present embodiment, the description method of the application is HTML. The application identifier 902 is identification information constituted by an organization identification for identifying the provider and an application identification that is assigned to each of the providers, which is used for identifying the application unit. Note that the application unit refers to a set of an HTML document and its reference resource, with an HTML document that is present at a location specified by the application acquisition source information 905 being used as an entry document. The application control code 903 which prescribes an operation control for an object application has one of (1) automatic activation, (2) operable, (3) end, and (4) pre-fetch described therein. The application profile 904 which is a value indicating a function of a television receiver that is requested by the application indicates functions provided in the television receiver as options in combination. With reference to this value, whether or not the application can be utilized is determined.

The application acquisition source information 905 is information for identifying the acquisition source of an application and corresponds to location information used for acquiring an HTML document that is first referred to at the time of activation of an application. Since two cases are assumed for acquiring the application, that is, a case in which the application is transmitted by broadcast and a case in which the application is placed on a server device on a communication network, the location information identified by the application acquisition source information 905 also includes prescriptions applicable to both cases of the broadcast acquisition and the communication acquisition. The application boundary and access privilege setting 906 is information indicating the operable range for the broadcast managed application as a set of one or more regions (URL: Uniform Resource Locator). Moreover, the access privilege to the broadcast resource for each of the regions is set for each functional unit. By the application boundary and access privilege setting 906, the range of document transition is specified to prevent transition to an unexpected document due to a chain of document transitions from the entry document at the time of application activation, an access to an inappropriate broadcast resource, or the like. Furthermore, an access privilege to a particular broadcast resource can be set by a region unit within the range of the document transition.

In a case in which a data broadcast by a broadcast service and a broadcast managed application by an HTML document are simultaneously present, the activation priority 907 prescribes which should be preferentially activated. It is assumed that specification of the data broadcast to be the first priority under no conditions on the PMT, specification of an activation priority order of a particular application type on the PMT, and specification of the activation priority of a target application by the activation priority 907 are possible. The cache information 908 is information for cache control in a case in which an application resource is held in preparation for reuse of the application. By this information, even after the end of an application, a cache operation of the application resource in which the reuse thereof is expected is carried out. The server access dispersion parameter 909 is a parameter set for dispersing accesses in order to reduce loads to a server on which accesses are concentrated as an acquisition source of applications or the like. In accordance with the setting of this parameter, the television receiver may be operated to stochastically delay the application of an application control code.

In the following, operations of the broadcast receiver 100 of the present embodiment will be described.

[Operation Sequence at the Time of Activation of Application]

First, the activation process of a broadcast cooperation application based on the AIT to be transmitted by a broadcast wave in the broadcast receiver 100 of the present embodiment will be described. In a case in which a data broadcast by a broadcast service and a broadcast cooperation application are simultaneously present, the broadcast receiver 100 of the present embodiment can prescribe which should be preferentially activated, based on information on the PMT and information such as the AIT application control code 903 and the activation priority 907.

Figure 7A:
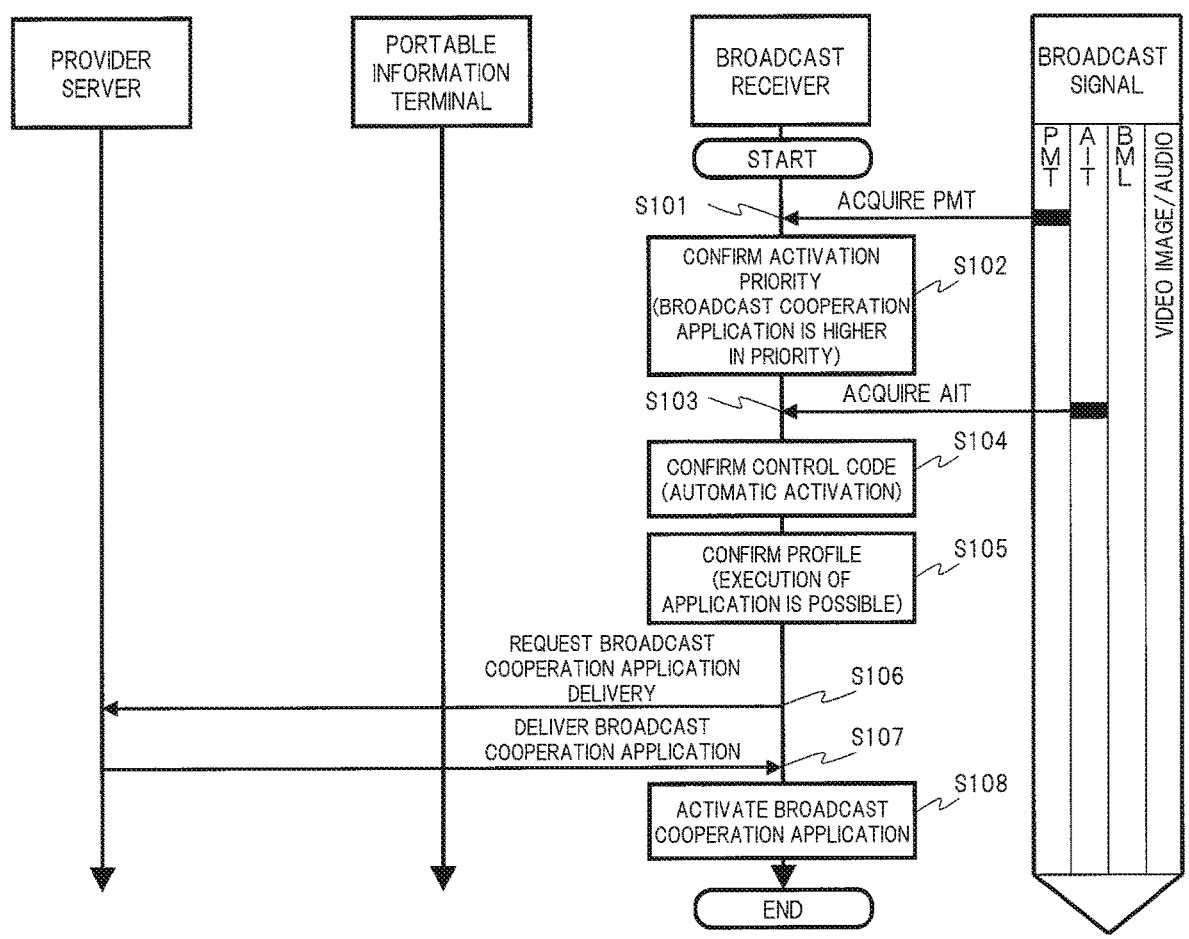
FIG. 7A is a diagram showing an operation sequence at the time of activation of an application in the broadcast receiver in accordance with the first embodiment.

FIG. 7A is an operation sequence diagram showing one example of an operation sequence of a broadcast cooperation application in a case in which the broadcast cooperation application is prescribed to be preferentially activated. FIG. 7A shows a series of flow until the broadcast receiver 100 activates a predetermined broadcast cooperation application after confirming the PMT and the AIT appropriately.

When the tuner/demodulation unit 131 of the broadcast receiver 100 acquires a TS by carrying out a selection process for a channel desired by the user, the main control unit 101 next acquires a PMT data row separated in the first separation unit 132 (S101) to confirm the activation priority described in the PMT. When it is confirmed that the broadcast cooperation application has a high activation priority in the process of S101 (S102), the application control unit 161 acquires the AIT data row separated in the first separation unit 132 (S103) and confirms the application control code 903 of the acquired AIT data row (S104). In a case in which the application control code 903 is "automatic activation" in the process of S104, the application control unit 161 further confirms the application profile 904 of the AIT data row acquired as described above (S105), and in a case in which it is confirmed that the broadcast cooperation application specified by the AIT is executable, based on information described in the application acquisition source information 905, the application control unit 161 transmits a transmission request for the broadcast cooperation application to the predetermined service provider server 400 via the LAN communication unit 121 (S106).

The service provider server 400 that receives the transmission request for the broadcast cooperation application carries out an authentication process on the broadcast receiver 100 based on the control of the application managing/distributing execution unit 4103, if necessary, and then carries out a delivery of the predetermined broadcast cooperation application stored in the application storage region 4013 via the LAN communication unit 421 (S107). Note that, with respect to the above-mentioned authentication process, a generally known method may be used, and the detailed description thereof will be omitted. Next, the application engine 162 of the broadcast receiver 100 activates the predetermined broadcast cooperation application which is delivered by the service provider server 400 and received via the LAN communication unit 121, based on the control of the application control unit 161 (S108).

FIG. 7B is an operation sequence diagram showing one example of an operation sequence of a broadcast cooperation application in a case in which a data broadcast by a broadcast service is prescribed to be preferentially activated. FIG. 7B shows a series of flow until the broadcast receiver 100 activates a predetermined broadcast cooperation application after confirming the PMT and the AIT appropriately.

When the tuner/demodulation unit 131 of the broadcast receiver 100 acquires a TS by carrying out a selection process for a channel desired by the user, the main control unit 101 next acquires a PMT data row separated in the first separation unit 132 (S201) to confirm the activation priority described in the PMT. When it is confirmed that the data broadcast by a broadcast service has a high activation priority in the process of S201 (S202), the data broadcast receiving and processing unit 141 acquires a BML data row separated by the first separation unit 132 and reproduces the BML document (S203). In a case in which the automatic activation of the data broadcast is set by the BML document, if the user requests the activation of the data broadcast by using an operation terminal (portable information terminal 700, remote controller, or the like) (S204), the data broadcast engine 142 generates data broadcast screen information by executing the reproduced BML document and displays the information on the video image display unit 173 (S205).

After the process of S205, or simultaneously as the process of S205, the application control unit 161 acquires the AIT data row separated by the first separation unit 132 (S206) and confirms the application profile 904 of the acquired AIT data row (S207). In the process of S207, it is confirmed that the broadcast cooperation application specified by the AIT can be executed, an entry button to the executable broadcast cooperation application is displayed on the data broadcast screen. The entry button may be always displayed, and only when the broadcast cooperation application is executable, the coloring thereof may be altered from a non-active color to an active color. The non-active state and the active state of the entry button may be switched by altering the shape thereof.

When the user selects the entry button by using the operation terminal (S208), the data broadcast engine 142 terminates the process for generating the data broadcast screen information by executing the BML document (S209). Subsequently, the application control unit 161 acquires the AIT data row separated by the first separation unit 132 (S210) and confirms the application acquisition source information 905 of the acquired AIT data row. Further, based on information described in the application acquisition source information 905 confirmed in S210, the application control unit 161 transmits a transmission request for the broadcast cooperation application to the predetermined service provider server 400, via the LAN communication unit 121 (S211).

The service provider server 400 that receives the transmission request for the broadcast cooperation application carries out an authentication process on the broadcast receiver 100, if necessary, based on the control of the application managing/distributing execution unit 4103 and then, delivers the predetermined broadcast cooperation application stored in the application storage region 4013 via the LAN communication unit 421 (S212). Next, the application engine 162 of the broadcast receiver 100 activates the predetermined broadcast cooperation application which is delivered by the service provider server 400 and received via the LAN communication unit 121, based on the control of the application control unit 161 (S213).

Figure 7C:
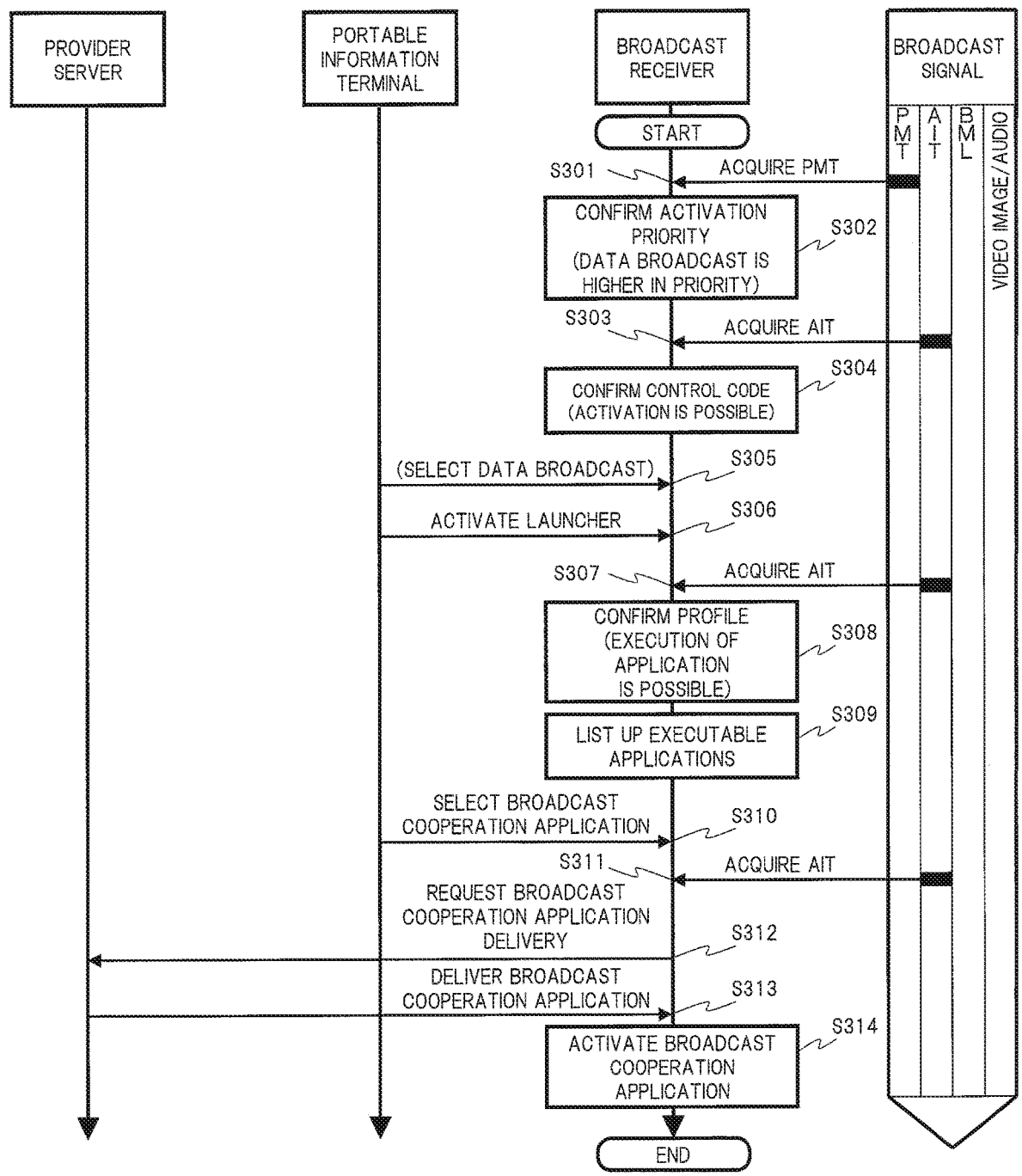
FIG. 7C is a diagram showing an operation sequence at the time of activation of an application in the broadcast receiver in accordance with the first embodiment.

FIG. 7C is an operation sequence diagram showing one example of an operation sequence of a broadcast cooperation application in a case in which no activation with priority is prescribed. FIG. 7C shows a series of flow until the broadcast receiver 100 activates a predetermined broadcast cooperation application after confirming the PMT and the AIT appropriately.

When the tuner/demodulation unit 131 of the broadcast receiver 100 acquires a TS by carrying out a selection process for a channel desired by the user, the main control unit 101 next acquires a PMT data row separated in the first separation unit 132 (S301) to confirm the activation priority described in the PMT. When it is confirmed that the broadcast cooperation application has a high activation priority in the process of S301 (S302), the application control unit 161 acquires the AIT data row separated in the first separation unit 132 (S303) and confirms the application control code 903 of the acquired AIT data row (S304). In the process of S304, the application control code 903 is not "automatic activation," but "activation is possible," it activates neither the data broadcast by a broadcast service nor the broadcast cooperation application, and continues to display a broadcast program.

In a case in which the user requests the activation of a data broadcast by using the operation terminal (S305) after the end of the process of S304, like the process of S205 in FIG. 7B and the subsequent steps, the acquisition of the BML data row, the reproduction of the BML document, the generation of the data broadcast screen information, and the like (omitted in the drawing) are carried out. Meanwhile, in a case in which the user requests the activation of a broadcast cooperation application launcher by using the operation terminal (S306) after the end of the process of S304, the application control unit 161 acquires the AIT data row separated in the first separation unit 132 (S307) and confirms the application profile 904 of the acquired AIT data row (S308). Further, the application control unit 161 displays a list of executable broadcast cooperation applications on the video image display unit 173 as a broadcast cooperation application launcher (S309).

When the user selects a predetermined broadcast cooperation application from the broadcast cooperation application launcher displayed in S309 by using the operation terminal (S310), the application control unit 161 acquires the AIT data row separated in the first separation unit 132 (S311) and confirms the application acquisition source information 905 of the acquired AIT data row. Further, based on information described in the application acquisition source information 905 confirmed in S311, the application control unit 161 transmits a transmission request for a broadcast cooperation application to the predetermined service provider server 400 via the LAN communication unit 121 (S312).

The service provider server 400 that receives the transmission request for the broadcast cooperation application carries out an authentication process on the broadcast receiver 100 based on the control of the application managing/distributing execution unit 4103, if necessary and then, carries out a delivery of the predetermined broadcast cooperation application stored in the application storage region 4013 via the LAN communication unit 421 (S313). Next, the application engine 162 of the broadcast receiver 100 activates the predetermined broadcast cooperation application which is delivered by the service provider server 400 and received via the LAN communication unit 121, based on the control of the application control unit 161 (S314).

Note that, in the activation sequence of the broadcast cooperation application described with reference to FIG. 7A to FIG. 7C, a configuration example in which an AIT is acquired from a broadcast wave is described in any cases; however, an AIT file may be acquired from a predetermined server device specified by an information description of a PMT or the like. Moreover, the acquisition of the broadcast cooperation application may be carried out not from the server device (service provider server 400) on the network, but from the broadcast wave. That is, in a case in which location information described in the application acquisition source information 905 of the AIT indicates a broadcast wave, the application control unit 161 may reproduce an HTML document from an HTML data row transmitted in a data carousel method or the like, separated in the first separation unit 132, and outputted therefrom so that the application engine 162 can execute the reproduced HTML document (broadcast cooperation application).

Note that, when no information for specifying the activation priority in a case in which a data broadcast by a broadcast service and a broadcast cooperation application are simultaneously present on the PMT, the activation priority may be confirmed only by information such as the application control code 903 of the AIT, the activation priority 907, and the like. Similarly, also in a case in which acquisition of the information on the PMT is failed, the activation priority may be confirmed only by information such as the application control code 903 of the AIT, the activation priority 907, and the like. That is, confirmation of the AIT is regularly made without depending on the information on the PMT, and when a broadcast cooperation application specified by "automatic activation" in the application control code 903 of the AIT is present, the activation of the broadcast cooperation application is preferentially carried out, while when broadcast cooperation application specified by "automatic activation" in the application control code 903 of the AIT is not present, the activation of the data broadcast by a broadcast service may be preferentially carried out.

Moreover, in a case in which no response is given from the service provider server 400 for a predetermined period of time or more upon carrying out a delivery request for the broadcast cooperation application in each step S106, S211, and S312, a message such as "Please wait for a while" or the like may be displayed on the video image display unit 173. Alternatively, in this case, a massage for inquiring of the user about cancellation of the execution of the broadcast cooperation application may be displayed.

Furthermore, it is needless to say that the activation sequence of the broadcast cooperation application is not limited by the above-mentioned three patterns, but may be activated by a different sequence.

[Operation Sequence of Portable Information Terminal at the Time of Cooperation]

In the broadcast receiver 100 of the present embodiment, a function extension of the broadcast communication cooperation service is possible by a cooperative operation between the broadcast receiver 100 and the portable information terminal 700. For example, by installing an application (cooperation control application) prepared by the television receiver maker, the portable information terminal 700 can be used as a highly functional remote controller for the broadcast receiver 100. Moreover, by executing the broadcast cooperation application also on the portable information terminal 700, a service in cooperation with a broadcast program currently displayed on the broadcast receiver 100 can be displayed also on the portable information terminal 700, for example. Note that, in order to carry out a function expansion by the cooperative operation between the broadcast receiver 100 and the portable information terminal 700, the above-mentioned cooperation control application is desirably activated on the portable information terminal 700, and it is assumed that the broadcast cooperation application to be operated on the portable information terminal 700 is operated by being controlled by the cooperation control application.

Figure 8A:
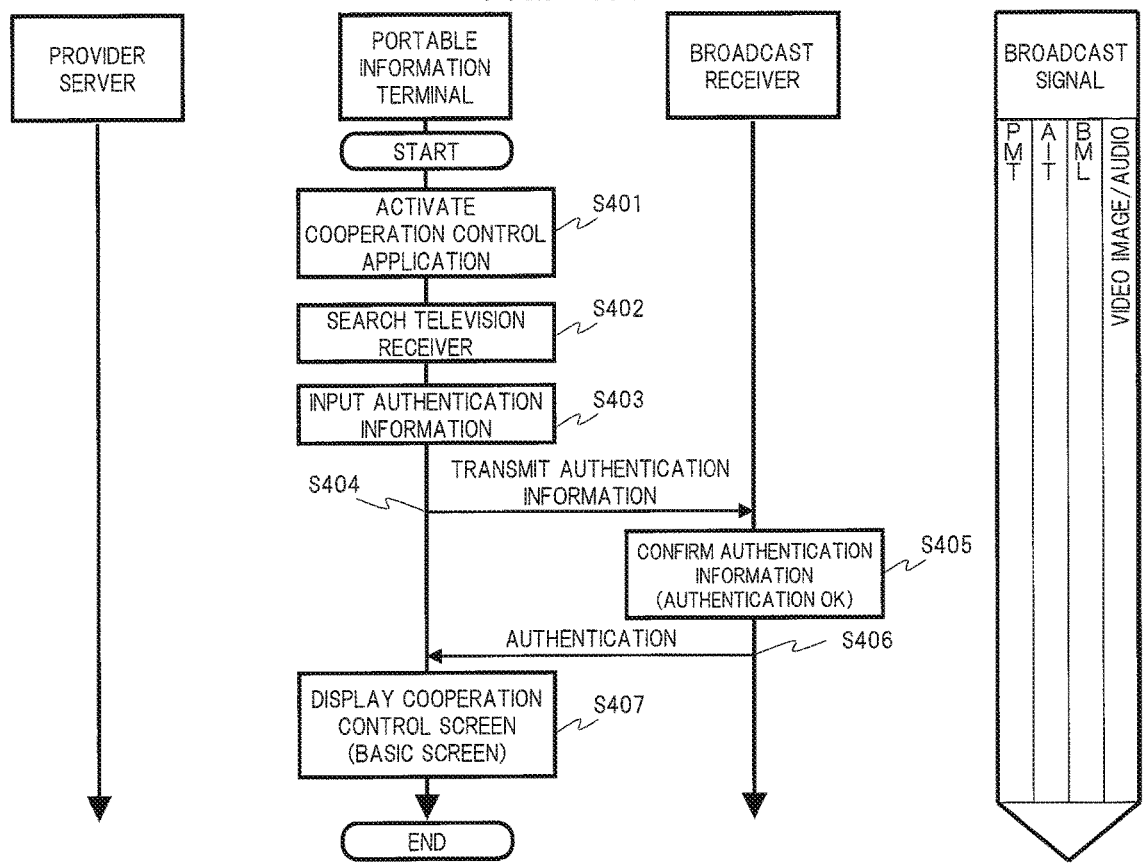
FIG. 8A is a diagram showing an operation sequence when the portable information terminal of the first embodiment is cooperatively used.

FIG. 8A is an operation sequence diagram showing one example of an operation sequence in activating the cooperation control application on the portable information terminal 700. FIG. 8A shows a series of flow (first time) until a cooperative operation becomes possible after the portable information terminal 700 carries out an authentication process with the broadcast receiver 100. Note that it is assumed that the cooperation control application is preliminarily installed in the storage unit 710 of the portable information terminal 700 as a cooperation control program 7002.

When the user gives an instruction for activation of the cooperation control application on the portable information terminal 700 (S401), the cooperation control execution unit 7102 of the portable information terminal 700 searches television receivers that can carry out communication (cooperative operation) on the network (S402) and displays the search results on the display unit 741 as a list of the television receivers. When the television receivers that can carry out communication are not found, the corresponding message is displayed to terminate the process. When the user selects a desired television receiver (broadcast receiver 100 in the present embodiment) from the list of television receivers, the cooperation control execution unit 7102 displays a log-in screen for connecting to the broadcast receiver 100 on the display unit 741. When the user inputs authentication information (log-in name, password, and the like specified by the broadcast receiver 100) to the log-in screen via the operation unit 730 (S403), the cooperation control execution unit 7102 stores the inputted authentication information in the authentication information storage region 7012 and simultaneously transmits to the broadcast receiver 100 (S404). Note that the transmitting process of the authentication information to the broadcast receiver 100 may be carried out via the LAN communication unit 721 and the router device 210 or may be directly carried out onto the broadcast receiver 100 via the NFC communication unit 723.

The terminal cooperation control unit 191 of the broadcast receiver 100 which receives the authentication information via the LAN communication unit 121 confirms whether or not the authentication information thus received is correct by referring to the authentication information storage region 1012 (S405). In a case in which the received authentication information is confirmed to be correct as a result of the process of S405, the terminal cooperation control unit 191 stores the information of the portable information terminal 700 in the authentication information storage region 1012 and also carries out an authentication process on the portable information terminal 700 (S406). The portable information terminal 700 authenticated by the broadcast receiver 100 displays a basic screen (for example, highly functional remote control screen) of the cooperation control application on the display unit 741 (S407). In a case in which the received authentication information is not confirmed to be correct in S405, the terminal cooperation control unit 191 of the broadcast receiver 100 returns an error to the portable information terminal 700. According to the above-mentioned process, the cooperative operation between the broadcast receiver 100 and the portable information terminal 700 becomes possible.

Figure 8B:
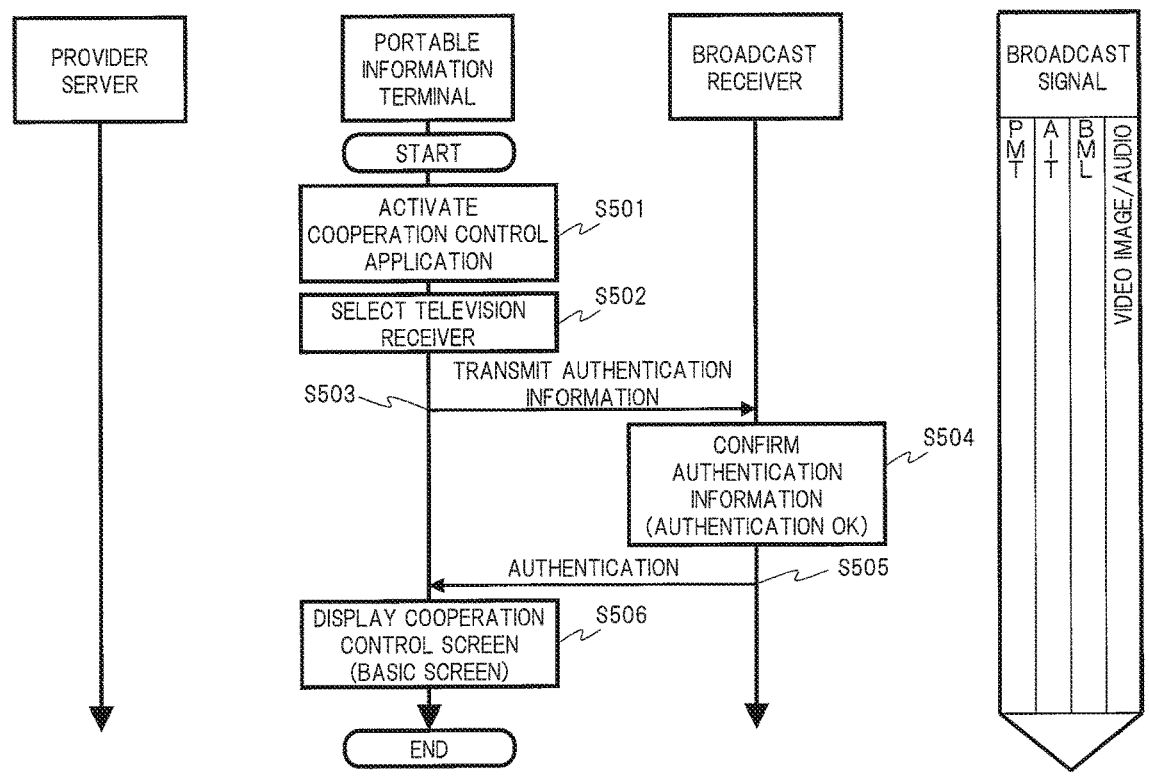
FIG. 8B is a diagram showing an operation sequence when the portable information terminal of the first embodiment is cooperatively used.

FIG. 8B is an operation sequence diagram showing one example of an operation sequence in activating the cooperation control application on the portable information terminal 700. FIG. 8B shows a series of flow (second time and thereafter) until a cooperative operation becomes possible after the portable information terminal 700 carries out an authentication process with the broadcast receiver 100.

When the user gives an instruction for activation of the cooperation control application on the portable information terminal 700 (S501), the cooperation control execution unit 7102 of the portable information terminal 700 searches television receivers that can carry out communication on the network and displays the search results on the display unit 741 as a list of the television receivers. When television receivers that can carry out communication are not found, the corresponding message is displayed to terminate the process. A desired television receiver (broadcast receiver 100 in the present embodiment) is selected from the list of television receivers by the user (S502), and when the selected broadcast receiver 100 is an device that has been connected (cooperative operation) therewith in the past, the cooperation control execution unit 7102 reads out the authentication information of the broadcast receiver 100 from the authentication information storage region 7012 to transmit the information to the broadcast receiver 100 (S503).

The terminal cooperation control unit 191 of the broadcast receiver 100 which receives the authentication information via the LAN communication unit 121 confirms whether or not the received authentication information is correct by referring to the authentication information storage region 1012 (S504). In a case in which the received authentication information is confirmed to be correct as a result of the process of S504, the terminal cooperation control unit 191 authenticates the portable information terminal 700 (S505). The portable information terminal 700 thus authenticated by the broadcast receiver 100 displays a basic screen of the cooperation control application on the display unit 741 (S506). According to the above-mentioned process, the cooperative operation between the broadcast receiver 100 and the portable information terminal 700 becomes possible.

Note that, in a case in which the broadcast cooperation application is activated in the broadcast receiver 100, subsequently to the processes in FIG. 8A and FIG. 8B, processes in FIG. 7A to FIG. 7C can be carried out after the processes in FIG. 8A and FIG. 8B.

Figure 8C:
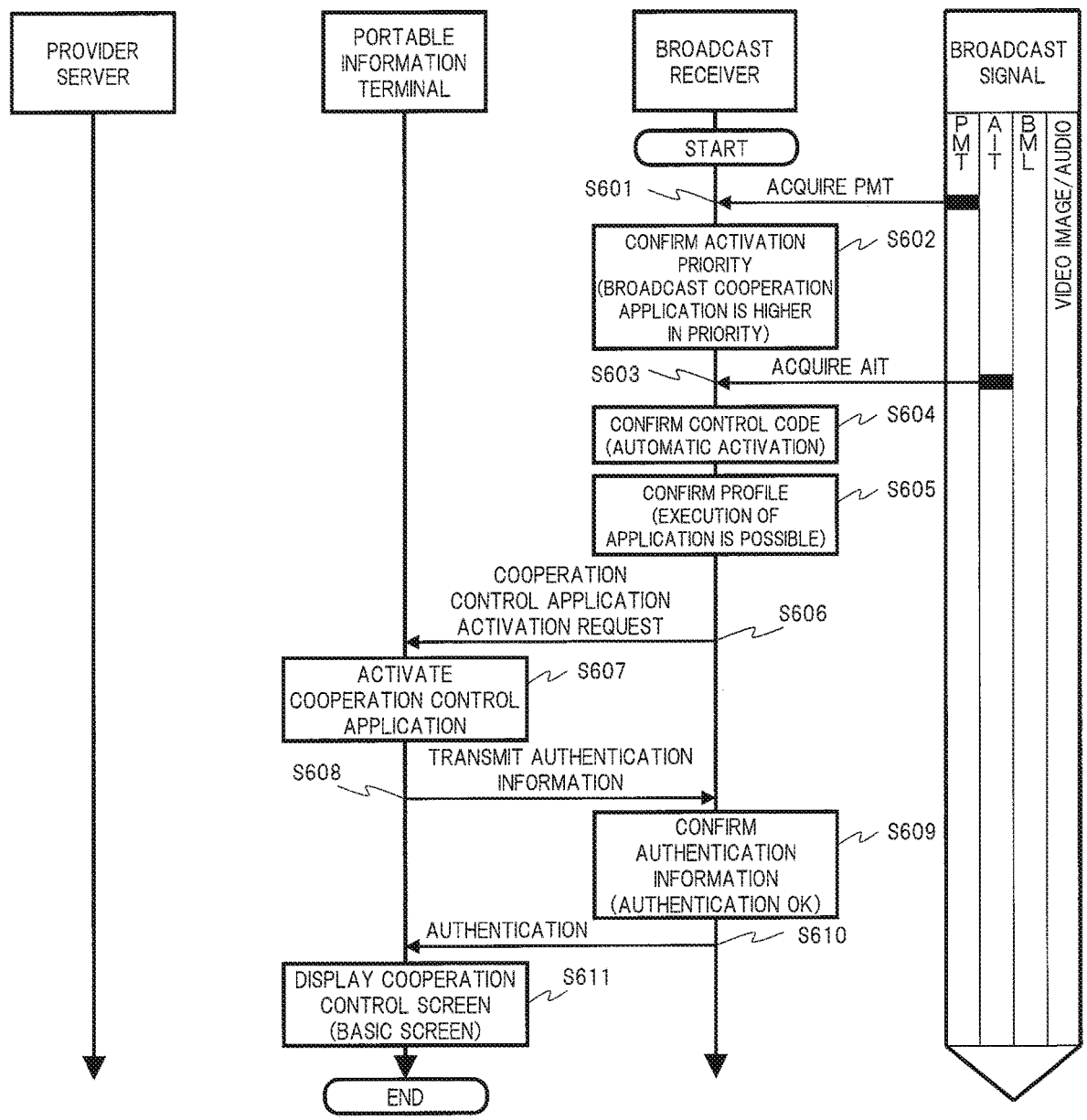
FIG. 8C is a diagram showing an operation sequence when the portable information terminal of the first embodiment is cooperatively used.

FIG. 8C is an operation sequence diagram showing one example of an operation sequence in activating the cooperation control application on the portable information terminal 700. FIG. 8C shows a series of flow (second time and thereafter) until a cooperative operation becomes possible after the portable information terminal 700 carries out an authentication process with the broadcast receiver 100. In this case, this figure exemplifies a case in which the activation of the cooperation control application is requested on the portable information terminal 700 by the broadcast receiver 100 that executes the activation sequence of the broadcast cooperation application.

When the tuner/demodulation unit 131 of the broadcast receiver 100 acquires a TS by carrying out a selection process for a channel desired by the user, the main control unit 101 next acquires a PMT data row separated in the first separation unit 132 (S601) to confirm the activation priority described in the PMT. When it is confirmed that the broadcast cooperation application has a high activation priority in the process of S601 (S602), the application control unit 161 acquires the AIT data row separated in the first separation unit 132 (S603) and confirms the application control code 903 of the acquired AIT data row (S604). In the process of S604, the application control code 903 is "automatic activation," the application control unit 161 further confirms the application profile 904 of the acquired AIT data row (S605). In the process of S605, the execution of the broadcast cooperation application specified by the AIT is confirmed to be possible, and further, when it is determined that the cooperation control of the portable terminal device is required, the terminal cooperation control unit 191 refers to the authentication information storage region 1012, thereby selecting the portable information terminal 700 as the portable terminal device to transmit a cooperation control application activation request to the selected portable information terminal 700 (S606).

Note that the selection of the portable information terminal 700 resulted from referring to the authentication information storage region 1012 may be carried out based on the newest information in the authentication information storage region 1012, or based on information which is most frequently used in the authentication information storage region 1012.

Moreover, in the process of S606, in a case in which no portable information terminal device to which the cooperation control application activation request is to be transmitted is found, the corresponding message may be displayed on the video image display unit 173. Alternatively, in this case, a message for inquiring of the user as to the cancellation of the execution of the broadcast cooperation application may be displayed.

The main control unit 701 of the portable information terminal 700 activates the cooperation control application (cooperation control execution unit 7102), in accordance with the cooperation control application activation request received via the LAN communication unit 721 (S607), and the cooperation control execution unit 7102 further reads out the authentication information of the broadcast receiver 100 from the authentication information storage region 7012 to transmit the information to the broadcast receiver 100 (S608).

The terminal cooperation control unit 191 of the broadcast receiver 100 which receives the authentication information via the LAN communication unit 121 confirms whether or not the received authentication information is correct by referring to the authentication information storage region 1012 (S609). In a case in which the received authentication information is confirmed to be correct as a result of the process of S609, the portable information terminal 700 is authenticated (S610). The portable information terminal 700 authenticated by the broadcast receiver 100 displays a basic screen of the cooperation control application on the display unit 741 (S611). According to the above-mentioned process, a cooperative operation between the broadcast receiver 100 and the portable information terminal 700 becomes possible.

Figure 9:
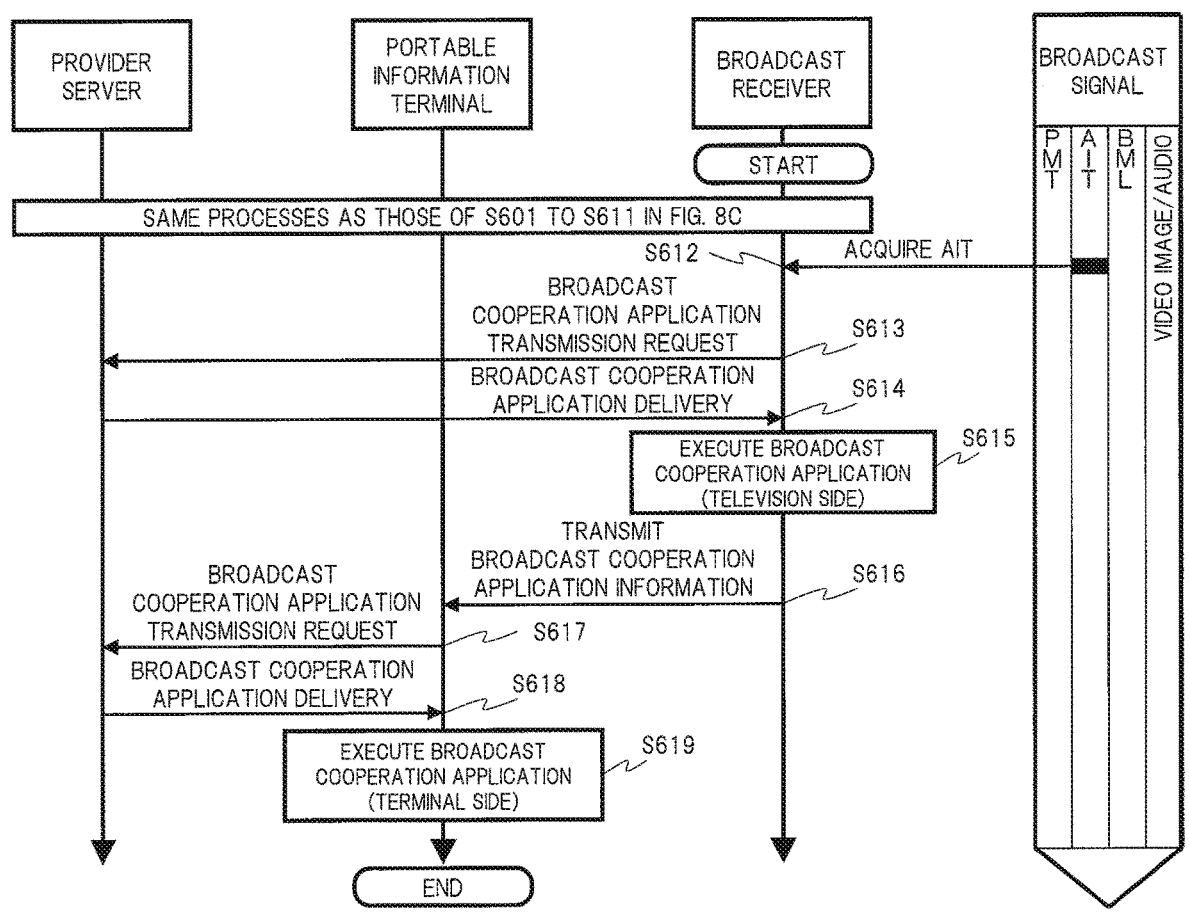
FIG. 9 is a diagram showing an operation sequence at the time of activation of an application in the broadcast receiver and the portable information terminal in accordance with the first embodiment.

Note that, in a case in which the broadcast cooperation application is executed in both of the broadcast receiver 100 and the portable information terminal 700 subsequently to the above-mentioned processes, processes shown in FIG. 9 may be carried out. FIG. 9 is an operation sequence diagram showing one example of an activation sequence of the broadcast cooperation application of the broadcast receiver 100 and the portable information terminal 700.

That is, after the processes of S601 to S611 shown in FIG. 8C, the application control unit 161 of the broadcast receiver 100 acquires an AIT data row separated in the first separation unit 132 (S612) and confirms the application acquisition source information 905 of the acquired AIT data row. Further, based on information described in the application acquisition source information 905 confirmed in S612, the application control unit 161 transmits a transmission request for the broadcast cooperation application (television side) to the predetermined service provider server 400 via the LAN communication unit 121 (S613).

The service provider server 400 that has received the transmission request for the broadcast cooperation application (television side) carries out an authentication process on the broadcast receiver 100 based on the control of the application managing/distributing execution unit 4103, if necessary, and then carries out a delivery of the predetermined broadcast cooperation application (television side) stored in the application storage region 4013 via the LAN communication unit 421 (S614). The application engine 162 of the broadcast receiver 100 activates the predetermined broadcast cooperation application (television side) which is delivered by the service provider server 400 and received via the LAN communication unit 121, based on the control of the application control unit 161 (S615).

Next, the terminal cooperation control unit 191 of the broadcast receiver 100 transmits the acquisition source URL information or the like of the broadcast cooperation application (terminal side) to be executed in the portable information terminal 700, acquired from the AIT or the broadcast cooperation application (television side) executed in S615, to the portable information terminal 700 (S616). The cooperation control execution unit 7102 of the portable information terminal 700 transmits a transmission request for the broadcast cooperation application (terminal side) to the predetermined service provider server 400 via the LAN communication unit 721, based on the acquisition source URL information or the like of the broadcast cooperation application (terminal side) received via the LAN communication unit 721 (S617).

The service provider server 400 that receives the transmission request for the broadcast cooperation application (terminal side) carries out an authentication process on the portable information terminal 700, if necessary, based on the control of the application managing/distributing execution unit 4103 and then, delivers the predetermined broadcast cooperation application (terminal side) stored in the application storage region 4013 via the LAN communication unit 421 (S618). The HTML browser engine 7103 of the portable information terminal 700 activates the predetermined broadcast cooperation application (terminal side) which is delivered by the service provider server 400 and received via the LAN communication unit 721 (S619).

Note that the acquisition of an AIT file is possible from a predetermined server, the acquisition of the broadcast cooperation application can be carried out not from the server device on the network, but from a broadcast wave, and the like are the same as those of the operation sequence shown in FIG. 7A to 7C. Note that, in a case in which the acquisition of the broadcast cooperation application is carried out from the broadcast wave, the broadcast receiver 100 may be designed to acquire the broadcast cooperation application (terminal side) to be executed in the portable information terminal 700 and to transfer the acquired broadcast cooperation application (terminal side) to the portable information terminal 700 via the communication unit 121. Alternatively, the broadcast receiver 100 may be designed to acquire the broadcast cooperation application (terminal side) to be executed in the portable information terminal 700 and store in the storage unit 110, and in the process of S616 in FIG. 9, to transmit location information in the storage unit 110 of the broadcast receiver 100 as URL information to be transmitted to the portable information terminal 700. The broadcast receiver 100 may be designed to acquire the broadcast cooperation application (television side) from a broadcast wave, and the portable information terminal 700 may be designed to acquire the broadcast cooperation application (terminal side) from a server device on the network. By using a digital broadcast receiving function included in the portable information terminal 700, the acquisition of the broadcast cooperation application (terminal side) can be directly carried out from a broadcast wave.

Moreover, the operation sequences shown in FIG. 7A to FIG. 7C, FIG. 8A to FIG. 8C, and FIG. 9 may be partially combined with one another appropriately, and partial operation steps may be appropriately replaced with other operation steps in the order or may be simultaneously operated with other operation steps, for example.

[Basic Screen of Cooperation Control Application of Portable Information Terminal]

Figure 10A:
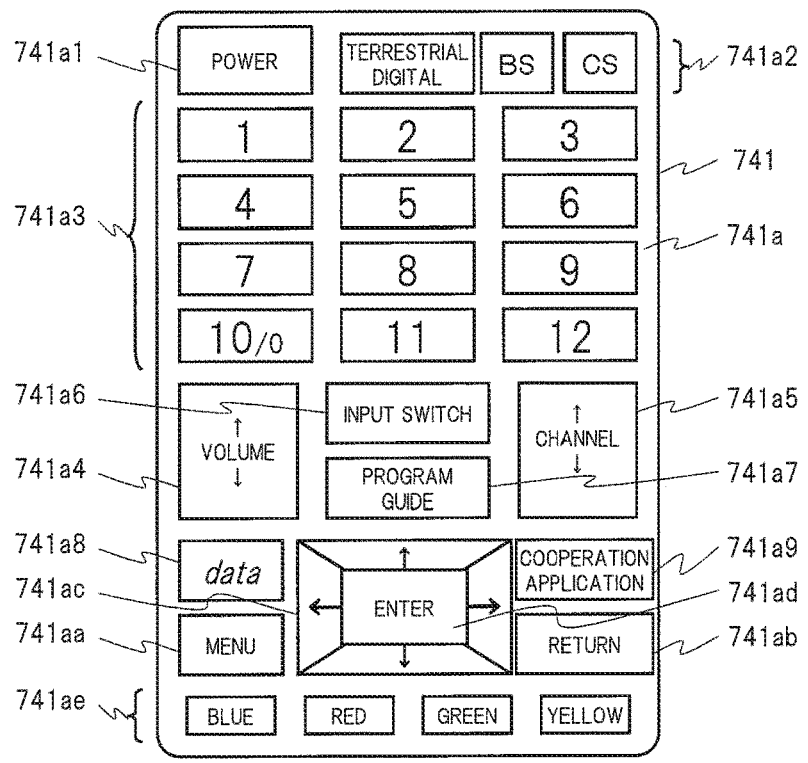
FIG. 10A is a screen display view showing a basic screen of a cooperation control application in the portable information terminal in accordance with the first embodiment.

FIG. 10A is a screen display view showing one example of a basic screen of a cooperation control application displayed in the process of S407 in FIG. 8A, the process of S506 in FIG. 8B, the process of S611 in FIG. 8C, and the like. In the present embodiment, it is assumed that a basic screen 741a of a cooperation control application is provided with functions as a highly functional remote controller corresponding to the broadcast receiver 100.

As shown in FIG. 10A, the basic screen 741a of the cooperation control application is constituted by a power-supply key 741a1, network selection keys (digital terrestrial broadcast, BS, and CS) 741a2, numeral keys (1 to 12) 741a3, volume UP/DOWN key 741a4, channel UP/DOWN key 741a5, input switching key 741a6, program guide key 741a7, data key 741a8, cooperation application key 741a9, menu key 741aa, return key 741ab, cursor keys (up, down, left, right) 741ac, enter key 741ad, and color keys (blue, red, green, yellow) 741ae. Other operation keys may be further displayed.

When the above-mentioned respective operation keys are set to have the same key arrangements/operations as those of an exclusive remote controller attached to the broadcast receiver 100, improved usability can be achieved. Moreover, since the power-supply key 741a1, the network selection keys 742a2, the numeral keys 741a3, and the like are supposed to have the same functions as the operation keys of a generally known television remote controller, the detailed descriptions thereof are omitted. The cooperation application key 741a9 is an operation key specially prepared for the broadcast cooperation communication function of the present embodiment.

Note that, in the processes of S204 in FIG. 7B and of S305 in FIG. 7C, by selecting the data key 741a8, the activation/end of data broadcast can be carried out. Moreover, in the processes of S208 in FIG. 7B and of S310 in FIG. 7C, by operating the cursor key 741ac and the enter key 741ad, selection can be made among the executable broadcast cooperation applications. Furthermore, in the processes of S306 in FIG. 7C, by selecting the cooperation application key 741a9, an activation request for a broadcast cooperation application launcher can be carried out.

In this manner, by preparing the cooperation application key 741a9 or another operation key having the same function on the basic screen 741a of the cooperation control application, the respective broadcast cooperation applications to be used in the broadcast cooperation system of the present embodiment can be easily selected/activated. Moreover, the cooperation application key 741a9 or another operation key having the same function may be installed in the exclusive remote controller attached to the broadcast receiver 100.

Figure 10B:
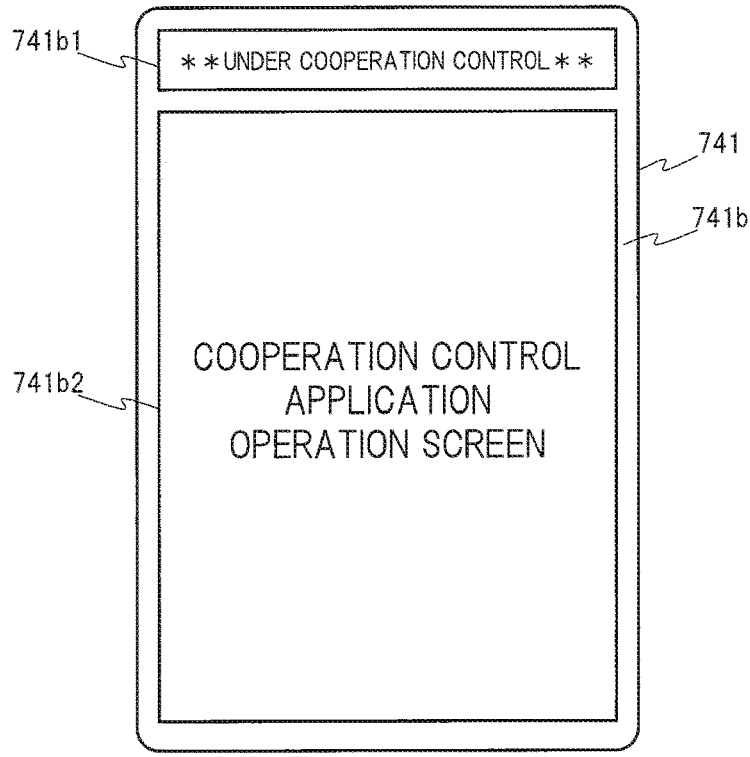
FIG. 10B is a screen display view showing the basic screen of the cooperation control application in the portable information terminal in accordance with the first embodiment.

FIG. 10B is a screen display view showing one example of a basic screen of a cooperation control application displayed in the process of S407 in FIG. 8A, the process of S506 in FIG. 8B, the process of S611 in FIG. 8C, and the like, which is different from the example of FIG. 10A.

The basic screen 741b of the cooperation control application is constituted by a message 741b1 under cooperation control and a cooperation control application operation screen 741b2. Other objects may be further displayed. The message 741b1 under cooperation control is a message display for allowing the user to recognize that the portable information terminal 700 is in cooperative operation with the broadcast receiver 100. The cooperation control application operation screen 741b2 corresponds to a region in which a desired screen display is carried out by the cooperation control application, and detailed description thereof will be omitted in the present embodiment. For example, the configuration in the cooperation control application operation screen 741b2 may be the same as the configuration of the basic screen 741a of the above-mentioned cooperation control application. A sub-screen or the like of a broadcast program displayed on the broadcast receiver 100 may be displayed.

As shown in FIG. 10B, by displaying the message 741b1 under cooperation control as shown in FIG. 10B, the user of the portable information terminal 700 can easily understand that the portable information terminal 700 is in cooperative operation with the broadcast receiver 100. Note that the message 741b1 under cooperation control may be indicated by not only a character display but also a symbol display, a graphic display, or the like. A difference in background color or the like may be used in place of the message 741b1 under cooperation control.

[Data Broadcast Screen of Broadcast Receiver]

Figure 11:
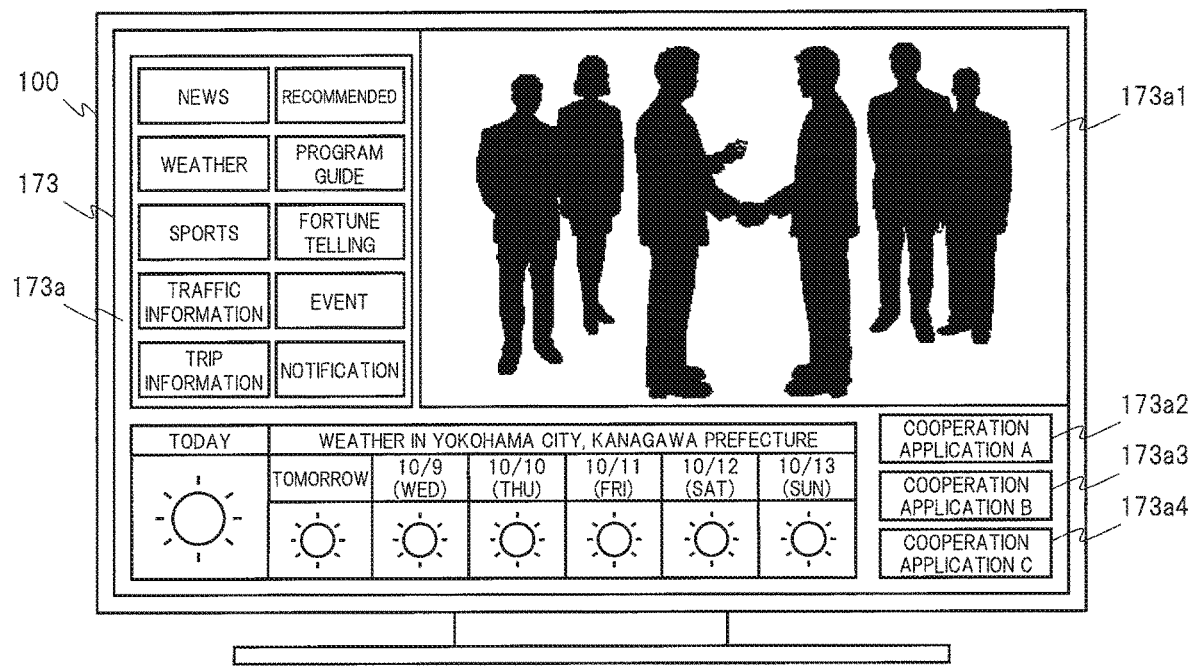
FIG. 11 is a screen display view showing a data broadcast screen in the broadcast receiver in accordance with the first embodiment.

FIG. 11 is a screen display view showing one example of a data broadcast screen displayed as a result of the process of S205 in FIG. 7B. In the present embodiment, three broadcast cooperation applications including a cooperation application A, a cooperation application B, and a cooperation application C are set in an executable state in the broadcast receiver 100 by the description of AIT or the like. In this case, an entry button 173a2 of the cooperation application A, an entry button 173a3 of the cooperation application B, and an entry button 173a4 of the cooperation application C are displayed at desired positions on the data broadcast screen 173a.

On the data broadcast screen 173a shown in FIG. 11, when the entry button 173a2, the entry button 173a3, the entry button 173a4, or the like is selected by using the cursor key 741ac and the enter key 741ad of the basic screen 741a of the cooperation control application, the display of the data broadcast screen 173a is terminated, and the cooperation application A, the cooperation application B, the cooperation application C, or the like is activated by the control of the application control unit 161 and the application engine 162.

Note that, upon displaying the data broadcast screen 173a, the frame color, internal color, shape, character shape, size, flickering status, or the like of each entry button may be altered appropriately, depending on the kinds of the broadcast cooperation applications, security status, or the like. For example, in a case in which the cooperation application A is a broadcast managed application, the frame color of the entry button 173a2 is set to a blue, in a case in which the cooperation application B is an out-of-broadcast managed application, the frame color of the entry button 173a3 is set to a yellow, and in a case in which the cooperation application C is a general application, the frame color of the entry button 173a4 is set to a red, and the like. Alternatively, in a case in which it is determined that the cooperation application A is reliable in terms of security, the frame color of the entry button 173a2 is set to a blue, in a case in which it is determined that the cooperation application B is not necessarily reliable in terms of security, the frame color of the entry button 173a3 is set to a yellow, and in a case in which it is determined that the cooperation application C is dangerous in terms of security, the frame color of the entry button 173a4 is set to a red, and the like.

In addition, depending on functions and genres of the broadcast cooperation applications or depending on the expiration date for use or the like of the respective broadcast cooperation applications, the frame color, internal color, shape, character shape, size, flickering status, or the like of each entry button may be altered appropriately. Depending on whether or not the broadcast cooperation application has been acquired from the network or the like, the frame color, internal color, shape, character shape, size, flickering status, or the like of each entry button may be altered appropriately. For example, in a case in which the cooperation application A has already been acquired from the network (has already been cached in the RAM 104 or the storage unit 110), the frame color of the entry button 173a2 is set to a blue, in a case in which the cooperation application B is being acquired, the frame color of the entry button 173a3 is set to a yellow, and in a case in which the cooperation application C has not been acquired, the frame color of the entry button 173a4 is set to a red, and the like.

By using this arrangement, the user of the broadcast receiver 100 can easily understand the kind, security status, or the like of the executable broadcast cooperation application in the broadcast receiver 100.

[Broadcast Cooperation Application Launcher Screen of Broadcast Receiver]

Figure 12A:
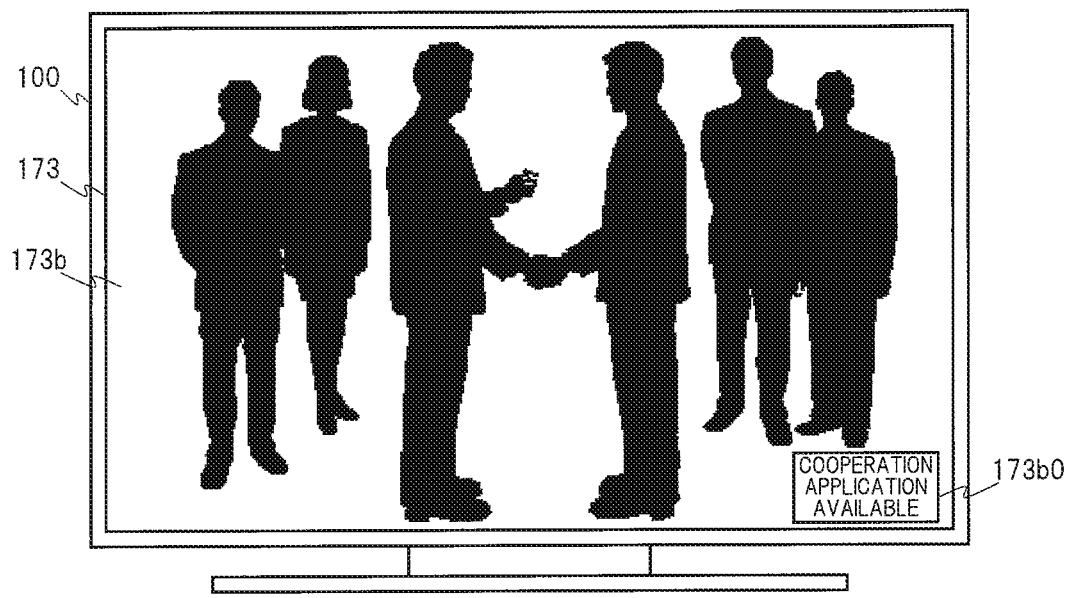
FIG. 12A is a screen display view showing a notification screen in the broadcast receiver in accordance with the first embodiment.

FIG. 12A is a screen display view showing one example of a notification screen for allowing the user to recognize that there is a broadcast cooperation application that can be activated in the broadcast receiver 100 of the present embodiment.

For example, in the operation sequence shown in FIG. 7C, after the process of S304, the display of a broadcast program is continuously given without any activation of a data broadcast by a broadcast service and a broadcast cooperation application. Meanwhile, in this case, by displaying the icon 173b0 shown in FIG. 12A in order to allow the user to recognize that there is a broadcast cooperation application that can be activated, improved usability in the broadcast receiver 100 is achieved. That is, by displaying the icon 173b0, it becomes possible to prevent the user from failing to see the broadcast cooperation application that can be activated.

Note that the display position of the icon 173b0 may be placed at any desired position on the screen; however, the position is desirably set to a position that does not disturb viewing of a broadcast program. For example, the position is set to each of four corners of the screen or the like. Moreover, the icon 173b0 may be indicated by a character display shown in FIG. 12A or may be indicated by a symbol display, a graphic display, or the like. Furthermore, the icon 173b0 may be always displayed or may be displayed only during a predetermined period of time after turning on the power or switching channels. Alternatively, the display thereof may be given simultaneously as the program information, the channel number, or the like is displayed.

Figure 12B:
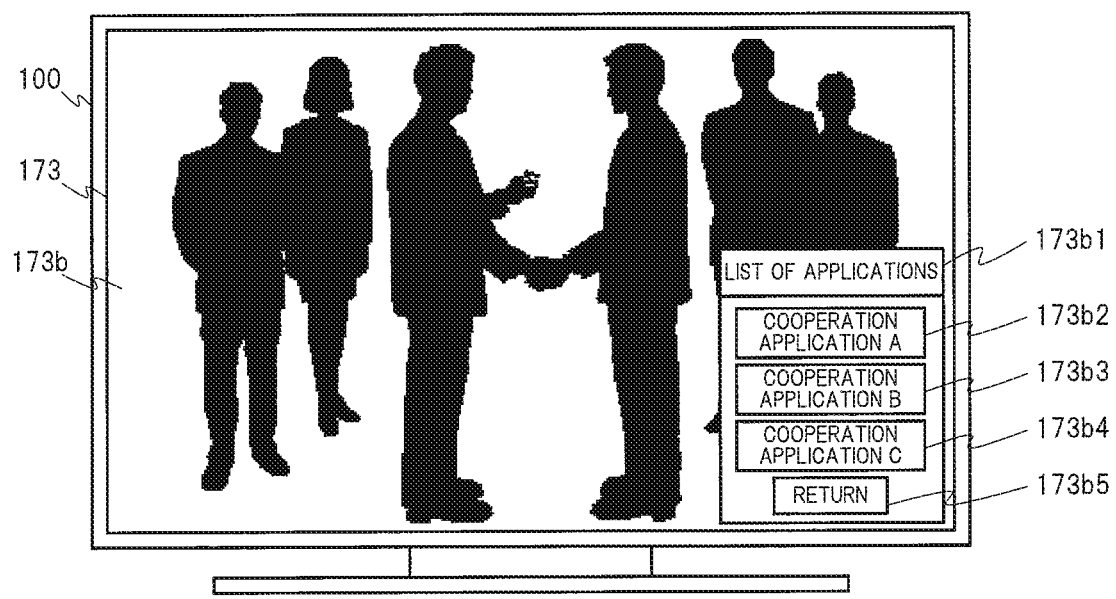
FIG. 12B is a screen display view showing a broadcast cooperation application launcher in the broadcast receiver in accordance with the first embodiment.

FIG. 12B is a screen display view showing one example of a broadcast cooperation application launcher to be displayed as a result of the process of S306 in FIG. 7C. In the present embodiment, three broadcast cooperation applications including a cooperation application A, a cooperation application B, and a cooperation application C are set in an executable state in the broadcast receiver 100 by the description of AIT or the like. In this case, a broadcast cooperation application launcher 173b1 is displayed at a desired position on a broadcast program screen 173b, and an entry button 173b2 of the cooperation application A, an entry button 173b3 of the cooperation application B, an entry button 173b4 of the cooperation application C, and a return button 173b5 are further displayed in the broadcast cooperation application launcher 173b1.

In a state where the broadcast cooperation application launcher 173b1 shown in FIG. 12B is displayed, when the entry button 173b2, the entry button 173b3, the entry button 173b4, or the like is selected by using the cursor key 741ac and the enter key 741ad of the basic screen 741a of the cooperation control application, the cooperation application A, the cooperation application B, the cooperation application C, or the like is activated by the control of the application control unit 161 and the application engine 162. In a case in which the return button 173b5 is selected, the display of the broadcast cooperation launcher 173b1 is terminated.

Note that the point that the frame color, internal color, shape, character shape, size, flickering status, or the like of each entry button may be altered appropriately upon displaying the broadcast cooperation launcher 173b1 on the broadcast program screen 173b, depending on the kind and security status of a broadcast cooperation application, the functions and genres of the broadcast cooperation applications, the acquiring status of the broadcast application from the network, or the like is the same as in a case in which the entry buttons for the respective broadcast cooperation applications are displayed on the data broadcast screen 173a in FIG. 11.

Moreover, in a case in which no broadcast cooperation application that is executable in the broadcast receiver 100 is present, it may be designed in such a way that the broadcast cooperation application launcher 173b1 is not displayed. Alternatively, in this case, it may be designed in such a way that a message such as "no usable application is present" is displayed inside the broadcast cooperation application launcher 173b1.

[Broadcast Cooperation Application Execution Screen of Broadcast Receiver]

Figure 13A:
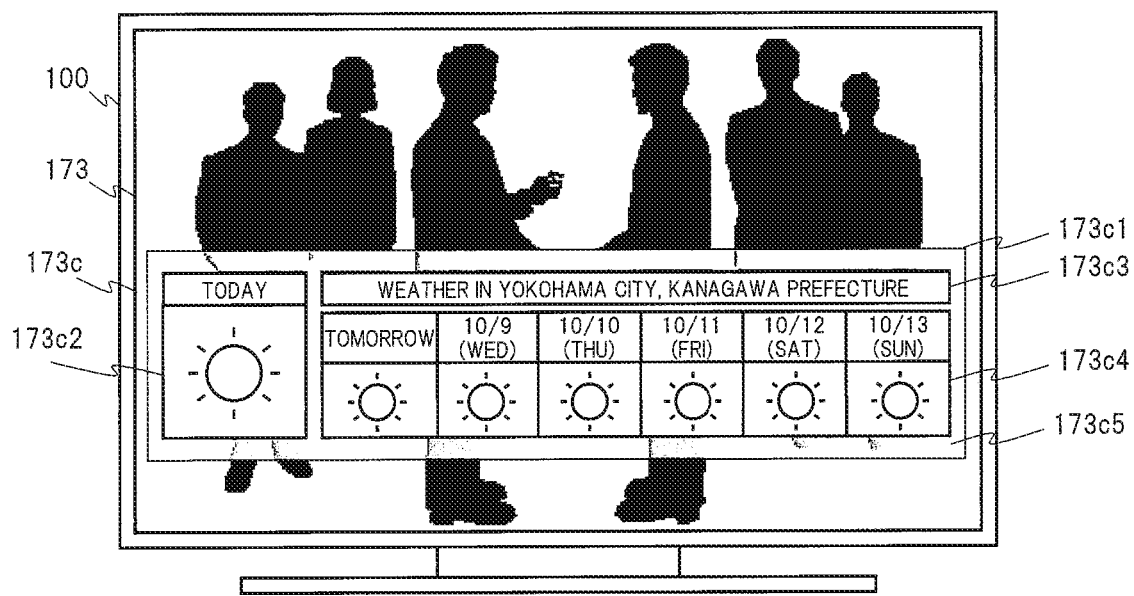
FIG. 13A is a screen display view showing a broadcast cooperation application executing screen in the broadcast receiver in accordance with the first embodiment.

FIG. 13A is a screen display view showing one example of a broadcast cooperation application execution screen that is displayed in the process of S108 in FIG. 7A, the process of S213 in FIG. 7B, the process of S314 in FIG. 7C, the process of S615 in FIG. 9, or the like. The broadcast cooperation application of the present embodiment is provided with a graphics performance, an effect performance, or the like by the HTML description, and is capable of providing an overlay display with a broadcast program screen on the video image display unit 173. For example, as shown in FIG. 13A, a broadcast cooperation application unit 173c1 which displays information such as weather forecast, news, or the like is overlaid and displayed at a desired position on the broadcast program screen 173c. The broadcast cooperation application unit 173c1 is constituted by a first main object 173c2, a second main object 173c3, a third main object 173c4, a background object 173c5, or the like. Other objects may be further displayed.

In a state where the broadcast cooperation application unit 173c1 is overlaid and displayed on the broadcast program screen 173c, by selecting a data key 741a8 of basic screen 741a of the cooperation control application, the execution of the broadcast cooperation application can be terminated to move to a data broadcast screen. Moreover, by selecting the cooperation application key 741a9 of the basic screen 741a of the cooperation control application, the execution of the broadcast cooperation application can be terminated to return to the display of only the broadcast program screen 173c. The above-mentioned processes may be achieved by using different operation keys.

Moreover, in a state where the broadcast cooperation application unit 173c1 is overlaid and displayed on the broadcast program screen 172c, by operating the respective operation keys of the basic screen 741a of the cooperation control application, the transmittance of the broadcast cooperation application unit 173c1 can be altered. The altering process of the transmittance may be carried out collectively on the entire broadcast cooperation application unit 173c1 or may be carried out independently on the first main object 173c2, the second main object 173c3, the third main object 173c4, and the background object 173c5. The altering process of the transmittance may also be carried out on each of predetermined groups (for example, a plurality of objects that are present in the same graphics layer).

Upon carrying out the altering process of the transmittance, for example, an object is selected by using the cursor key 741ac of the basic screen 741a of the cooperation control application, and the transmittance of the object is increased by the "blue" key of the color keys 741ae, or the transmittance of the object is reduced by the "yellow" key. The altering process of the transmittance may be carried out by using different operation keys. By collectively setting the transmittance of the entire broadcast cooperation application unit 173c1 to 100%, the broadcast cooperation application unit 173c1 can be temporarily set to a non-display state. For example, in a case in which an emergency broadcast is delivered by a broadcast wave, by setting the transmittance of the entire broadcast cooperation application unit to 100%, only the broadcast program screen of the emergency broadcast can be displayed on the video image display unit 173. Alternatively, a CM detection unit, not shown, detects that a broadcast program is moved to CM video images from the main video images to control the transmittance of the broadcast cooperation application unit 173c1 in such away that the transmittance of the entire broadcast cooperation application unit 173c1 is collectively set to 100% (or to a transmittance that allows the video images of the broadcast program to be clearly checked).

By carrying out the above-mentioned processes, when the user wants to confirm a broadcast program screen located on the background during the execution of the broadcast cooperation application, it becomes possible to confirm the broadcast program screen without terminating the broadcast cooperation application.

Figure 13B:
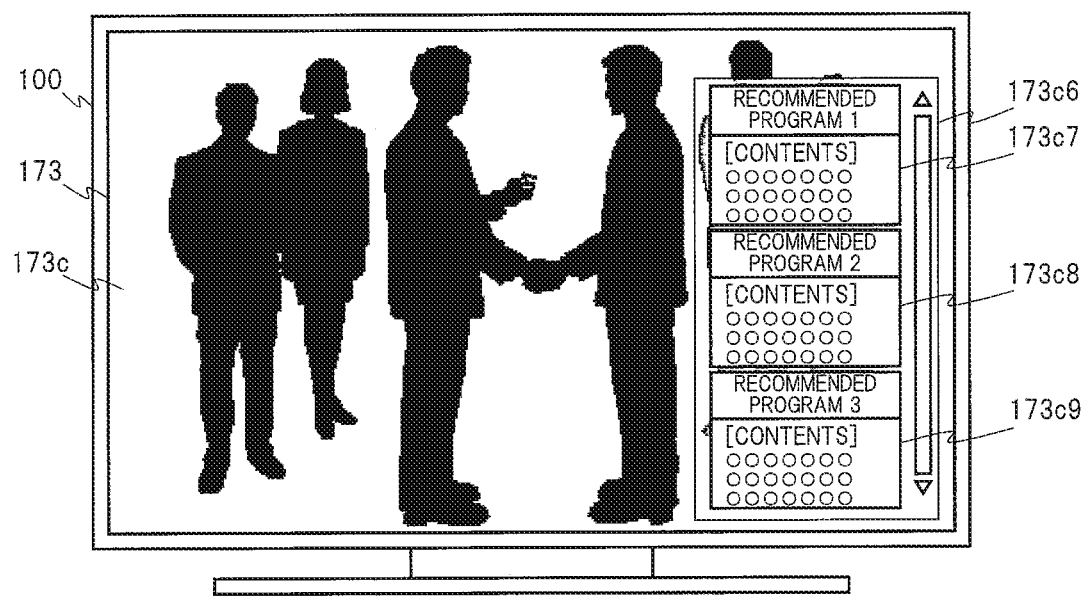
FIG. 13B is a screen display view showing the broadcast cooperation application executing screen in the broadcast receiver in accordance with the first embodiment.

FIG. 13B is a screen display view showing one example different from the above-mentioned example and of a broadcast cooperation application execution screen displayed in the process of S108 in FIG. 7A, the process of S213 in FIG. 7B, the process of S314 in FIG. 7C, the process of S615 in FIG. 9, or the like. In the example shown in FIG. 13B, a broadcast cooperation application unit 173c6 for introducing a recommended program is overlaid and displayed at a desired position on the broadcast program screen 173c. In the broadcast cooperation application unit 173c6, first recommended program information 173c7, second recommended program information 173c8, third recommended program information 173c9, and the like are displayed. A more number of pieces of recommended program information may be displayed by using scrolling, page switching, or the like.

Each piece of the recommended program information may be information of a program recommended relating to the broadcast program (broadcast program screen 173c) currently displayed, information of a program recommended based on viewing history of the user, or information of a program that is popular on the Internet or the like. It may be information of a recommended program sent to the user by a friend of the user of the broadcast receiver 100. Moreover, the above-mentioned recommended program may be a program transmitted by a broadcast wave by the digital broadcast service or may be a VOD (Video On Demand) program or the like delivered by each of the server devices on the Internet 200. It may be an information screen of a homepage or the like prepared in a server device on the Internet 200.

In a state where the broadcast cooperation application unit 173c6 is overlaid and displayed on the broadcast program screen 173c, the first recommended program information 173c7, the second recommended program information 173c8, the third recommended program information 173c9, or the like are selected by using the cursor key 741ac and the enter key 741ad of the basic screen 741a of the cooperation control application, so that video images of each of the respective programs recommended by the first recommended program information 173c7, the second recommended program information 173c8, the third recommended program information 173c9, or the like are displayed on the display unit 173.

Figure 13C:
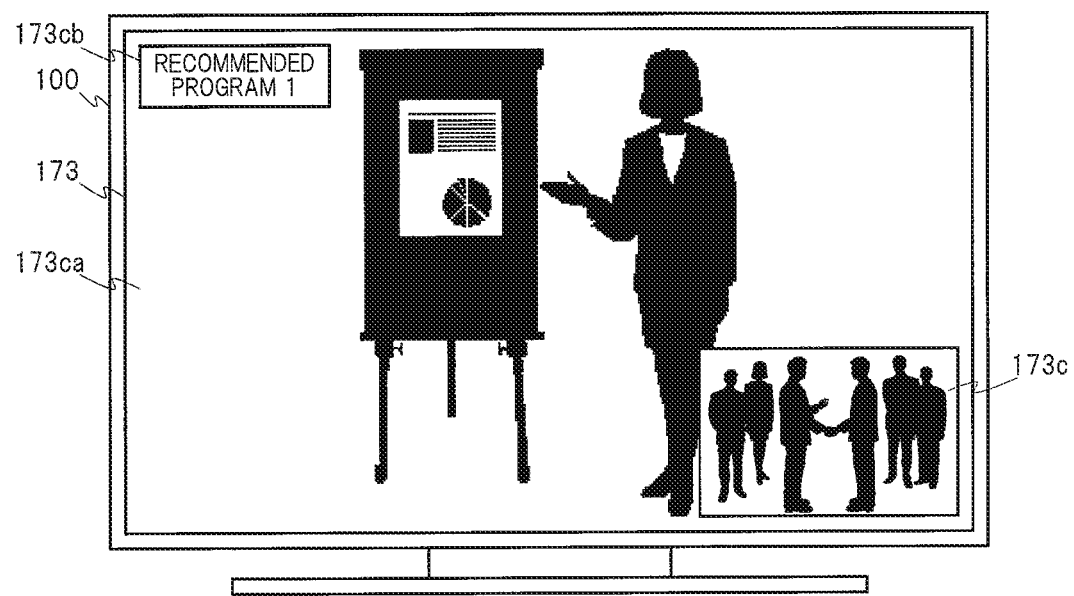
FIG. 13C is a screen display view showing the broadcast cooperation application executing screen in the broadcast receiver in accordance with the first embodiment.

FIG. 13C is a screen display view showing one example in which a program video image recommended by the broadcast cooperation application unit 173c6 for introducing the recommended program is displayed. For example, in a case in which the first recommended program information 173c7 of the broadcast cooperation application unit 173c6 is selected by using the cursor key 741ac and the enter key 741ad of the basic screen 741a of the cooperation control application, a program video image 173ca of a program recommended by the first recommended program information 173c7 is displayed on the display unit 173. The user operates the operation terminal in such away that a temporary stop, a time specified jump, or the like of the program video image 173ca can be carried out. Moreover, upon displaying the program video image 173ca, the previous broadcast program screen 173c may be displayed at a desired position in a PIP (Picture In Picture) format. In this case, alternation may be made as to which screen of the program video image 173ca of the recommended program and the previous broadcast program screen 173c is set as the main screen by the operation of the user onto the operation terminal. The size of the window of the previous broadcast program screen 173c may be adjusted by the operation of the user onto the operation terminal.

Moreover, when an icon display 173cb indicating that the video image 173ca of the recommended program is an video image displayed by selecting any one of the pieces of the recommended program information displayed in the broadcast cooperation application unit 173c6 is displayed at a desired position on the screen, usability for the user can be improved. Furthermore, it is needless to say that also in the broadcast cooperation application execution screen shown in FIG. 13B, the transmittance of the broadcast cooperation application unit 173c6 may be altered in the same manner as described earlier.

Figure 13D:
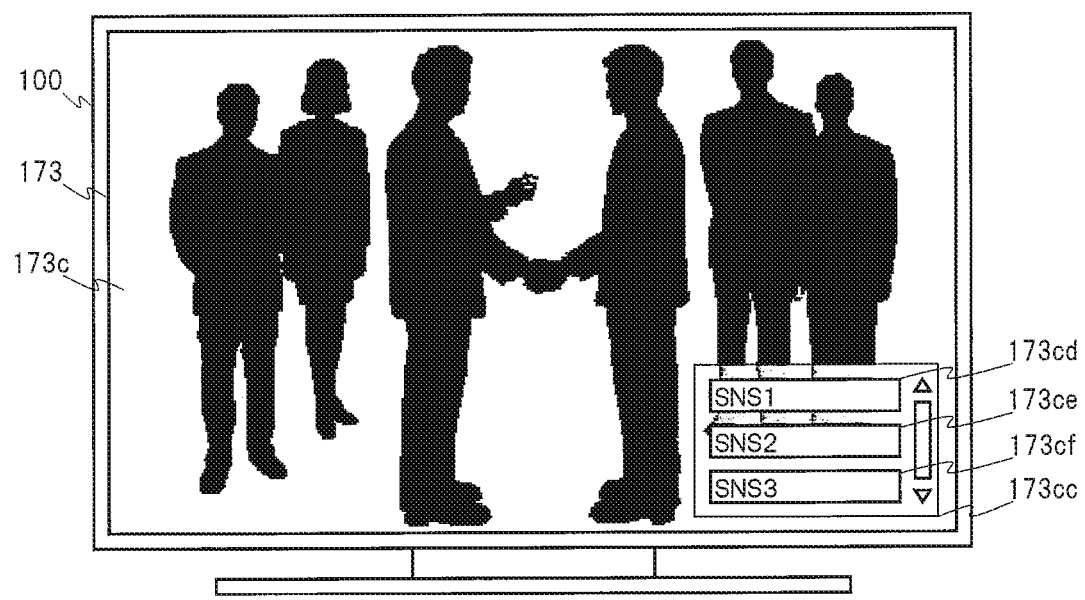
FIG. 13D is a screen display view showing the broadcast cooperation application executing screen in the broadcast receiver in accordance with the first embodiment.

FIG. 13D is a screen display view showing one example different from the above-mentioned example and of the broadcast cooperation application execution screen displayed in the process of S108 in FIG. 7A, the process of S213 in FIG. 7B, the process of S314 in FIG. 7C, the process of S615 in FIG. 9, or the like. In the example shown in FIG. 13D, at a desired position on the broadcast program screen 173c, a broadcast cooperation application unit 173cc forming a portal of an SNS (Social Networking Service) service is overlaid and displayed. In the broadcast cooperation application unit 173cc, an entry button 173cd of a first SNS service, an entry button 173ce of a second SNS service, an entry button 173cf of a third SNS service, and the like are displayed. More entry buttons for the SNS service may be displayed by using scrolling, page switching, or the like.

In a state where the broadcast cooperation application unit 173*cc* is overlaid and displayed on the broadcast program screen 173*c*, the entry button 173*cd* of the first SNS service, the entry button 173*ce* of the second SNS service, the entry button 173*cf* of the third SNS service, or the like are selected by using the cursor key 741*ac* and the enter key 741*ad* of the basic screen 741*a* of the cooperation control application, so that functions assigned to the respective entry buttons such as a chat function, a bulletin board function, an Internet telephone function, and the like, are activated. Thus, the user is allowed to enjoy the broadcast program (broadcast program screen 173*c*) currently displayed, while exchanging information with other people. Moreover, at the same time, the basic screen 741*a* of the cooperation control application on the portable information terminal 700 may be altered to a character input screen such as a software keyboard or the like, an audio input screen for chatting by audio input or writing in a bulletin board, or the like.

Furthermore, as a broadcast cooperation application executable in the broadcast receiver 100 of the present embodiment, in addition to the above-mentioned example, such a configuration may be used in which a related CM application is offered on both of the broadcast receiver 100 and the portable information terminal 700 further in synchronism with a broadcast timing of the CM, by utilizing the cooperative function between the broadcast receiver 100 and the portable information terminal 700. Alternatively, in a pay service available in the broadcast receiver 100, the broadcast cooperation application confirms whether or not the user of the broadcast receiver 100 subscribes the pay service, and in accordance with the result thereof, the display of the broadcast receiver 100 and/or the portable information terminal 700 may be altered. In the broadcast receiver 100 of the present embodiment, even when any of the broadcast cooperation applications are executed, the effects as described with reference to FIG. 13A, FIG. 13B, and the like can be obtained.

[Error Display Screen of Broadcast Receiver]

Figure 14:
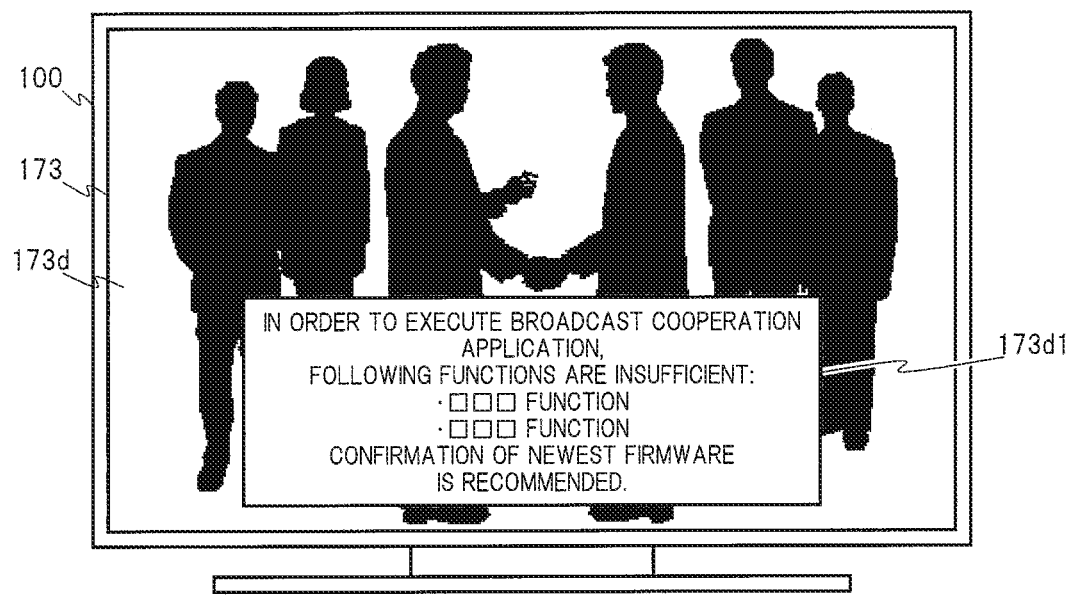
FIG. 14 is a screen display view showing an error display screen in the broadcast receiver in accordance with the first embodiment.

FIG. 14 is a screen display view showing an example of an error display screen that is given in the process of S105 in FIG. 7A, the process of S207 in FIG. 7B, the process of S308 in FIG. 7C, the process of S605 in FIG. 8C, or the like, in a case in which it is determined that the execution of the broadcast cooperation application is not possible by confirming an application profile 904 of the acquired AIT data row or the like, for example, in a case in which the description of the AIT is insufficient, or in a case in which acquisition of the AIT fails.

In the broadcast receiver 100 of the present embodiment, when it is determined that the execution of the broadcast cooperation application is not possible, the reason that the execution of the broadcast cooperation application is not possible such as the result of confirming the application profile 904, is displayed on an error message 173*d*1. For example, when after the confirmation of the application profile 904, the result shows that a predetermined optional function is insufficient on the television receiver side, the corresponding fact is displayed in the error message 173*d*1. In this case, an error code and a guide (URL or the like) of the homepage of the television receiver maker on which the explanation of the error code is written may be displayed. Alternatively, in a case in which a broadcast cooperation application is acquired from the network, the connection status of the network is preliminarily confirmed as a matter of course, and at this time, for example, when acquisition of the broadcast cooperation application is not possible due to a connection failure of the LAN cable or the like, the corresponding fact is displayed on the error message 173*d*1. In a case in which, although the network connection is established, the acquisition of the broadcast cooperation application is not correctly carried out due to a deteriorated error status, for example, the error message 173*d*1 may be displayed. The error message 173*d*1 may also be displayed in a case in which during the execution of the acquisition of a broadcast cooperation application, the broadcast cooperation application has not yet been executable. Moreover, the error message 173*d*1 may also be displayed in a case in which information such as the AIT cannot be received because the receiving status of the broadcast wave becomes unstable although the information such as the AIT has been received at first. Note that, in this case, if the broadcast cooperation application acquired from the respective server devices is cached as it is, the application can be used as it is after the recovery of the receiving status of the broadcast wave.

Moreover, in a case in which, as the result of the confirmation of the application profile 904, a predetermined optional function is insufficient on the television receiver side, a display for recommending the confirmation of a newest firmware for the television receiver or the update thereof may be shown in the error message 173*d*1. Alternatively, the broadcast receiver 100 may be designed to automatically carry out the confirmation of the newest firmware or the update thereof. Alternatively, in a case in which the broadcast cooperation application can be executed by adding pay optional hardware or optional software to the television receiver, the guide to the corresponding pay optional hardware or optional software may be displayed. Note that the error message 173*d*1 may be displayed not on the broadcast receiver 100, but on the portable information terminal 700.

[Execution Screen of Broadcast Cooperation Application of Portable Information Terminal]

Figure 15:
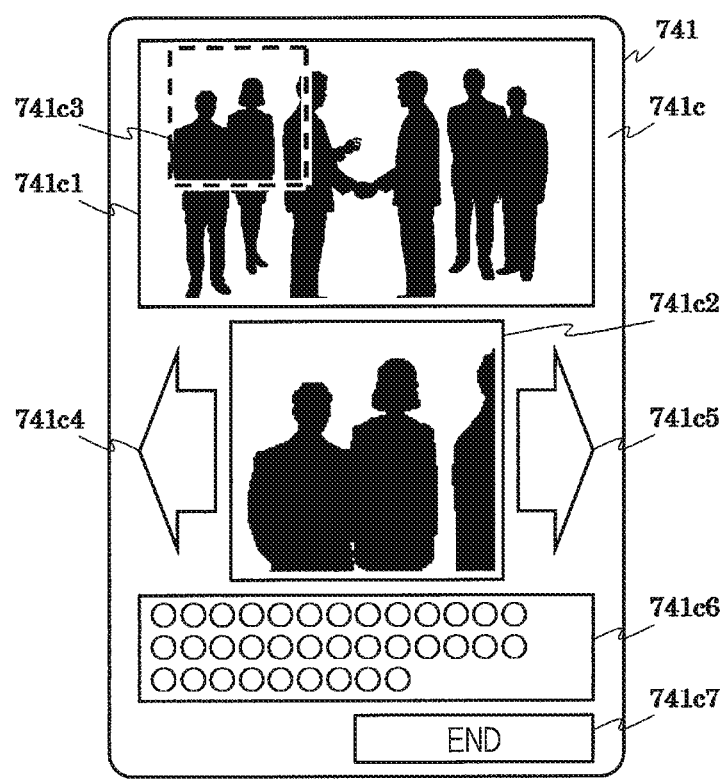
FIG. 15 is a screen display view showing a broadcast cooperation application executing screen of the portable information terminal in accordance with the first embodiment.

FIG. 15 is a screen display view showing one example of an execution screen of a broadcast cooperation application (terminal side) displayed in the process of S619 in FIG. 9. A broadcast cooperation application execution screen 741*c* shown in FIG. 15 is constituted by a main window 741*c*1, a sub-window 741*c*2, a selection marker 741*c*3, cursor keys 741*c*4 and 741*c*5, an explanation display unit 741*c*6, and an end button 741*c*7. Other objects may be further added thereto.

In the present embodiment, the broadcast cooperation application (terminal side) to be executed in the portable information terminal 700 is an application for confirming a broadcast program currently displayed on the broadcast receiver 100 in detail. Moreover, the same video image as those of the broadcast program screen currently displayed on the broadcast receiver 100 is displayed on the main window 741*c*1, and an enlarged video image of a position specified by the selection marker 741*c*3 is displayed on the sub-window 741*c*2, respectively. By selecting the cursor keys 741*c*4 and 741*c*5, the position of the selection marker 741*c*3 can be altered. In the explanation display unit 714*c*6, an explanation subtitle sentence in relation to the broadcast program currently displayed on the main window 741*c*1 and a comment or the like contributed by another user relating to the broadcast program are displayed. The end button 741*c*7 is a button for terminating the operation of the broadcast cooperation application (on terminal side).

By operating the broadcast cooperation application (on terminal side) on the portable information terminal 700, the functional expansion of the broadcast communication cooperation service by the cooperative operation between the broadcast receiver 100 and the portable information terminal 700 can be obtained.

[EPG Screen of Broadcast Receiver]

Figure 16A:
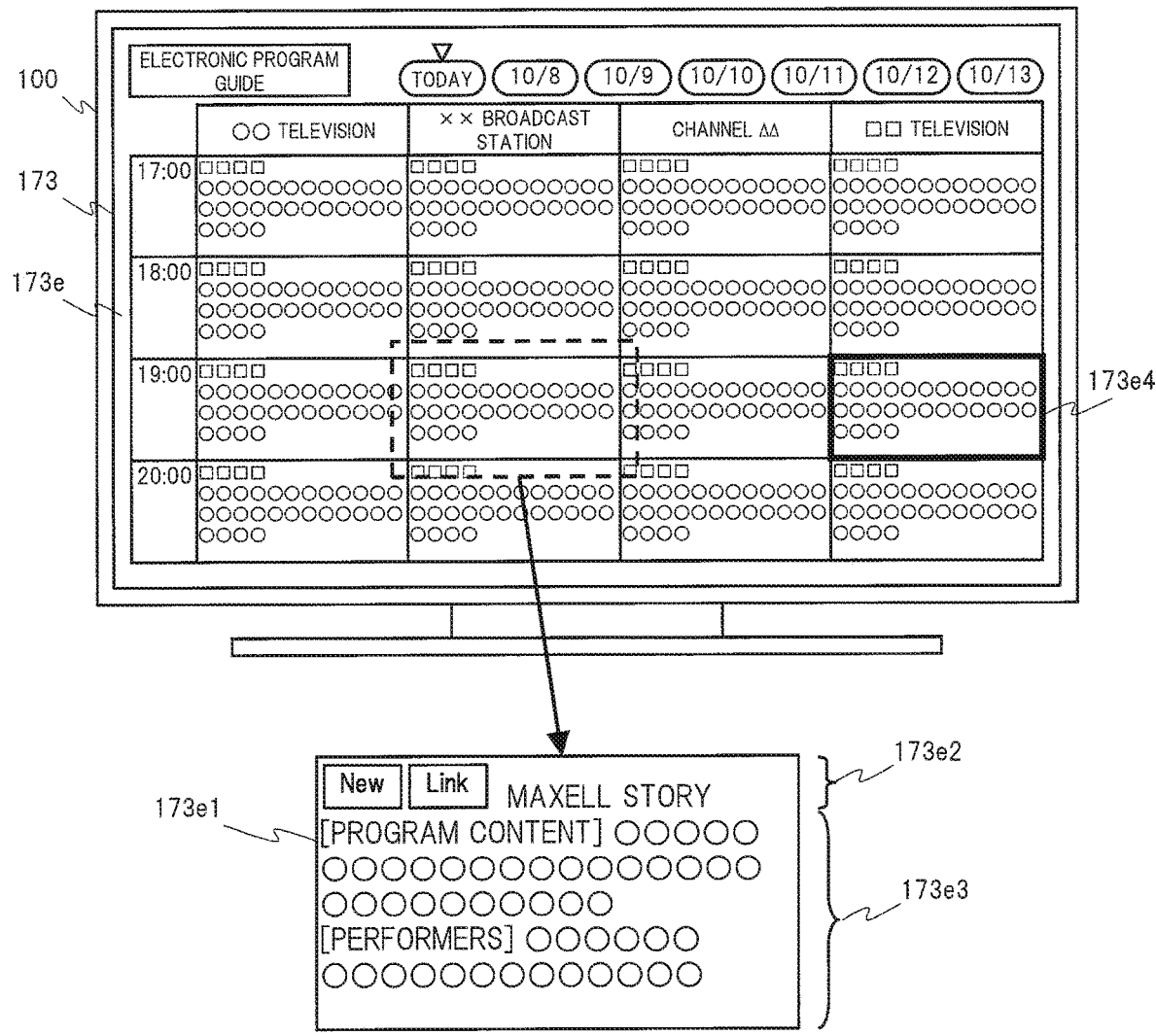
FIG. 16A is a screen display view showing an EPG display screen in the broadcast receiver in accordance with the first embodiment.

FIG. 16A is a screen display view showing one example of a display screen of an electronic program guide (EPG) in the broadcast receiver 100 of the present embodiment. An EPG display screen 173e is a delivery planning guide of a broadcast program in a digital broadcast service of the present embodiment, which is formed by the main control unit 101 based on a program information data row outputted from the first separation unit 132. By selecting a program guide key 741a7 of the basic screen 741a of the cooperation control application, the EPG display screen 173e is displayed on the video image display unit 173.

In the present embodiment, the EPG display screen 173e has a matrix shape in which the axis of ordinate is used for displaying time and the axis of abscissas is used for displaying a service ID (channel), and detailed information of each broadcast program to be broadcast in each channel in each time zone is displayed. As shown in FIG. 16A, the detailed information 173e1 of each broadcast program is mainly composed of a title region 173e2 and a detailed explanation region 173e3.

In the title region 173e2, the program title of each broadcast program and a symbol or the like showing the attribute of each broadcast program are displayed. The symbol or the like showing the attribute of each broadcast program include, for example, a mark formed by symbolizing "New" indicating a new program, a mark formed by symbolizing "Replay" indicating a re-broadcast program, or the like. Alternatively, a mark formed by symbolizing "data" indicating a relation applicable to data broadcast by a broadcast service or the like may be used. Moreover, in the case of a broadcast program in which a broadcast cooperation application executable in the broadcast receiver 100 of the present embodiment is prepared, a mark or the like formed by symbolizing "Linkage" indicating the corresponding fact may be used. The detailed explanation region 173e3 displays related information such as a program content and performers of each broadcast program, and URL of a homepage introducing each broadcast program.

Note that the mark or the like formed by symbolizing the "Linkage" and displayed in the title region 173e2 may be designed so as not to be displayed in a case in which, even though a broadcast cooperation application is prepared in the broadcast program, the execution thereof cannot be carried out in the broadcast receiver 100 as the result of the confirmation of the application profile 904. Moreover, the mark formed by symbolizing "Linkage" indicating that the broadcast program is provided with an executable broadcast cooperation application and displayed in the title region 173e2 may be further altered in its color, shape, character type, or the like depending on whether or not the cooperative operation with the portable information terminal is possible. In a case in which the cooperative operation with the portable information terminal is possible, a mark formed by symbolizing "Mobile" may be displayed in combination with the mark formed by symbolizing the "Linkage."

Note that the presence or absence of displays of the mark formed by symbolizing the "Linkage" and the mark formed by symbolizing the "Mobile" may be controlled by acquiring information on whether or not each of the broadcast programs is a broadcast program provided with an executable broadcast cooperation application in the broadcast receiver 100 of the present embodiment or on whether or not the executable broadcast cooperation application can be cooperatively operated with a portable information terminal, which has been preliminarily described in EIT information including detailed information or the like of the respective broadcast programs. Alternatively, the information acquired from the program delivery information of a digital broadcast program prepared in the predetermined server device on the Internet 200 may be added to an electronic program guide formed based on the program information data row acquired from a broadcast wave of a digital broadcast service.

As described above, by displaying the mark formed by symbolizing the "Linkage" indicating the broadcast program provided with an executable broadcast cooperation application and the mark formed by symbolizing the "Mobile" indicating that the cooperative operation with a portable terminal device is possible on the EPG display screen 173e, the user is allowed to easily understand the state of which each broadcast program is applicable to a broadcast communication cooperation service in the broadcast receiver 100. Note that it is needless to say that the mark formed by symbolizing a predetermined character indicating the attribute of each broadcast program may be replaced by the character, a sentence, or the like. By altering the background color of the detailed information 173e1 of each of the broadcast programs, the state of which each broadcast program is applicable to a broadcast communication cooperation service may be indicated. Furthermore, the mark formed by symbolizing the "Linkage," the mark formed by symbolizing the "Mobile," and the like may not be displayed in the title region 173e2 normally, but may be pop-up displayed only in a case in which each of the broadcast programs is selected by the program selection cursor 173e4.

The broadcast receiver 100 of the present embodiment has functions for making a viewing reservation and/or a recording reservation for each broadcast program on the EPG display screen 173e. For example, in a state where the EPG display screen 173e is displayed, the program selection cursor 173e4 on the EPG display screen 173e is moved by using the cursor key 741ac of the basic screen 741a of the cooperation control application, and a desired broadcast program is selected by the enter key 741ad, so that the viewing reservation and/or the recording reservation for the selected broadcast program is carried out.

In the above-mentioned process, in a case in which the broadcast program on which the viewing reservation and/or the recording reservation is carried out is a broadcast program applicable to a broadcast communication cooperation service, by using the above-mentioned viewing reservation and/or recording reservation as a trigger, the acquisition of the broadcast cooperation application prepared for the broadcast program may be started without waiting for the broadcast staring time of the broadcast program. That is, information (location information such as URL) for specifying the acquisition source of the broadcast cooperation application is described in the EIT information including the detailed information or the like of each broadcast program. With this arrangement, the broadcast receiver 100 can acquire the information of the acquisition source of the broadcast cooperation application prepared for each broadcast program at the time when the broadcast program is selected by the program selection cursor 173e4. Therefore, the broadcast receiver 100 makes it possible to start of an acquisition of the broadcast cooperation application before the broadcast start time of the broadcast program.

Figure 16B:
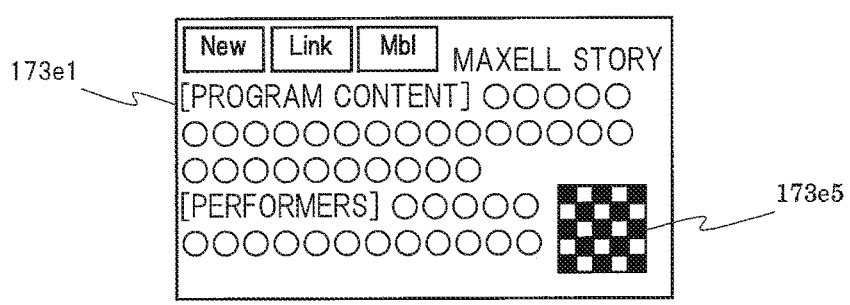
FIG. 16B is a view showing detailed information of the EPG display screen in the broadcast receiver in accordance with the first embodiment.

Note that, in a case in which the broadcast program on which the viewing reservation and/or the recording reservation are carried out is a broadcast program applicable to a broadcast communication cooperation service, and when it is a broadcast program in which a cooperative operation with a portable terminal device is possible, the acquiring process of a broadcast cooperation application (terminal side) prepared for a portable terminal device may also be started before the broadcast start time of the broadcast program in the same process as described above. Moreover, as shown in FIG. 16B, a two-dimensional bar code 173e5 or the like indicating the information (location information such as URL) of the acquisition source of the broadcast cooperation application (terminal side) prepared for the portable terminal device is displayed on the EPG display screen 173e so that the user may be encouraged to download the broadcast cooperation application (terminal side) prepared for the portable terminal device.

Thus, when the broadcast receiver 100 is designed to start the acquisition of the broadcast cooperation application before the broadcast start time of the broadcast program by referring to the information of the acquisition source of the broadcast cooperation application included in the EPG information, it becomes possible to disperse the load of the service provider server 400 for storing the broadcast cooperation application. Moreover, even when the network communication speed between the service provider server 400 and the broadcast receiver 100 is insufficient, it becomes possible to effectively use the broadcast cooperation application immediately after the start of the broadcast of the broadcast program.

Figure 17:
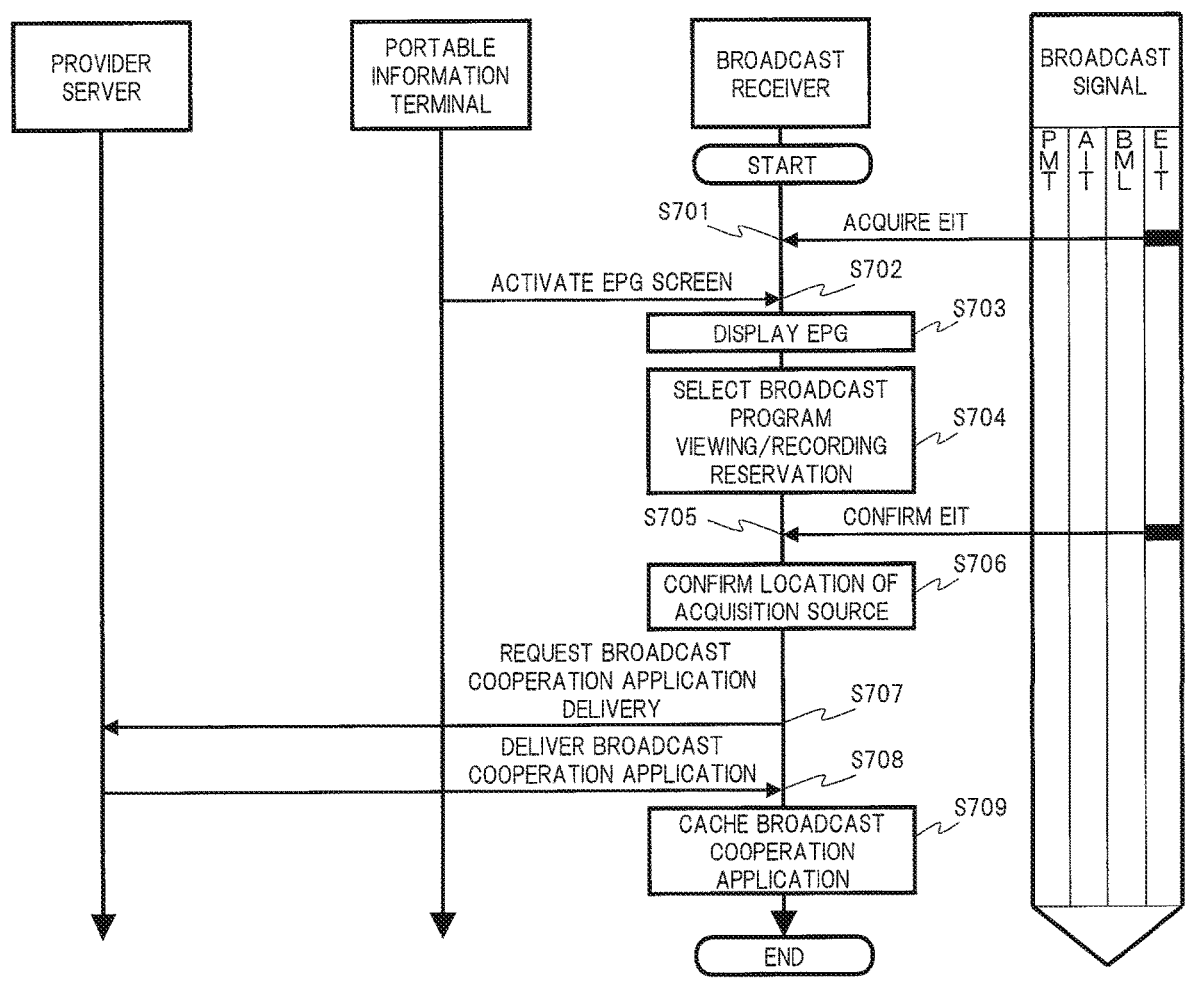
FIG. 17 is a diagram showing an operation sequence at the time of acquiring the broadcast cooperation application in the broadcast receiver in accordance with the first embodiment.

FIG. 17 is an operation sequence diagram showing one example of an acquiring sequence of the broadcast cooperation application in a case in which the viewing reservation and/or recording reservation of the broadcast program is carried out on the EPG display screen 173e.

While viewing the digital broadcast service, the main control unit 101 of the broadcast receiver 100 acquires a program information data row outputted from the first separation unit 132 (S701). When the user gives an activation request for the EPG screen by using the operation terminal (S702), the EPG display screen 173e is displayed on the video image display unit 173 (S703). When the user selects a desired broadcast program by using the operation terminal on the EPG display screen 173e and carries out the viewing reservation and/or recording reservation of the broadcast program (S704), the main control unit 101 confirms the program information data row acquired from the first separation unit 132 (S705), and further confirms the location of the acquisition source of the broadcast cooperation application that is in cooperation with the broadcast program on which the viewing reservation and/or the recording reservation are carried out (S706).

After the process of S706, the application control unit 161 transmits a transmission request for the broadcast cooperation application to the predetermined service provider server 400, via the LAN communication unit 121 based on the confirmed URL (S707). Upon receipt of the transmission request for the broadcast cooperation application, the service provider service 400 carries out an authentication process of the broadcast receiver 100, if necessary, based on control of the application managing/distributing execution unit 4103, and then delivers the predetermined broadcast cooperation application stored in the application storage region 4013 via the LAN communication unit 121 (S708). Subsequently, the application control unit 161 caches the predetermined broadcast cooperation application delivered from the service provider server 400 and received via the LAN communication unit 121 in the RAM 104 or the storage unit 110 (S709).

In accordance with the broadcast receiver 100 of the present embodiment described above, it is possible to execute functions having high added values.

Second Embodiment

In the following, a second embodiment of the present invention will be described. Note that the configuration, effects, and the like of the present embodiment are the same as those of the first embodiment unless otherwise stated. Therefore, in the following, difference between the present embodiment and the first embodiment is mainly described, and with respect to common points, the description thereof will be omitted in order to avoid overlapped descriptions.

An embodiment for carrying out a portable information terminal cooperation process (hereinafter, referred to as "terminal cooperation") is described also in the first embodiment, and the embodiment will be described in more detail.

Upon carrying out a portable information terminal cooperation process, there is a case in which the utilization of the terminal cooperation process is desirably limited only to the portable information terminal 700 that is present in the same residence as the broadcast receiver 100 (hereinafter, this limitation is referred to as "limitation in the same residence"). For example, in an application (hereinafter, referred to as "broadcast cooperation application") for utilizing the broadcast cooperation process, such cases are a case in which the display screen of the broadcast receiver 100 and the display screen of the portable information terminal 700 are closely related to each other or a case in which advertising video images displayed on the broadcast receiver 100 are wanted to be certainly viewed by the user of the portable information terminal 700.

Note that the point required to be considered as a step is determination as to whether or not the target broadcast cooperation application imposes the limitation in the same residence. On the assumption that all the broadcast cooperation applications impose the limitation in the same residence, this determination is not necessary; however, in some cases in which no limitation is imposed, the broadcast receiver 100 needs to acquire control information relating to the presence and absence of the limitation in the same residence and alter the operation step. The control information relating to the presence or absence of this limitation may be acquired from a broadcast signal (for example, described as an item of AIT) or may be acquired from a server specified by the broadcast station.

Including the above-mentioned step, the step for ensuring that the portable information terminal 700 is present in the same residence as the broadcast receiver 100 will be described in the present embodiment.

Normally, devices present in the same residence are present on a local network that is connected to the same router device 210. Therefore, since the portable information terminal 700 is connected to the same local network as that of the broadcast receiver 100, it is determined that they are present in the same residence. Note that determination as to whether or not the target device is connected to the local network may be made by using a known method and the description thereof will be omitted.

Moreover, even in the case of a portable information terminal 700 not present on a local network, when it is directly communicated with the broadcast receiver 100 by using NFC, Bluetooth, infrared communication, or the like, the determination may be made that it is present in the same residence. In this case, the communication for acquiring the broadcast cooperation application or the like may be carried out by the above-mentioned direct communication, or may be carried out by using a mobile telephone communication.

As described above, a plurality of methods for confirming that the target terminal is present in the same residence, and which method is used is, for example, described in AIT and read by the broadcast receiver 100.

Moreover, if the fact that the portable information terminal 700 is present in the same residence is once confirmed, the terminal may be regarded as being present in the same residence until the program ends, or another method may be used in which by setting an effective period of time (for example, 10 minutes), the terminal is regarded as being present in the same residence within the effective period of time, but after the effective period of time, the terminal is not regarded as being present in the same residence without the confirmation that is newly made. The effective period of time is described, for example, in the AIT, and read out by the broadcast receiver 100.

Moreover, still another method may be used in which, for example, at a desired point of time during the progress of a program, an event signal is set in a broadcast signal, and each time the event signal is received, the fact that the portable information terminal 700 is present in the same residence is confirmed.

Furthermore, the above-mentioned two methods may be used in combination.

Next, a specific step in which only the portable information terminal 700 that is present in the same residence is permitted to carry out the terminal cooperation will be described. In the present embodiment, when the portable information terminal 700 acquires a broadcast cooperation application or when the portable information terminal 700 acquires information to be used in the broadcast cooperation application, a limitation is set (broadcast cooperation application and information to be used in the broadcast cooperation application, specifically, HTML document, streaming video images, or the like, referred to collectively as broadcast cooperation information, hereinafter). There are two kinds of the method of acquiring broadcast cooperation information; that is, a communication acquiring method for acquiring from the broadcast station server 300 or the service provider server 400, and a broadcast acquiring method for acquiring from a broadcast wave. The communication acquiring method includes two kinds of methods, that is, a method for acquiring after the start of a broadcast receiving process, and a method for acquiring before the start of the broadcast receiving process. Moreover, the communication acquiring method includes two kinds of cases, that is, a case in which after the broadcast receiver 100 once receives the information, the portable information terminal 700 acquires from the broadcast receiver 100, and a case in which the portable information terminal 700 directly acquires from the broadcast station server 300 or the service provider server 400. Although there are various kinds of methods, when seen from the portable information terminal 700, there are mainly two cases, that is, a case in which the portable information terminal 700 acquires from the broadcast receiver 100 and a case in which the portable information terminal 700 acquires from the broadcast station server 300 or the service provider server 400.

In the present embodiment, the case in which the portable information terminal 700 acquires the broadcast cooperation information from the broadcast receiver 100 will be described, and the case in which the broadcast cooperation information is acquired from the server will be described in the next embodiment.

Figure 18A:
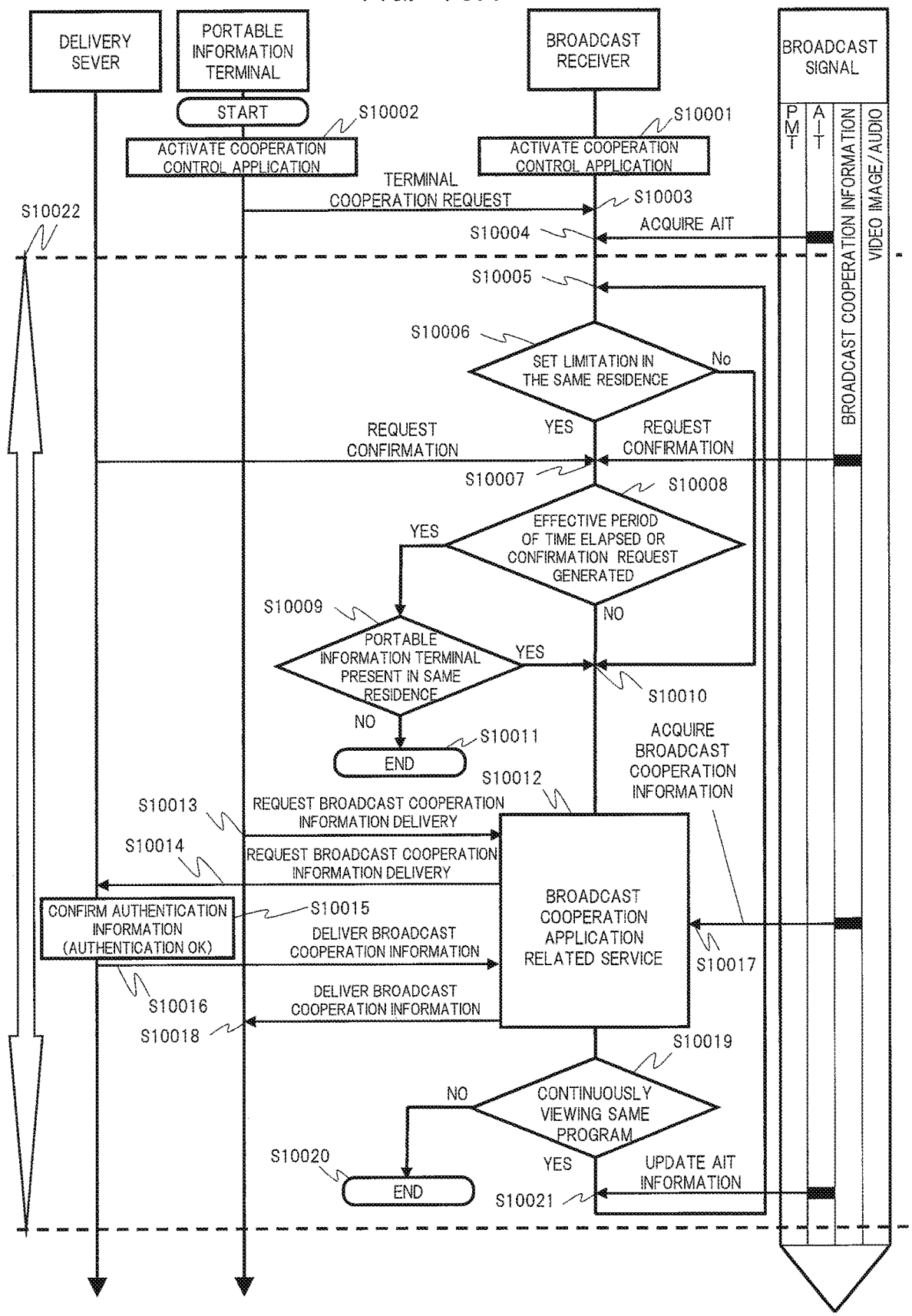
FIG. 18A is a diagram showing an operation sequence at the time of cooperation with a terminal in accordance with a second embodiment.

FIG. 18A shows steps of the present embodiment.

First, prior to carrying out a terminal cooperation, cooperation control applications that control the terminal cooperation are preliminarily activated in the portable information terminal 700 and the broadcast receiver 100, respectively (S10001, S10002). In this state, the portable information terminal 700 makes a terminal cooperation request to the broadcast receiver 100 (S10003). Next, AIT is acquired from a broadcast signal (S10004). From this AIT information, determination is made as to whether or not the application for a target portable information terminal has the limitation in the same residence (S10006), and when the application has the limitation, the process proceeds to a step S10008, and in a first stage in which the terminal cooperation request is received, the process proceeds to a step S10009 to determine whether or not the portable information terminal 700 making the terminal cooperation request is present in the same residence as the broadcast receiver 100 (S10009). When it is determined that the portable information terminal 700 is not present in the same residence as the broadcast receiver 100, a response that cooperation is not allowed is given to the cooperation control application on the portable information terminal side, thereby terminating the process (S10011).

Here, in a case in which all the terminal cooperation applications are assumed to have the limitation in the same residence, the step in S10006 is skipped without carrying out the determination. In a case in which there is a possibility that an application having the limitation in the same residence and an application without the limitation in the same residence are present, the determination in S10006 is carried out.

In a case in which the portable information terminal 700 is present in the same residence or the application does not have the limitation in the same residence, the process proceeds to S10012, and a broadcast cooperation application related service is carried out. In this service (S10012), a broadcast cooperation information delivery request from the portable information terminal 700 is processed (S10013), and the broadcast cooperation information is delivered to the portable information terminal 700 (S10018). The broadcast cooperation information includes information delivered to the broadcast receiver 100 from the delivery server (S10014, S10015, and S10016), information acquired from a broadcast signal (S10017), information stored in the broadcast receiver 100, and the like. Receiving (S10016 and S10017) the broadcast cooperation information by the broadcast receiver 100 may be not only carried out based on receiving the broadcast cooperation information delivery request from the portable information terminal 700 (S10013), but also may be autonomously carried out by the broadcast receiver 100 or may be carried out based on an event occurrence in the broadcast signal. Moreover, the delivery of the broadcast cooperation information to the portable information terminal 700 (S10018) may also be spontaneously carried out from the broadcast receiver 100 side.

After a series of steps of receiving (acquiring) and delivering the broadcast related information, determination is made as to whether or not the broadcast receiver 100 continues to view the same program (S10019), and if the broadcast receiver 100 does not continue to view, a response that cooperation is not allowed is given to the cooperation control application on the portable information terminal side, thereby terminating the process (S10020).

If the viewing is continuously carried out, the process returns to the step S10005, and when the application has the limitation in the same residence, confirmation is made as to whether or not the portable information terminal 700 is present in the same residence as the broadcast receiver 100 (S10009); in this case, determination is made as to whether or not the predetermined effective period of time has elapsed after the previous confirmation or as to whether or not a confirmation request (S10007) from the broadcast signal or the delivery server is generated (S10008) after the previous confirmation, and if neither of the conditions are satisfied, the process proceeds to the execution of the next broadcast cooperation application related service (S10012) by way of step S10010 without carrying out the confirmation as to whether or not the terminal is present in the same residence (S10009). Here, the confirmation request (S10008) from the broadcast signal is described as being acquired from the broadcast cooperation information; however, in this case, an event message is also described as being included in the broadcast cooperation information. Moreover, this confirmation request may be described in the AIT.

Note that the steps described above are steps in a loop process including a broadcast signal, the broadcast receiver 100, the portable information terminal 700 and the entire delivery server, within a section indicated by an arrow of S10022. The confirmation request of S10007 may be made at any timing within the loop.

Moreover, the authentication information described in the AIT may be incorporated in an authentication key to be used for the authentication (S10015) in the delivery server. Thus, the authentication request is confirmed to be a valid request. Moreover, by using an arrangement in which the authentication information described in the AIT is altered in accordance with the progress of the program, and the authentication server does not carry out the authentication unless an authentication key formed by incorporating information that is in synchronization with the progress of the program is used, it is possible to confirm that the same program is being continuously viewed. In this case, the information of the AIT is read and updated appropriately (S10021). Note that, in this case, the authentication information to be incorporated in the broadcast signal may be incorporated as broadcast cooperation information, in addition to being described in the AIT. Moreover, as the method for actually altering the authentication information, a method for continuously altering the URL itself of the delivery server in accordance with the progress of a program may be used.

In this manner, by confirming whether or not the portable information terminal 700 is present in the same residence as the broadcast receiver 100, while executing the broadcast cooperation application related service (S10012), for every predetermined effective period of time, or each time the broadcast signal is given or the confirmation request from the delivery server is made, it is possible to appropriately execute the broadcast related application having the limitation in the same residence. Moreover, by using the authentication information incorporated in the broadcast signal for the authentication in the delivery server, it is possible to ensure the validity of the delivery request, and by altering the authentication information of the broadcast signal appropriately, it is possible to confirm that the same program is being continuously viewed.

In accordance with the portable information terminal cooperation technique related to the present embodiment described above, the limitation in the same residence can be achieved in a portable information terminal in cooperation with the broadcast receiver.

Third Embodiment

In the present embodiment, a case in which the portable terminal 700 acquires broadcast cooperation information from a delivery server will be described.

Figure 18B:
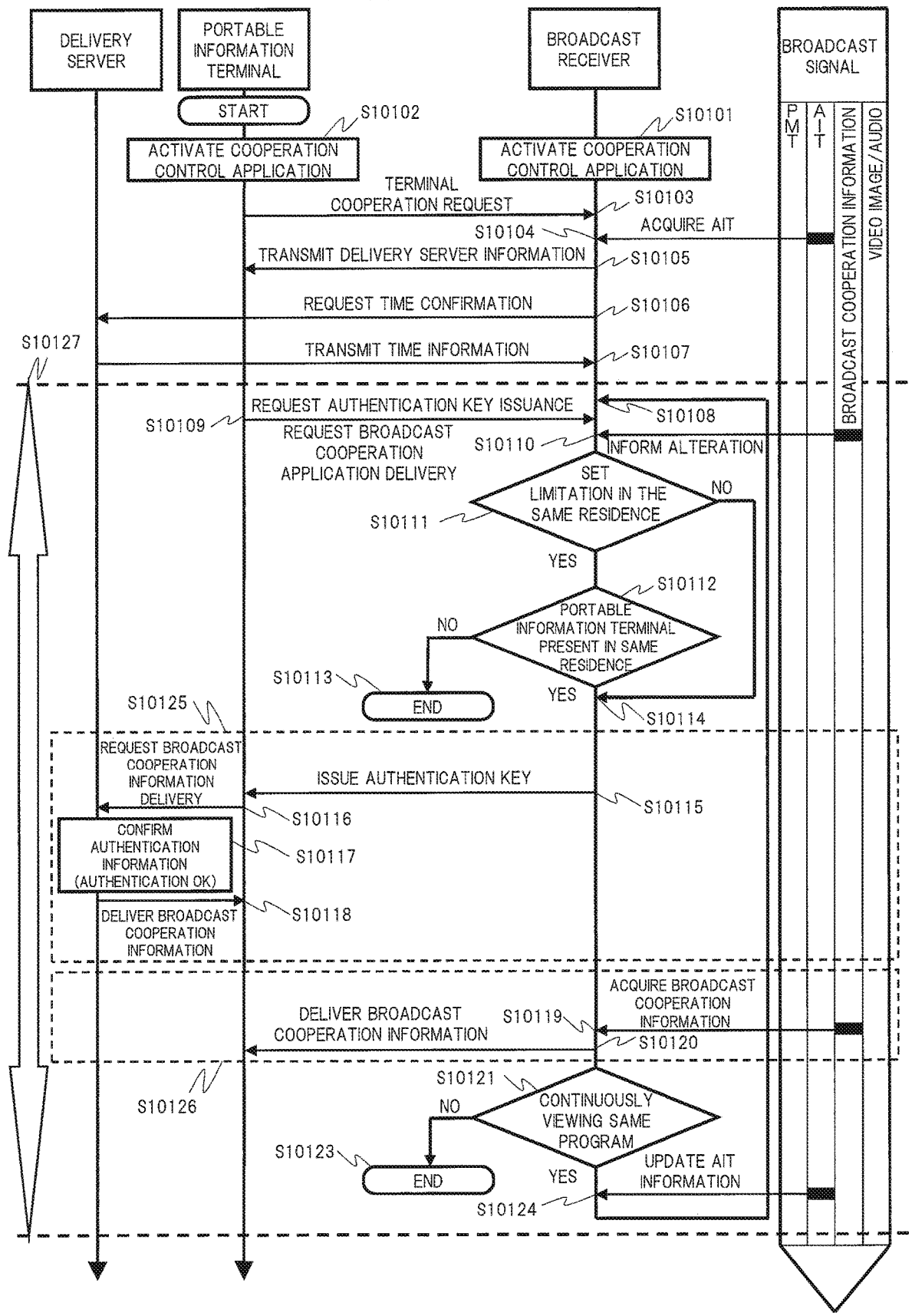
FIG. 18B is a diagram showing an operation sequence at the time of cooperation with a terminal in accordance with a third embodiment.

FIG. 18B shows steps of the present embodiment.

First, prior to carrying out a terminal cooperation, in the portable information terminal 700 and the broadcast receiver 100, cooperation control applications that are applications for controlling the terminal cooperation are preliminarily activated (S10101 and S10102), respectively. In this state, the portable information terminal 700 makes a terminal cooperation request to the broadcast receiver 100 (S10103). Next, AIT is acquired from a broadcast signal (S10104). From this AIT information, information such as URL relating to the delivery server is acquired, and the information is transmitted to the portable information terminal 700 (S10105). Next, a time confirmation request is made from the broadcast receiver 100 to the delivery server (S10106), and based on this request, time information is transmitted from the delivery server to the broadcast receiver 100 (S10107). Thus, an authentication key for the subsequent steps is issued in accordance with the time of the delivery server (S10115); however, in a case in which no time deviation problem occurs, this process may be omitted.

Thereafter, a loop control indicated by an arrow of S10127 is started.

First, an issue request for an authentication key or a broadcast cooperation information delivery request is made from the portable information terminal 700 to the broadcast receiver 100 (S10109). The authentication key is used for the broadcast cooperation information delivery request to the delivery server in the subsequent stage (S10125). The broadcast cooperation delivery request in S10109 is a delivery request for information acquired from a broadcast signal, which corresponds to a step in S10126 in the subsequent stage.

In any cases, when the request in S10109 is outputted from the portable information terminal, determination is made as to whether or not the broadcast cooperation application has the limitation in the same residence (S10111), and if having the limitation, the process proceeds to a step S10112, and if not having the limitation, the process proceeds to S10114 with the step S10112 being skipped. In a case in which all the broadcast cooperation applications have the limitation in the same residence, the process proceeds to S10112 without carrying out the determination in S10111. In S10112, determination is made as to whether or not the portable information terminal that has issued the request is present in the same residence, and if not present therein, the terminal cooperation is terminated (S10113). If present in the same residence, the requested sequence, that is, the acquisition of broadcast cooperation information from the delivery server (S10125) or the acquisition of broadcast cooperation information from the broadcast signal (S10126) is carried out. Since any acquisition from the broadcast signal may be carried out in addition to the acquisition from the delivery server, the step S10126 is also described.

First, the acquisition step (S10125) of the broadcast cooperation information from the delivery server will be described.

At first, the broadcast receiver 100 issues an authentication key corresponding to the request from the portable information terminal 700. At this time, the authentication key is made to be effective only for a predetermined period of time (for example, 10 minutes) including the time information at the time of the issuance. The delivery server confirms the authentication information, including whether or not the authentication key is issued within the effective period of time, and if the authentication is OK, the delivery server permits the delivery of broadcast cooperation information. Thereafter, within the effective period of time, delivery of information is permitted, and at the point of time when the effective period of time has elapsed, the delivery is stopped. For example, after the effective period of time, a streaming video image is no longer viewed.

The predetermined effective period of time may be maintained in the delivery server, or the broadcast receiver 100 may acquire it from the broadcast signal (for example, AIT), and the information of the effective period of time may be incorporated in the authentication key. The information of the effective period of time is preliminarily notified to the portable information terminal 700, so that the issue of the authentication key is requested before the effective period of time has expired. Alternatively, the effective period of time may be managed by the broadcast receiver 100, and before the expiration of the effective period of time, the authentication key may be automatically issued to the portable information terminal 700 from the broadcast receiver 100 after confirming that the portable information terminal 700 is present in the same residence.

The effective period of time may be the same in a single program, or may be changed in accordance with the progress of the program. Moreover, it may be designed such that if no setting of the effective period of time is given, when once authenticated, the authentication is effective during the viewing of the program.

Furthermore, the authentication information described in the AIT may be incorporated in an authentication key to be used in the authentication (S10117) in the delivery server. Thus, the validity of the authentication request can be confirmed. Moreover, such an arrangement may be made in which the authentication information described in the AIT is altered in accordance with the progress of the program, and the authentication server does not carry out the authentication unless an authentication key formed by incorporating information that is in synchronization with the progress of the program is used, so that it is possible to confirm that the same program is being continuously viewed. In this case, the information of the AIT is read and updated appropriately (S10024). Note that the authentication information to be incorporated in the broadcast signal may be incorporated as broadcast cooperation information, in addition to being described in the AIT. Further, as the method for actually altering the authentication information, a method for continuously altering the URL itself of the delivery server in accordance with the progress of the program may be used. Note that the alteration of the URL in this case corresponds to a case in which the delivery server is the same with a different entrance; however, by an alteration of the broadcast cooperation application or the like, the delivery server may be altered to new one. In this case, each time the alteration is made, steps such as the transmission of the delivery server information (S10105), the time confirmation request (S10106), and the transmission of time information (S10107) are carried out.

Next, the step (S10126) for acquiring broadcast cooperation information from a broadcast signal will be described.

In this case, after confirming that the portable information terminal 700 is present in the same residence, the broadcast receiver 100 acquires broadcast cooperation information from a broadcast signal (S10119) and subsequently delivers the information to the portable information terminal 700 (S10120).

Note that, in a case in which the broadcast cooperation information is altered in accordance with the progress of the program, a notification of the alteration is issued from the broadcast signal (S10110), and the broadcast cooperation information may be acquired by using the notification as a trigger. In this case, if the acquisition is made from the delivery server, an authentication key is issued from the broadcast receiver 100 to the portable information terminal (S10115), and the presence of the alteration notification is notified. If the acquisition is made within the effective period of time, the issuance of the authentication key may be omitted, so that only the notification of alternation may be made. In the case of acquisition from the broadcast signal, the broadcast receiver 100 acquires the information (S10120) and delivers the information to the portable information terminal (S10120). Note that, in the case of the acquisition from the broadcast signal, the confirmation as to whether or not the portable information terminal 700 is present in the same residence may be carried out each time the alteration notification is issued, or as in the case of the second embodiment, if the acquisition is made within the effective period of time, the confirmation may be omitted. Here, the alternation notification (S10110) from the broadcast signal is described as being acquired from the broadcast cooperation information; however, in this case, an event message is also described as being included in the broadcast cooperation information. Moreover, the alteration notification may be described in the AIT.

After a series of steps of receiving (acquiring) and delivering the broadcast related information, determination is made as to whether or not the broadcast receiver 100 continues to view the same program (S10121), and if the broadcast receiver 100 does not continue to view, a response that cooperation is not allowed is given to the cooperation control application on the portable information terminal side, thereby terminating the process (S10123). If the viewing is continuously carried out, the process returns to S10108, and the loop process of S10127 is continued.

Thus, the time information is included in an authentication key to be used for the authentication in the delivery server, and the effective period of time is managed, so that it is possible to regularly confirm whether or not the portable information terminal 700 is present in the same residence as the broadcast receiver 100 and a broadcast related application having the limitation in the same residence can be executed appropriately. Moreover, by using authentication information incorporated in a broadcast signal for the authentication in the delivery server, the validity for the delivery request can be ensured, and by altering the authentication information of a broadcast signal appropriately, the fact that the same program is continuously viewed can also be confirmed.

In accordance with the portable information terminal cooperation technique relating to the present embodiment described above, even when the portable information terminal in cooperation with the broadcast receiver acquires broadcast cooperation information from the delivery server, the limitation in the same residence can also be achieved.

Fourth Embodiment

In the second and third embodiments, steps of achieving the limitation in the same residence in the terminal cooperation are described; however, depending on a broadcast cooperation application, the use from the outside of the residence may be permitted. In the present embodiment, such a case will be described. For example, in a case in which a program itself forms publication and advertisement such as television shopping or the like, it becomes more desirable for the broadcast provider to be able to use the broadcast cooperation application irrespective of the inside or outside of the residence. In the case of such a program, the use of the broadcast cooperation application may be allowed, irrespective of whether or not the portable information terminal 700 is present in the residence, as long as the registration is once made in the broadcast receiver 100. In this case, when there is a broadcast cooperation application which forms broadcast video images themselves into streaming data and delivers the data from the broadcast receiver 100 to the portable information terminal 700 byway of the Internet, the convenience thereof is further improved. The streaming data may be encoded in the broadcast receiver 100 to protect the copyright. Information on whether or not the broadcast cooperation application permits the use thereof from the outside of the residence, including the delivery of the broadcast video images to the outside of the residence, is described in data (for example, AIT) inside the broadcast signal.

Figure 18C:
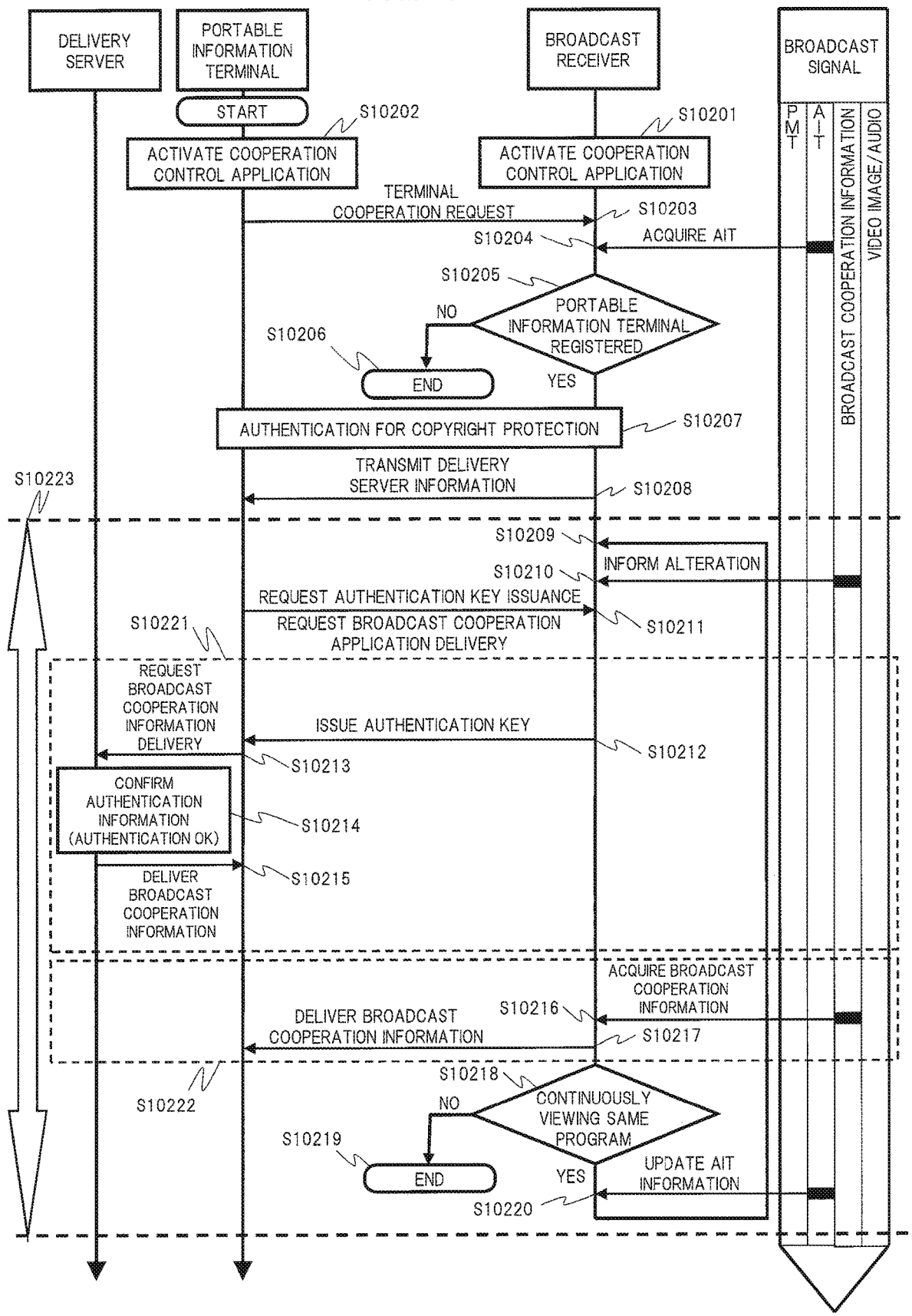
FIG. 18C is a diagram showing an operation sequence at the time of cooperation with a terminal in accordance with a fourth embodiment.

FIG. 18C shows specific steps. Since some steps are in common with those of the second and third embodiments, descriptions of the overlapped portions with those of the second and third embodiments will be omitted. In a case in which there is a terminal cooperation request (S10203) from the outside of the residence, if the use of the application outside the residence is permitted, the broadcast receiver 100 confirms whether or not the source of request is a portable information terminal that has been registered (S10205) and then permits the cooperation. In this case, if necessary, an authentication may be carried out between the portable information terminal 700 and the broadcast receiver 100 in order to protect the copyright of the broadcast video images and broadcast cooperation information (S10207). At this time, the authentication may be carried out as an authentication in the authentication server (S10207). Information on necessity/unnecessity for the copyright protection and information on the authentication method for the copyright protection (supposed to be described, for example, in AIT) are acquired from the broadcast signal, and the control is carried out in accordance with the information. In a case in which no such information is stored in the broadcast signal, a specific method predetermined in the broadcast receiver 100 is carried out. For example, a given copyright protection process predetermined therein may be carried out. Moreover, it may be predetermined that when no such information is stored in the broadcast signal, no copyright protection process is carried out in the broadcast receiver 100.

Specific examples (1) to (4) of authentication for protecting the copyright will be described in the following. In the following authentication processes, only each one of them may be carried out. Alternatively, a plurality of the authentication processes exemplified below may be carried out in combination. Moreover, the authentication exemplified below and another authentication process not exemplified below may be combined with each other and carried out.

(1) Authentication by ID and Password

Upon registering the portable information terminal 700 in the broadcast receiver 100, an ID and a password are issued, and the broadcast receiver 100 permits the cooperation based on the confirmation of the ID and the password.

(2) Use of Encryption Key

In addition to the authentication using the above-mentioned ID and password, an encryption key for decoding encoded video image data or the like is transmitted from the broadcast receiver 100 to the portable information terminal. This encryption key may be acquired from the broadcast signal (for example, described in the AIT).

(3) Utilization of Authentication Server

A method of issuing the encryption key for decoding encoded video images and the like from the delivery server. The portable information terminal 700 transmits the ID and the password to the delivery server to acquire an encryption key. In this case, by acquiring the location information (specifically, URL) of the delivery server from the broadcast signal (for example, described in the AIT), and by transmitting this location information from the broadcast receiver 100 to the portable information terminal 700, security is further improved. Since the video images and the like are not decoded unless the portable information terminal 700 acquires the encryption key, the authentication of the copyright protection may be carried out by requesting the authentication in the delivery server from the broadcast receiver 100, or the authentication may be terminated by notifying the acquisition of the encryption key from the portable information terminal 700 to the broadcast receiver 100. Note that these processes may be charged by the delivery server.

(4) Mutual Authentication of Encryption Key

By mutually authenticating encryption keys respectively possessed by the broadcast receiver 100 and the portable information terminal 700 to be confirmed, the authentication of the copyright protection is executed.

In a case in which information stored in the broadcast signal indicates the necessity of the copyright protection by a predetermined method, if no authentication of the copyright protection is carried out by the predetermined method, the terminal cooperation is not permitted. Moreover, in a case in which, since no specification is given to the broadcast signal, the authentication is carried out by the predetermined method of the broadcast receiver 100, if no authentication of the copyright protection is possible by the predetermined method, the terminal cooperation is not permitted.

In a case in which the terminal cooperation is permitted, thereafter, without carrying out the confirmation as to whether or not the portable information terminal 700 is present in the same residence, a delivery of the broadcast cooperation information to the portable information terminal 700 (S10217) and the issuance of an authentication key for the delivery server (S10212) are carried out in accordance with a request from the portable information terminal 700 (S10211), an autonomous control of the broadcast receiver 100, and a request from the broadcast signal (S10210). Note that, in this case, it is not necessary to carry out a control with the effective period of time set therein. The portable information terminal 700 which is present outside the residence acquires broadcast cooperation information from the broadcast receiver 100, or from the delivery server by using an authentication key issued therefrom (S10215). Alternatively, by incorporating authentication information (for example, described in the AIT) acquired from the broadcast signal into an authentication key issued by the broadcast receiver 100, the delivery server permits an access with the authentication key into which the authentication information acquired from the broadcast signal is incorporated, so that utilization outside the residence can be further optimized.

Moreover, there are some cases in which the limitless use of the broadcast cooperation application had better not be permitted such as a case in which a discount is offered as a premier for viewing a program. In such a case, another method is preferably used in which an authentication is once carried out in a state where the portable information terminal is present in the same residence and then the use of the delivery server is permitted even when the portable information terminal is not present in the same residence. In this case, the registering of the portable information terminal 700 in the broadcast receiver 100 is not required.

Figure 18D:
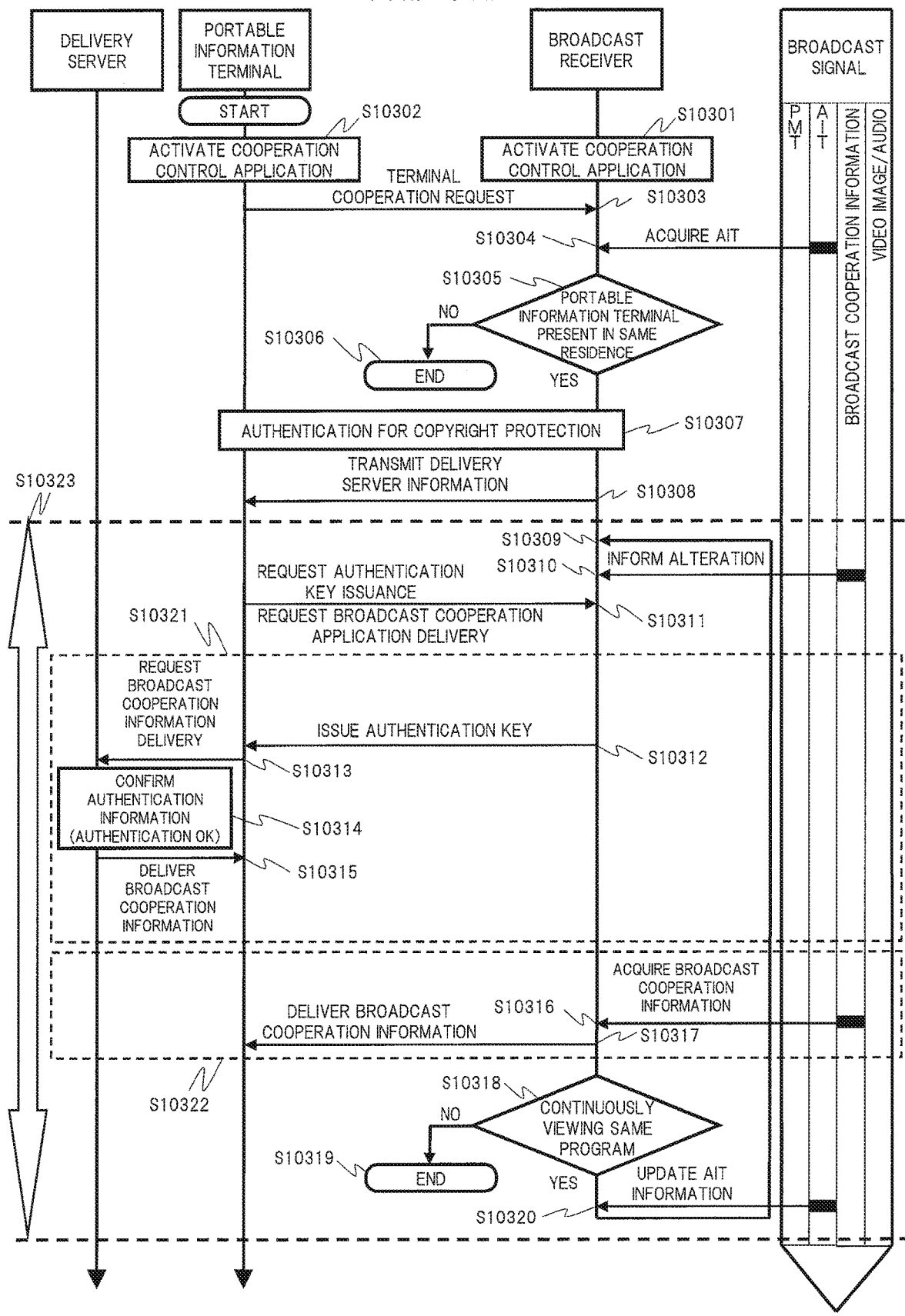
FIG. 18D is a diagram showing an operation sequence at the time of cooperation with the terminal in accordance with the fourth embodiment.

FIG. 18D shows specific steps in this case. Since some steps in the sequence are in common with those shown in FIG. 18C, the description of the overlapped portions will be omitted. First, in a state where the portable information terminal 700 is present in the same residence as the broadcast receiver 100, a terminal cooperation request is made from the portable information terminal 700 to the broadcast receiver 100, and after confirming that the portable information terminal 700 is present in the same residence (S10305), the broadcast receiver 100 permits the cooperation. In this case, if necessary, authentication may be executed between the portable information terminal 700 and the broadcast receiver 100 in order to protect the copyright about the broadcast cooperation information (S10307). At this time, the corresponding authentication may be carried out in an outside authentication server. Information on necessity/unnecessity for the copyright protection and information on the authentication method for the copyright protection (supposed to be described, for example, in AIT) are acquired from the broadcast signal, and the control is carried out in accordance with the information. In a case in which no such information is stored in the broadcast signal, a specific method predetermined in the broadcast receiver 100 is carried out. For example, a given copyright protection process predetermined therein may be carried out. Moreover, it may be predetermined that when no such information is stored in the broadcast signal, no copyright protection process is carried out in the broadcast receiver 100.

Specific examples (5) to (7) of authentication for protecting the copyright will be described. In the following authentication processes, only each one of them may be carried out. Alternatively, a plurality of the authentication processes exemplified below may be carried out in combination. Moreover, the authentication exemplified below and another authentication process not exemplified below may be combined with each other and carried out.

(5) Use of Encryption Key

In a state where the portable information terminal 700 is present in the same residence, an encryption key for decoding encoded video image data or the like is transmitted from the broadcast receiver 100 to the portable information terminal. This encryption key may be acquired from the broadcast signal (for example, described in the AIT). The authentication is executed by transferring this encryption key inside the same residence. Moreover, when such an arrangement is made so as not to acquire an encryption key from the broadcast signal unless the acquisition is made during a specific time in a program, while the delivery of the encryption key to the portable information terminal 700 is limited in the same residence, it is possible to set a limitation that a person needs to stay in the same residence at the corresponding time, so that this arrangement is also utilized for offering a premier for the viewing.

(6) Utilization of Delivery Server

A method of issuing the encryption key for decoding encoded video images and the like from a delivery server. The portable information terminal 700 transmits the ID and the password to the delivery server to acquire an encryption key. In this case, by acquiring the location information (specifically, URL) of the delivery server from the broadcast signal (for example, described in the AIT), and by transmitting this location information from the broadcast receiver 100 to the portable information terminal 700, security is further improved. Since the video images and the like are not decoded unless the portable information terminal 700 acquires the encryption key, the authentication of the copyright protection may be carried out by requesting the authentication in the delivery server from the broadcast receiver 100, or the authentication may be terminated by notifying the acquisition of the encryption key from the portable information terminal 700 to the broadcast receiver 100. The access to the delivery server may be carried out inside the residence or outside the residence; however, when such an arrangement is made so as not to acquire location information of the delivery server from the broadcast signal unless the accessing is made during a specific time in a program, while the delivery of the location information to the portable information terminal 700 is limited in the same residence, it is possible to set a limitation that a person needs to stay in the same residence at the corresponding time, so that this arrangement is also utilized for offering a premier for the viewing. Note that these processes may be charged by the delivery server.

(7) Mutual Authentication of Encryption Key

By mutually authenticating encryption keys respectively possessed by the broadcast receiver 100 and the portable information terminal 700 to be confirmed, the authentication of the copyright protection is executed. This authentication may also be carried out either the inside the residence or outside the residence.

In a case in which information stored in the broadcast signal indicates the necessity of the copyright protection by a predetermined method, if no authentication of copyright protection is carried out by the predetermined method, the terminal cooperation is not permitted. Moreover, in a case in which, since no specification is given to the broadcast signal, the authentication is carried out by the predetermined method of the broadcast receiver 100, if no authentication of the copyright protection is possible by the predetermined method, the terminal cooperation is not permitted. Since after the permission of the terminal cooperation, the same sequence of processes as those of FIG. 18C are carried out, the description thereof will be omitted.

In accordance with the portable information terminal cooperation technique relating to the present embodiment described above, with respect to a portable information terminal to be cooperated with a broadcast receiver, the utilization from the outside of the residence can be achieved, while taking into consideration the copyright protection.

Fifth Embodiment

In an actual usage status, it is desirable to easily recognize the presence or absence of a terminal cooperation application depending on programs and which terminal cooperation application can be utilized. In the present embodiment, description will be given to a display method of a status in which a terminal cooperation application can be utilized.

Figure 19A:
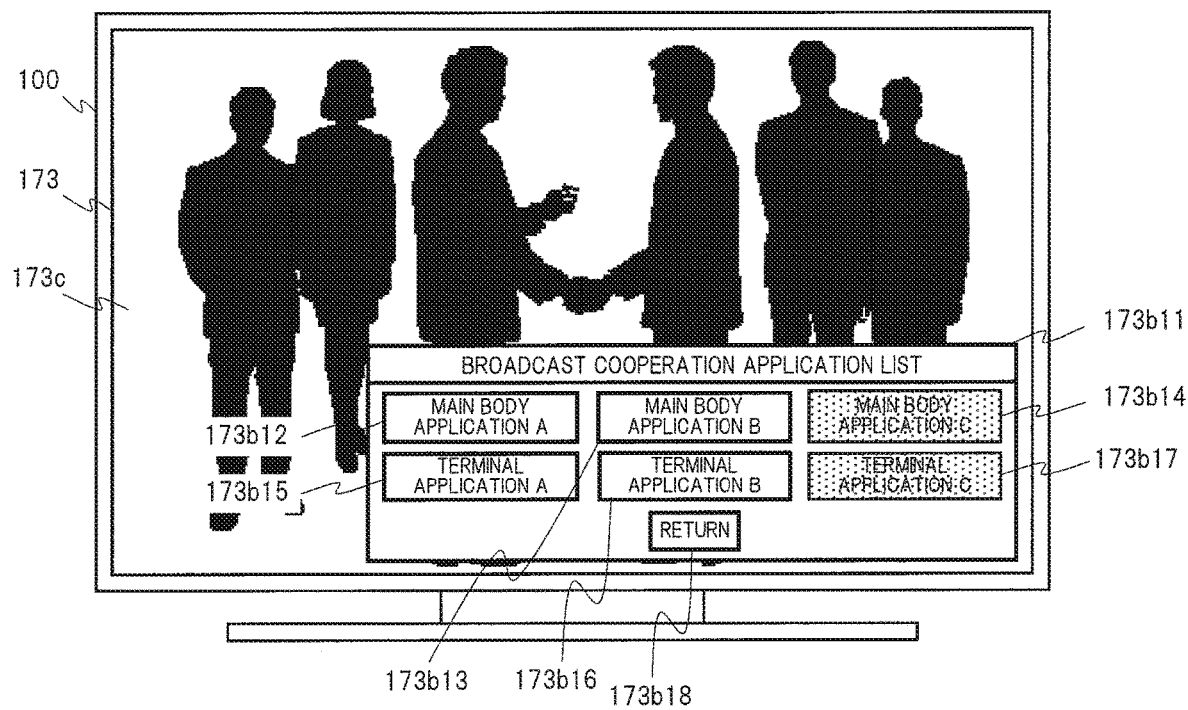
FIG. 19A is a screen display view showing a broadcast cooperation application launcher in a broadcast receiver in accordance with a fifth embodiment.

FIG. 19A shows an example of a launcher screen (173b11) for a broadcast cooperation application in a case in which terminal cooperation applications are present. The broadcast cooperation applications are indicated by character icons with frames. Broadcast cooperation applications (173b12 to 173b14) for the broadcast receiver 100 in cooperation with a program currently viewed and broadcast cooperation applications (173b15 to 173b17) for the portable information terminal are displayed. In the case of this example, statuses of the applications are indicated by the thickness of each frame line surrounding a character row and the coloring of the inside of the frame. Main body applications A and B (173b12 and 173b13) and terminal applications A and B (173b15 and 173b16) are in a state in which utilization is possible, and a main body application C (173b14) and a terminal application C (173b17) are in a state in which utilization is impossible. The state in which utilization of the terminal application is impossible means that among portable information terminals 700 that are in communicable states with the broadcast receiver 100, no portable information terminal having a function for executing the corresponding application is present.

Figure 19B:
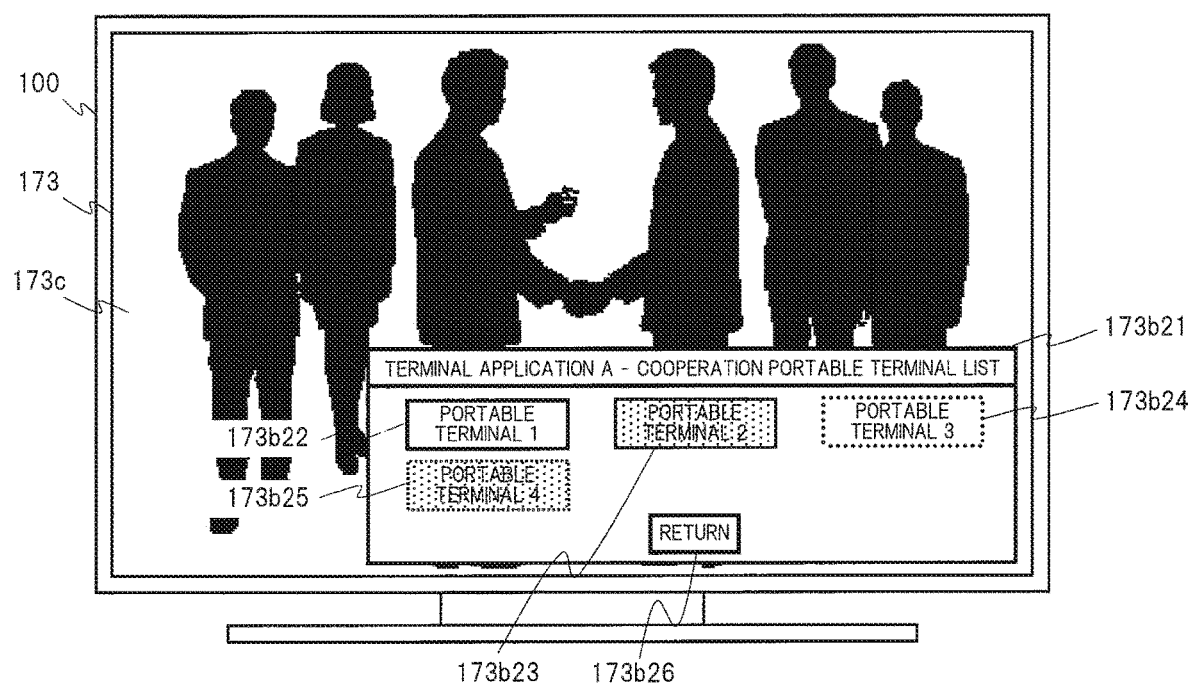
FIG. 19B is a screen display view showing the broadcast cooperation application launcher in the broadcast receiver in accordance with the fifth embodiment.

FIG. 19B shows a screen after the terminal application A has been selected in FIG. 19A. States of respective portable information terminals 700 relating to the terminal application A are shown. The portable information terminals displayed on the screen are the terminals that are registered as to whether or not they have performed cooperation with the broadcast receiver 100 in the past.

A portable terminal 1 (173*b*22) and a portable terminal 2 (173*b*23), each having an icon whose frame line is indicated by a solid line, are in a communicable state with the broadcast receiver 100, while a portable terminal 3 (173*b*24) and a portable terminal 4 (173*b*25), each having an icon whose frame line is indicated by a dotted line, are not in a communicable state. Moreover, the portable terminal 1 (173*b*22) and the portable terminal 3 (173*b*24), each having the icon the inside of the frame of which is white, have a function for executing the terminal application A, while the portable terminal 2 (173*b*23) and the portable terminal 4 (173*b*25), each having the icon the inside of the frame of which is gray, do not have the function for executing the terminal application A. Moreover, in a case in which the application is being executed in the corresponding terminal, an icon having a design indicating the fact may be used.

Moreover, in a case in which a picture pattern is utilized for the icon, since the icon becomes recognizable more visually, the following example will be described next.

Figure 19C:
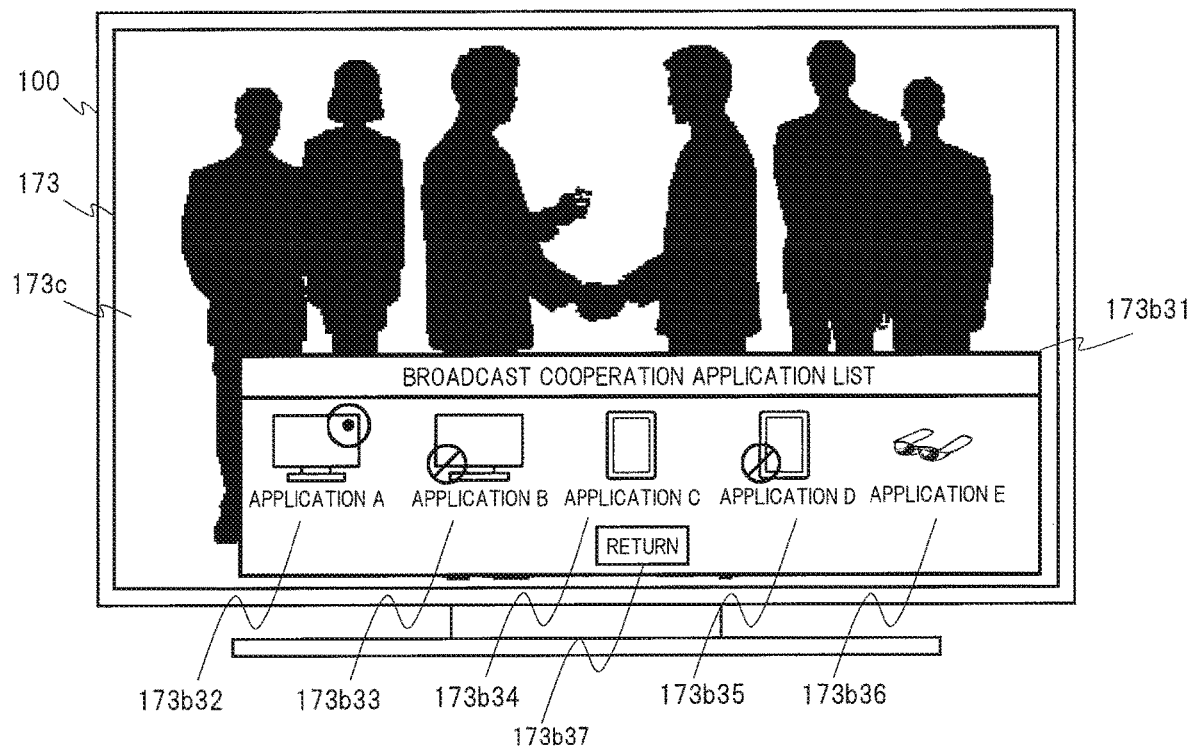
FIG. 19C is a screen display view showing the broadcast cooperation application launcher in the broadcast receiver in accordance with the fifth embodiment.

FIG. 19C shows an example of a launcher screen (173*b*31) showing a list of broadcast cooperation applications. Icons are shown in a manner classified by types of the portable information terminal 700 in addition to the broadcast receiver 100. Each of reference numerals 173*b*32 and 173*b*33 shows an icon indicating the broadcast receiver 100, each of reference numerals 173*b*34 and 173*b*35 shows an icon indicating a smartphone-type portable information terminal 700, and reference numeral 173*b*36 shows an icon indicating a head mount display-type portable information terminal 700. The respective applications are used for devices indicated by the icons.

In FIG. 19C, in a case in which the corresponding application is not utilized, a mark (in this case, round mark with a diagonal line) indicating a state in which utilization is impossible is displayed to be overlapped with the picture pattern of the device. Moreover, with respect to the broadcast receiver 100, in a case in which the corresponding application is already being executed, a mark indicating this fact (in this case, round mark with a dot in the center) may be displayed in an overlapped manner. By using this display, such a wasteful operation to move ahead the steps of the launcher in spite of the fact that the corresponding application is being executed can be prevented. In the case of the portable information terminal 700, a method may be used in which a mark indicating "in execution" is displayed when all the terminals that are in the communicable state with the broadcast receiver and capable of executing the corresponding application are executing the corresponding application.

Figure 19D:
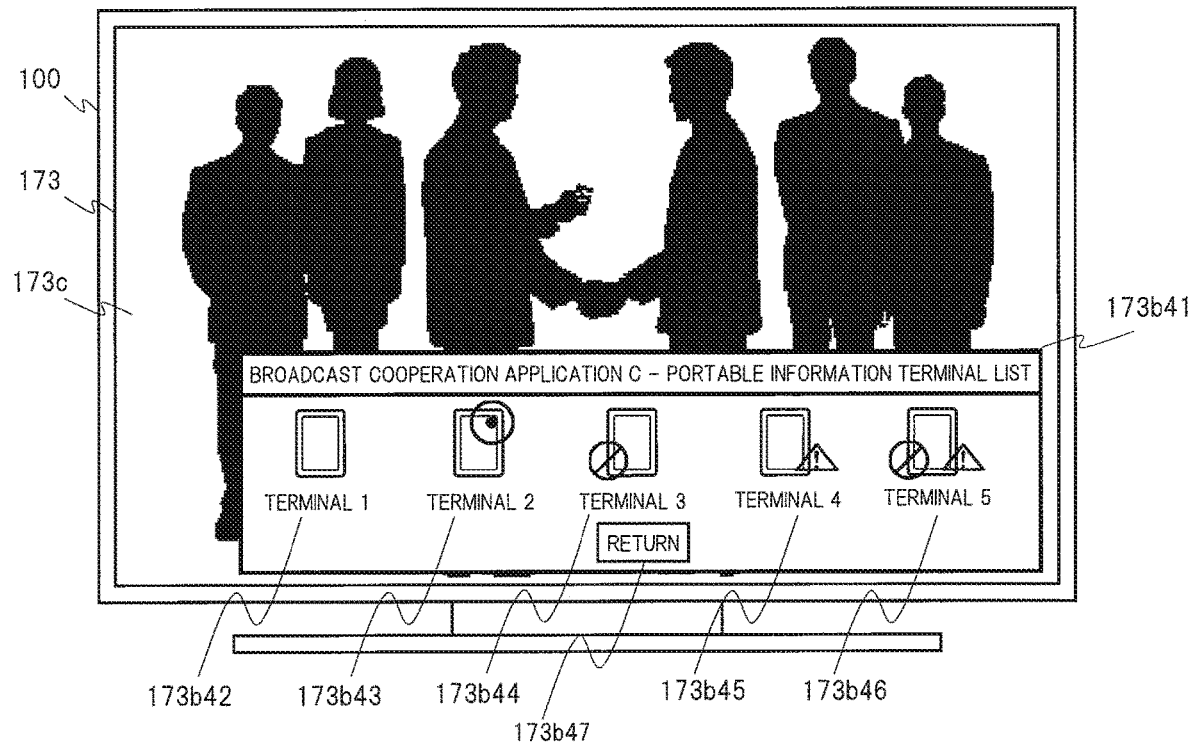
FIG. 19D is a screen display view showing the broadcast cooperation application launcher in the broadcast receiver in accordance with the fifth embodiment.

FIG. 19D shows a screen (173*b*41) after selection of the application C (173*b*34) in FIG. 19C. The states of the portable information terminals 700 corresponding to the application C are shown. In this screen, each of the marks indicating each of the facts that the portable information terminal 700 does not have the execution function of the broadcast cooperation application, that it is not in the state communicable with the broadcast receiver 100, and that it has already been executing the corresponding broadcast cooperation application, is displayed to be overlapped with the icon. In this example, a round mark with a diagonal line (173*b*44 and 173*b*46) is shown when it has no executable function, a triangle mark with an exclamation mark (173*b*45 and 173*b*46) is shown when it is not the communicable state, and a round mark with a dot in the center (173*b*43) is shown when it has already been in execution, respectively.

Moreover, it is preferable to provide a display method indicating the presence of a broadcast cooperation application when the situation changes, without activating the launcher. For example, when a power is activated, when channels are changed, when alternation of a broadcast cooperation application occurs at the start of a program or even in the middle of the program, when a change in the communication state between the broadcast receiver 100 and the portable information terminal 700 occurs, or when the execution status of the application are changed, the icon is displayed for a predetermined period of time to display the corresponding state at that time.

FIG. 19E shows an example in this case. In a case in which icons showing the types of the respective devices are displayed, this state indicates that there are broadcast cooperation applications corresponding to the devices of the respective types. In this case, the round mark with a diagonal line indicates that among the devices of the corresponding type that are in the usable state, there are no devices capable of executing the corresponding application thereon. The round mark with a dot in the center indicates that all the devices of the corresponding type that are in the usable state have already been executing the corresponding application.

FIG. 19F shows a display screen (10401) in the portable information terminal 700. Upon making a request for a terminal cooperation from the portable information terminal, with a list table indicating which types of broadcast cooperation applications can be utilized in which type of broadcast receivers 100, utilization can be carried out more conveniently. FIG. 19F shows an example of such a list table (10402). This table shows that a broadcast cooperation application corresponding to a program that is desirably checked can be utilized in which type of the broadcast receivers 100 present in the user's residence. Moreover, when the list also shows the state of each of the broadcast receivers 100, it becomes possible to achieve higher convenience, in particular, when the application is utilized outside the residence. In this example, display examples including states such as the corresponding program is being received, another program is being received, empty state, and reservation for another program is present (a case in which recording of another program is reserved in the middle of the program), are shown. Here, note that, in a case in which a plurality of tuners are present in the broadcast receiver 100, the state of each of the plural tuners is displayed, thereby achieving much more different convenience. In a table 10202, branch numbers are given to discriminate the tuners in the same device. For example, a receiver B-1 and a receiver B-2 are the tuners in the same broadcast receiver 100. In the case of the terminal cooperation, when deliveries of broadcast video images and audio are received as streaming data, it is not necessary to use the video image unit of the broadcast receiver 100, and since the utilization of the broadcast is possible by using the tuner inside the broadcast receiver 100, it becomes more convenient when the usage status of each of the tuners is recognized.

Note that, in order to execute the display described in this embodiment, information on whether the application in question corresponds to the broadcast receiver 100 or information on whether the application in question corresponds to which type of the portable information terminal 700 is required for each of the broadcast cooperation applications. Moreover, pieces of information for executing the corresponding application on the broadcast receiver 100 and the portable information terminal 700 are required. By describing these pieces of information, for example, in the AIT, the broadcast receiver 100 can acquire the information.

In accordance with the portable information terminal cooperation technique related to the present embodiment described above, by displaying information relating to the broadcast cooperation application, the broadcast receiver 100, and the portable information terminal 700, a broadcast cooperation service having higher usability can be utilized.

As described above, the modes for carrying out the present invention have been described with reference to the first to fifth embodiments; however, it is needless to say that, not limited to the above-mentioned embodiments, various modified examples are possible for the configuration which realizes the technique of the present invention. For example, one portion of the configuration of an embodiment may be replaced by a configuration of another embodiment, or a configuration of another embodiment may also be added to a configuration of an embodiment. All these modifications belong to the scope of the present invention. Moreover, numerical values, messages, or the like used in the specification and drawings is merely an example, and even when different one is used, the effects of the present invention are not impaired.

With respect to the above-mentioned functions and the like of the present invention, one portion or the entire portions thereof may be achieved by hardware by designing integrated circuits, for example. Moreover, one portion or the entire portions thereof may be achieved by software by interpreting and executing operation programs that allow the microprocessor units and the like to achieve respective functions and the like. One portion or the entire portions thereof may be achieved by using hardware and software in combination.

Note that the above-mentioned software for controlling the broadcast receiver 100 may be preliminarily prepared in stored states in the ROM 103 and/or the storage unit 110, etc. of the broadcast receiver 100 at the time of the shipment of the product. The software may be acquired from other application servers 500 or the like on the Internet 200 after the shipment of the product via the LAN communication unit 121. Moreover, the software stored in a memory card, an optical disc, or the like may be acquired via the extension interface unit 124 or the like. In the same manner, the software for controlling the portable information terminal 700 may be preliminarily prepared in stored states in the ROM 703 and/or the storage unit 710, etc. of the portable information terminal 700 at the time of the shipment of the product. The software may be acquired from other application servers 500 or the like on the Internet 200 after the shipment of the product via the LAN communication unit 721, the mobile telephone network communication unit 722, or the like. Furthermore, the software stored in a memory card, an optical disc, or the like may be acquired via the extension interface unit 724 or the like.

Moreover, with respect to control lines and information lines shown in the drawings, only those considered to be necessary for explanation are indicated, and all of those control lines and information lines on the product are not necessarily indicated. Actually, almost all configurations may be considered to be mutually connected with one another.

EXPLANATION OF REFERENCE CHARACTERS

100: broadcast receiver, 100a: antenna, 101: main control unit, 102: system bus, 103: ROM, 104: RAM, 110: storage unit, 121: LAN communication unit, 124: extension interface unit, 125: digital interface unit, 131: tuner/demodulation unit, 132: first separation unit, 133: first video image decoding unit, 134: first audio decoding unit, 135: first subtitle decoding unit, 141: data broadcast receiving and processing unit, 142: data broadcast engine, 151: streaming receiving and processing unit, 152: second separation unit, 153: second video image decoding unit, 154: second audio decoding unit, 155: second subtitle decoding unit, 161: application control unit, 162: application engine, 171: video image superimposing unit, 172: audio selection unit, 173: video image display unit, 174: speaker, 175: video image output unit, 176: audio output unit, 181: presentation synchronization control unit, 191: terminal cooperation control unit, 200: Internet, 210: router device, 300t: wireless wave tower, 300: broadcast station server, 301: main control unit, 302: system bus, 304: RAM, 310: storage unit, 321: LAN communication unit, 400: service provider server, 401: main control unit, 402: system bus, 404: RAM, 410: storage unit, 421: LAN communication unit, 500: other application servers, 600: mobile telephone communication server, 600b: base station, 700: portable information terminal, 701: main control unit, 702: system bus, 703: ROM, 704: RAM, 710: storage unit, 720: communication processing unit, 721: LAN communication unit, 722: mobile telephone network communication unit, 723: NFC communication unit, 724: extension interface unit, 730: operation unit, 740: image processing unit, 741: display unit, 742: image signal processing unit, 743: first image input unit, 744: second image input unit, 750: audio processing unit, 751: audio output unit, 752: audio signal processing unit, 753: audio input unit, 760: sensor unit, 761: GPS receiving unit, 762: gyro sensor, 763: geomagnetic sensor, 764: acceleration sensor, 765: illuminance sensor, 766: proximity sensor.

The invention claimed is:

1. A broadcast receiver for receiving a digital broadcast service that enables an application to be executed in cooperation with a broadcast program, the broadcast receiver comprising:
 a tuner configured to receive a broadcast wave of the digital broadcast service which includes at least a video image related to the broadcast program, electronic program guide information, and application-related information;
 processing circuitry configured to:
  separate at least the video image related to the broadcast program, the electronic program guide information, and the application-related information from the received broadcast wave received by the tuner;
  reproduce the video image related to the broadcast program;
  generate an electronic program guide indication based on the electronic program guide information;

acquire a predetermined application based on location information acquired by referring to the application-related information; and execute the acquired predetermined application and output an application execution video image; and a display configured to display the video image related to the broadcast program, the electronic program guide indication, or the application execution video image, wherein:

the digital broadcast service which is received by the broadcast receiver sets whether or not an application to be executed in cooperation with the broadcast program is provided with the broadcast program and whether or not a cooperative operation is further possible between the application and a portable information terminal, for each of the broadcast programs, the processing circuitry generates the electronic program guide indication, which indicates a title of the broadcast program together with a first mark indicating that the application is provided with broadcast programs, each of which is set as providing the application, by the digital broadcast service, the processing circuitry generates the electronic program guide indication, which indicates a title of the broadcast program together with the first mark and/or a second mark indicating that the cooperative operation is possible between the application and the portable information terminal, for broadcast programs each of which is set as being further possible for the cooperative operation between the application and the portable information terminal, the display displays the electronic program guide indication, the application-related information contains an application profile information that indicates a function requested to execute the application, the processing circuitry refers to the application profile information, and determines whether the broadcast receiver has a function regarding the cooperative operation requested for executing the application or not, the processing circuitry generates at least one of the first mark or the second mark for the broadcast program with which the application is provided in a case where it is determined that the broadcast receiver has the function requested for executing the application, and the processing circuitry does not generate the first mark and the second mark, even though the broadcast program is provided with the application, in a case where it is determined that the broadcast receiver does not have the function requested for executing the application.

2. The broadcast receiver according to claim 1, wherein, in a case where the broadcast program is a broadcast program capable of performing a cooperative operation between the application and the portable information terminal, the processing circuitry generates the electronic program guide indication, which indicates the title of the broadcast program, the first mark, and the second mark, together with a two-dimensional bar code that can be read by the portable information terminal and includes URL information of an acquisition source of the application provided to the portable information terminal.

* * * * *